United States Patent
Prabhu et al.

(10) Patent No.: US 12,524,761 B2
(45) Date of Patent: Jan. 13, 2026

(54) TOKEN SERVICE PROVIDER FOR ELECTRONIC/MOBILE COMMERCE TRANSACTIONS

(71) Applicant: PAYPAL, INC., San Jose, CA (US)

(72) Inventors: Nitin Prabhu, San Jose, CA (US); Dinesh Gomes, San Jose, CA (US); Ian Povey, Asquith (AU)

(73) Assignee: PAYPAL, INC., San Jose, CA (US)

( * ) Notice: Subject to any disclaimer, the term of this patent is extended or adjusted under 35 U.S.C. 154(b) by 366 days.

(21) Appl. No.: 17/504,288

(22) Filed: Oct. 18, 2021

(65) Prior Publication Data

US 2022/0076252 A1 Mar. 10, 2022

Related U.S. Application Data

(63) Continuation of application No. 16/119,623, filed on Aug. 31, 2018, now Pat. No. 11,151,550, which is a
(Continued)

(51) Int. Cl.
*G06Q 20/40* (2012.01)
*G06Q 20/38* (2012.01)
(Continued)

(52) U.S. Cl.
CPC ......... *G06Q 20/40* (2013.01); *G06Q 20/3821* (2013.01); *H04L 63/08* (2013.01);
(Continued)

(58) Field of Classification Search
None
See application file for complete search history.

(56) References Cited

U.S. PATENT DOCUMENTS 7,072,807 B2 7/2006 Brown et al.
8,291,016 B1 10/2012 Whitney et al.
(Continued)

FOREIGN PATENT DOCUMENTS

CN 102017578 A 4/2011
CN 103718200 A 4/2014
(Continued)

OTHER PUBLICATIONS

Beikverdi A., et al., "Centralized payment system using social networks account", 2014 IEEE Fourth International Conference on Big Data and Cloud Computing, May 11, 2020, 7 pages.
(Continued)

*Primary Examiner* — Patrick McAtee
*Assistant Examiner* — Jason B Fenstermacher
(74) *Attorney, Agent, or Firm* — Haynes and Boone, LLP

(57) ABSTRACT

A method for verifying transactions is discussed. The method includes receiving a transaction request for performing a transaction between a user account and a merchant account. The method includes determining, based on authentication of the user account, a common identifier associated with the user account, the common identifier indicating the user account being authorized for use at a plurality of merchant accounts including the merchant account. The method includes determining a payment token for performing the transaction, the determining the payment token based on the common identifier and a user associated with the user account. The method also includes providing the payment token for completing the transaction.

20 Claims, 32 Drawing Sheets

Related U.S. Application Data continuation-in-part of application No. 15/211,657, filed on Jul. 15, 2016, now Pat. No. 11,308,485, which is a continuation-in-part of application No. 14/984,210, filed on Dec. 30, 2015, now Pat. No. 11,308,483.

(60) Provisional application No. 62/242,023, filed on Oct. 15, 2015, provisional application No. 62/209,714, filed on Aug. 25, 2015.

(51) Int. Cl.
*H04L 9/40* (2022.01)
*H04W 12/06* (2021.01)

(52) U.S. Cl.
CPC .......... *H04L 63/102* (2013.01); *H04W 12/06* (2013.01); *H04W 12/068* (2021.01)

(56) References Cited

U.S. PATENT DOCUMENTS

| | | | |
|---|---|---|---|
| 8,688,524 | B1 | 4/2014 | Ramalingam et al. |
| 9,195,984 | B1 | 11/2015 | Spector et al. |
| 9,361,353 | B1 | 6/2016 | Aristides |
| 9,524,501 | B2 | 12/2016 | Weber |
| 9,704,155 | B2 | 7/2017 | McCullagh et al. |
| 9,741,051 | B2 | 8/2017 | Carpenter et al. |
| 9,792,782 | B1 | 10/2017 | Basu et al. |
| 9,846,878 | B2 | 12/2017 | Kumnick et al. |
| 9,942,043 | B2 | 4/2018 | Palanisamy |
| 9,978,062 | B2 | 5/2018 | Raj et al. |
| 10,037,526 | B2 | 7/2018 | Campos |
| 10,147,089 | B2 | 12/2018 | Powell et al. |
| 10,356,087 | B1 | 7/2019 | Vetter et al. |
| 10,956,986 | B1 | 3/2021 | Ran et al. |
| 11,176,524 | B1 | 11/2021 | Kurani |
| 2002/0046335 | A1 | 4/2002 | Baum-Waidner |
| 2004/0249726 | A1 | 12/2004 | Linehan |
| 2005/0216300 | A1 | 9/2005 | Appelman et al. |
| 2005/0216670 | A1 | 9/2005 | Atkinson et al. |
| 2008/0148235 | A1 | 6/2008 | Foresti et al. |
| 2008/0243689 | A1* | 10/2008 | Pinnell ................. G06Q 20/102 705/42 |
| 2009/0055907 | A1 | 2/2009 | Van Horn |
| 2009/0240911 | A1 | 9/2009 | Yamada et al. |
| 2010/0030697 | A1 | 2/2010 | Goodrich et al. |
| 2010/0250687 | A1 | 9/2010 | Smith et al. |
| 2012/0233082 | A1 | 9/2012 | Custer et al. |
| 2012/0238242 | A1* | 9/2012 | Hirson ................. G06Q 20/382 455/406 |
| 2012/0245987 | A1 | 9/2012 | Isaacson et al. |
| 2012/0310831 | A1 | 12/2012 | Harris et al. |
| 2012/0310838 | A1 | 12/2012 | Harris et al. |
| 2013/0085877 | A1 | 4/2013 | Ruhrig |
| 2013/0151419 | A1 | 6/2013 | Hitchcock et al. |
| 2013/0191286 | A1* | 7/2013 | Cronic ................. G06Q 20/0855 705/44 |
| 2013/0198035 | A1 | 8/2013 | Bogaard |
| 2013/0212007 | A1 | 8/2013 | Mattsson et al. |
| 2013/0212666 | A1 | 8/2013 | Mattsson et al. |
| 2013/0232159 | A1 | 9/2013 | Daya et al. |
| 2014/0039990 | A1* | 2/2014 | Georgi ................. G06Q 30/0229 705/14.3 |
| 2014/0047513 | A1 | 2/2014 | Van 'T Noordende |
| 2014/0074568 | A1* | 3/2014 | Moscoe ................. H04L 51/48 705/14.3 |
| 2014/0081750 | A1* | 3/2014 | Hosp ................. G06Q 30/0241 705/26.7 |
| 2014/0081844 | A1 | 3/2014 | Hosp |
| 2014/0089189 | A1 | 3/2014 | Vasireddy et al. |
| 2014/0089192 | A1 | 3/2014 | Boding et al. |
| 2014/0114860 | A1 | 4/2014 | Ozvat et al. |
| 2014/0143149 | A1 | 5/2014 | Aissi |
| 2014/0164243 | A1 | 6/2014 | Aabye et al. |
| 2014/0186871 | A1 | 7/2014 | Urry et al. |
| 2014/0189829 | A1 | 7/2014 | McLachlan et al. |
| 2014/0237570 | A1 | 8/2014 | Shishkov et al. |
| 2014/0279543 | A1 | 9/2014 | Ruhrig |
| 2014/0289033 | A1 | 9/2014 | Ortigoza |
| 2014/0310392 | A1 | 10/2014 | Ho |
| 2014/0330721 | A1 | 11/2014 | Wang |
| 2014/0344149 | A1 | 11/2014 | Campos |
| 2014/0365305 | A1 | 12/2014 | Arditi et al. |
| 2015/0032625 | A1 | 1/2015 | Dill et al. |
| 2015/0032627 | A1 | 1/2015 | Dill et al. |
| 2015/0046338 | A1 | 2/2015 | Laxminarayanan et al. |
| 2015/0088674 | A1 | 3/2015 | Flurscheim et al. |
| 2015/0088686 | A1 | 3/2015 | Glassberg et al. |
| 2015/0112864 | A1 | 4/2015 | Wallaja et al. |
| 2015/0112870 | A1 | 4/2015 | Nagasundaram et al. |
| 2015/0142595 | A1 | 5/2015 | Acuna-Rohter |
| 2015/0161597 | A1 | 6/2015 | Subramanian et al. |
| 2015/0186871 | A1 | 7/2015 | Laracey |
| 2015/0199689 | A1 | 7/2015 | Kumnick et al. |
| 2015/0254665 | A1 | 9/2015 | Bondesen et al. |
| 2015/0312038 | A1 | 10/2015 | Palanisamy |
| 2015/0324736 | A1 | 11/2015 | Sheets et al. |
| 2015/0356560 | A1 | 12/2015 | Shastry et al. |
| 2015/0371221 | A1 | 12/2015 | Wardman |
| 2016/0005042 | A1 | 1/2016 | Tervo et al. |
| 2016/0019539 | A1 | 1/2016 | Hoyos et al. |
| 2016/0092869 | A1 | 3/2016 | Salama et al. |
| 2016/0117651 | A1* | 4/2016 | Davis ................. G06Q 20/3255 705/40 |
| 2016/0134645 | A1 | 5/2016 | Kadashevich et al. |
| 2016/0171208 | A1 | 6/2016 | Matthiesen et al. |
| 2016/0182736 | A1 | 6/2016 | Tiger et al. |
| 2016/0224997 | A1 | 8/2016 | Blackhurst et al. |
| 2016/0269391 | A1 | 9/2016 | Gaddam et al. |
| 2016/0335679 | A1 | 11/2016 | Kshirsagar et al. |
| 2016/0364763 | A1* | 12/2016 | Nomula ............. G06Q 30/0277 |
| 2017/0017958 | A1 | 1/2017 | Scott et al. |
| 2017/0061428 | A1 | 3/2017 | Prabhu et al. |
| 2017/0109741 | A1 | 4/2017 | Heiman et al. |
| 2017/0132633 | A1 | 5/2017 | Whitehouse |
| 2017/0148013 | A1 | 5/2017 | Rajurkar et al. |
| 2017/0161741 | A1 | 6/2017 | Ross et al. |
| 2017/0221054 | A1 | 8/2017 | Flurscheim et al. |
| 2017/0236113 | A1 | 8/2017 | Chitalia et al. |
| 2017/0262842 | A1 | 9/2017 | Subbarayan et al. |
| 2017/0337549 | A1 | 11/2017 | Wong |
| 2018/0018660 | A1 | 1/2018 | Gomes et al. |
| 2018/0137486 | A1 | 5/2018 | Nikkel et al. |
| 2018/0167367 | A1 | 6/2018 | John et al. |
| 2018/0285875 | A1 | 10/2018 | Law et al. |
| 2018/0293573 | A1 | 10/2018 | Ortiz et al. |
| 2018/0308126 | A1 | 10/2018 | Avegliano et al. |
| 2019/0034924 | A1 | 1/2019 | Prabhu et al. |
| 2020/0160325 | A1 | 5/2020 | Kim et al. |
| 2021/0097414 | A1 | 4/2021 | Judy, Jr. et al. |
| 2021/0158336 | A1 | 5/2021 | Shukla et al. |

FOREIGN PATENT DOCUMENTS

| | | |
|---|---|---|
| CN | 104737189 A | 6/2015 |
| CN | 104737189 B | 5/2021 |
| WO | 2012075417 A1 | 6/2012 |
| WO | 2014117095 A1 | 7/2014 |
| WO | 2015023305 A1 | 2/2015 |
| WO | 2017035399 A1 | 3/2017 |

OTHER PUBLICATIONS

Extended European Search Report for European Application No. 16840157.8 mailed on Mar. 26, 2019, 8 pages.
Extended European Search Report for European Application No. 18859552.4 mailed on May 19, 2021, 8 pages.
International Search Report and Written Opinion for International Application No. PCT/US2016/048777 mailed on Oct. 27, 2016, 7 pages.
Korhan J., "What Your Business Needs to Know About Social Graphs", Social Media Examiner, Retrieved from Internet URL:

(56) References Cited

OTHER PUBLICATIONS https://www.socialmediaexaminer.com/what-your-business-needs-to-know-about-social-graphs, Jan. 7, 2011, 9 pages.
Kosir D., "Open vs. Closed Loop Mobile Payments", Retrieved from Internet URL: https://clearbridgemobile.com/open-vs-closed-loop-mobile-payments/, May 21, 2015, 11 pages.
Office Action for Chinese Application No. 201680062253.9 mailed on May 6, 2021, 29 pages.
Search Report issued in related Singapore Appl. No. 10201908563T, Mar. 30, 2020, 2 pages.

* cited by examiner

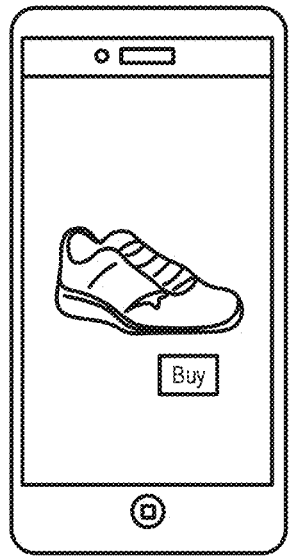

"Buy" button is surfaced in the News Feed section of mobile app alongside the advertisement.

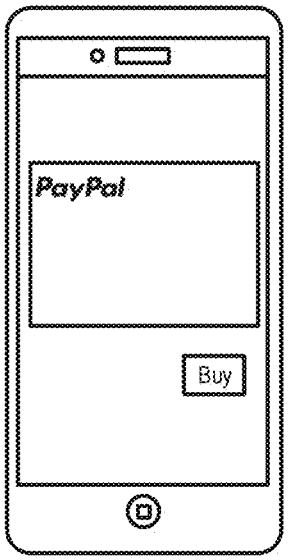

User is given the option to add PayPal or CC/DC or Bank Account as a funding source to buy.

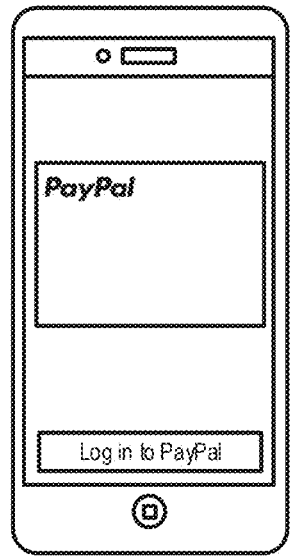

On click "PayPal" button, PayPal login in-context page is displayed on the page

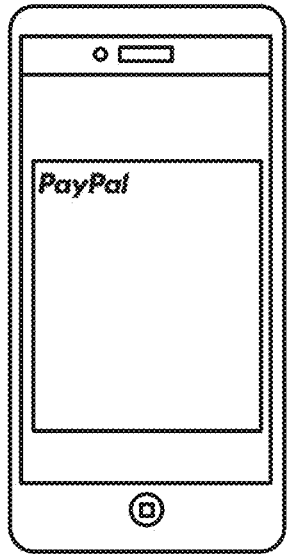

User is shown a one time billing agreement to allow direct payments on without leaving the page

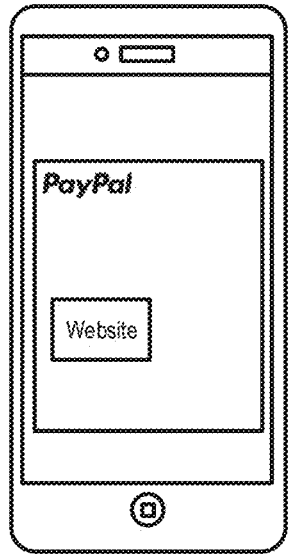

If billing agreement and account linking was successful, user is shown success message

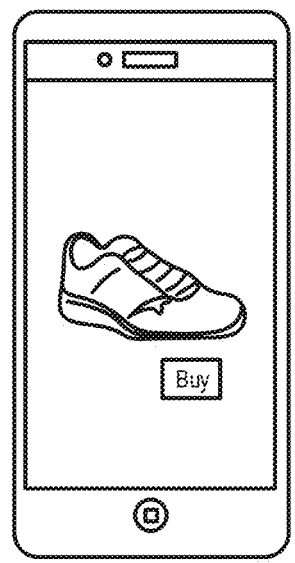

Facebook user is shown the advertisement again and clicking on "Buy" allow seamless buying of the item

Fig. 3

TOKEN SERVICE PROVIDER FOR ELECTRONIC/MOBILE COMMERCE TRANSACTIONS

CROSS-REFERENCE TO RELATED APPLICATIONS

This application is a continuation of U.S. patent application Ser. No. 16/119,623, entitled "TOKEN SERVICE PROVIDER FOR ELECTRONIC/MOBILE COMMERCE TRANSACTIONS", filed Aug. 31, 2018, which is a continuation-in-part of and claims priority to U.S. patent application Ser. No. 15/211,657, entitled "PROCESSING A TRANSACTION USING ELECTRONIC TOKENS", filed Jul. 15, 2016. This application is a continuation-in-part of and claims priority to U.S. patent application Ser. No. 14/984,210, entitled "TOKEN SERVICE PROVIDER FOR ELECTRONIC/MOBILE COMMERCE TRANSACTIONS", filed Dec. 30, 2015, which claims the benefit of U.S. Provisional Application No. 62/242,023 entitled "TOKEN SERVICE PROVIDER FOR ELECTRONIC/MOBILE COMMERCE TRANSACTIONS," filed Oct. 15, 2015 and U.S. Provisional Application No. 62/209,714 entitled "TOKENIZATION FOR ELECTRONIC COMMERCE," filed Aug. 25, 2015, all of which are incorporated herein by reference in their entirety.

BACKGROUND

Field of the Invention

The present disclosure generally relates to systems and methods for processing a transaction using an identifier that uniquely identifies a user.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal®, Inc. of San Jose, CA. Such payment service providers can make transactions easier and safer for the parties involved. Purchasing with the assistance of a payment service provider from the convenience of virtually anywhere using a mobile device is one main reason why on-line and mobile purchases are growing very quickly.

Many payment transactions enabled by online or mobile payment service providers such as, for example, retail purchases, payment transactions, and the like, are made electronically using electronic devices, such as mobile phones or mobile computing devices. For example, a consumer may install a payment application provided by the payment service provider on his or her mobile device to facilitate payments to various merchants or recipients. An online or mobile payment process utilizing the payment application typically includes user authentication that requires a user to enter a login identifier (ID) and/or a password to authenticate the user.

BRIEF DESCRIPTION OF THE FIGURES

FIG. 3 are example snapshots displayed on a mobile device illustrating the linking of the user's account to financial information.

Figure 1:
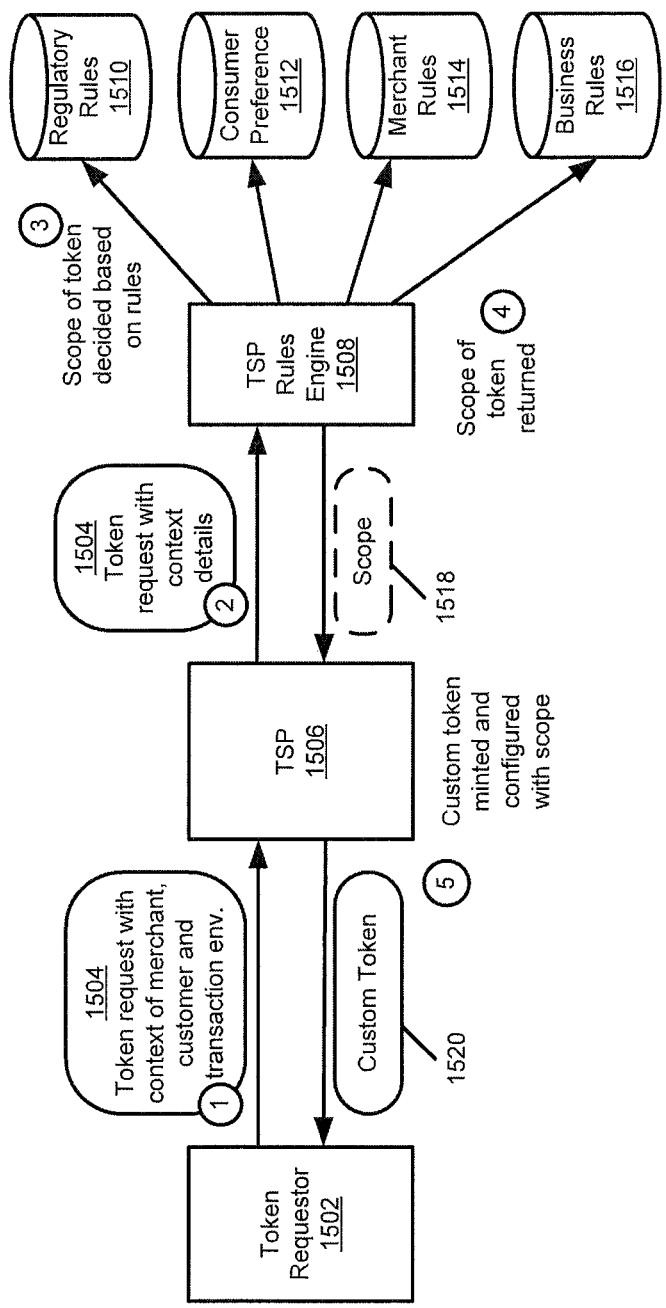
FIG. 1 is an example process flow for issuing one or more tokens having a particular scope based on one or more rules.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

A user may use a user device to access a merchant application and desire to purchase products and/or services (e.g., collectively referred to as items) provided by a merchant via the merchant application. In an example, the merchant application is a mobile app installed on the user device. In another example, the merchant application is a web application accessible via a uniform resource locator (URL) to which a browser executing on the user device points. The user may interact with the merchant application to purchase items by placing them into an electronic shopping cart provided by the merchant application. Additionally, the merchant application may provide the user with the option to complete the purchase (or any transaction) using an account the user has with a payment service provider.

According to an embodiment, a system and/or method may be provided to use a common ID to verify a transaction requested by the user. In some embodiments, a verification system includes a non-transitory memory storing a common identifier that identifies a user. The system may also include one or more hardware processors coupled to the memory and configured to read instructions from the memory to perform the steps of: receiving a token associated with a request to complete a transaction with a merchant; determining the common identifier associated with the token, the common identifier being associated with an identifier of the merchant or website, an identifier of the user requesting the transaction, and a funding instrument associated with the user; and determining, based on information associated with the common identifier, whether to approve the transaction. As will be discussed further below, the verification system may construct a social graph to determine the riskiness of approving the transaction.

A growing number of users interact with some type of social media platform, operating system, or other user environments. Users may communicate with their friends and a wider population by, for example, posting comments on a social media website. In this developing ecosystem, users typically share information on social media websites that are viewable by others. Additionally, users may interact more with social media websites than with their banks or financial institutions.

A user may be uneasy about providing their personal information (e.g., date of birth, mother's maiden name, or social security number) and financial information to a social media website. It may be more acceptable for the user to post information about herself on a social media website. Social media websites allow a user to connect with other users and post comments, which may be visible to the public. In some embodiments, the user's social characteristics/identity, relationships (e.g., friends on the social media website), and information (e.g., user's city of residence, places traveled) provided to the social media website are used to create a map of the user's life history. The user's life history may be illustrated in a social graph and may be more accurate and up-to-date regarding the user's habits and personality than information that is typically used to identify a user (e.g., social security number or name, which is typically given to the user at birth). Accordingly, it may be desirable to leverage this information that is provided by users on social media websites to provide services and resources to users. Examples of services include, but are not limited to, financial services, identity enablement services, and Internet of Things (IoT).

By using information provided by the user on a social media website, it may be unnecessary to request information from the user. For example, rather than ask the user where she lives (e.g., United States), this information may be readily available on her social media profile. In this example, if the user attempts a transaction while in another country (e.g., in India), this transaction may be identified as a high-risk transaction in terms of transaction location. If, however, the user has posted on her social media profile that she is in India along with a photograph of herself in front of the Taj Mahal, the transaction may be identified as a low-risk transaction in terms of transaction location. Additionally, rather than ask the user where she works, this information may be readily available on her social media profile. The likelihood of a user telling the truth on her profile in terms of such information may be perceived as high. Additionally, rather than ask the user her date of birth, this information may be readily available on her social media profile because her friends are wishing her a happy birthday on her social media profile.

A trusted framework may be created based on the information associated with users based on their social media profiles to more accurately identify users and their habits. Additionally, the more connections the user has to other users (e.g., friends on FACEBOOK), the higher the user's reliability score may be. This information may be used in electronic commerce to prevent fraud and high-risk activities.

A common identifier (ID) construct may be created and based on the user's experience as detailed on one or more social media platforms (e.g., the user's social media profiles), by one or more operating systems, or other user environments. A common ID is an identifier that uniquely identifies the user with respect to a particular platform(s) (e.g., a social media platform, operating system, or other user environments). In some aspects, a common ID may be used in relation to banking or financial services to identify the user as a consumer of a good or service. A user may also be referred to as a consumer. The common ID may be transparent to the user.

The common ID may indicate the user's consent for an entity (e.g., social media website, bank, etc.) to perform a specific activity or set of activities in a given environment. For example, the common ID may indicate the user's consent for an entity (e.g., a social media website) to use his credit card to make purchases. In another example, the common ID may indicate the user's consent for a bank to allow him to use his points to pay for his utility bill. In another example, the common ID may indicate the user's consent to allow his refrigerator to order groceries (e.g., milk) from his grocery store when the refrigerator is running low on particular items (e.g., milk). In another example, the common ID may indicate the user's consent to allow his car to download the latest music of his choice from particular music streaming websites (e.g., ITUNES or PANDORA) every week. In another example, the common ID may indicate the user's consent to identify himself at particular locations (e.g., gym, hotel, etc.) without carrying a keycard that is normally used to access or identify himself at the locations. The common ID may enable users to experience seamless user experiences with security and context based data sharing with appropriate controls. Additionally, a token may represent a manifestation of the common ID in real time that allows for the enablement of specific transaction(s) in the context and parameter set(s) as defined by the user, environment, and/or token service provider. beforehand or in real time.

A token may be an open loop or closed loop identifier that serves as a proxy for conveying the user's consent for a particular transaction and for a specific environment. The particular transaction may be a financial or a non-financial transaction corresponding to a specific interaction for that specific environment. An open loop may refer to an identifier that is sufficiently recognizable to be routable by existing routing networks (e.g., credit card company networks) back to the token service provider (e.g., PayPal) or other such appropriate ecosystems based on the context of the transaction. A closed loop may refer to an identifier that is recognized only by the token service provider or limited ecosystem based on business needs.

Tokens may be issued in several different scenarios. In some examples, a token may be issued for online or offline payments. A token may serve as a proxy for a financial instrument or an account with the token service provider. The token may also be used for payment or non-payment purposes.

A token service provider may issue a token and define a set of parameters surrounding the token, may be specifically deic, which can restrict or permit the access and use of the token. One or more parameters of the set of parameters may include, but are not limited to, a card network (e.g., the name of a credit card company's network); a time to live, which is the period from the moment of issuance until the token expires or is no longer valid (e.g., 30 seconds, 1 minute, 8 hours, 2 days, 1 year, etc.); scheme/BIN (e.g., debit, credit, prepaid, or token); currency accepted (e.g., US dollars, Euro, Canadian dollar, Vietnamese dong, etc.); merchant type (MCC) (e.g., digital goods, travel, online retail store, etc.); merchant information, which may include a choice of merchant preferences such as funding sources, brands, closed loop, dollar limits, etc.; merchant location, which may be the country in which the merchant is registered (e.g., United States or Canada), terminal location (e.g., Global Positioning System coordinates or registered card reader terminal location), or whether the merchant is online only or offline only; consumer location radius (e.g., GPS coordinates of the user's mobile device); security features (e.g., cryptogram required or step-up authentication required); routing mechanism (e.g., open or closed loop); type of interaction, which may include funding (e.g., private label credit card (PLCC), points, cards, or banks), identity (e.g., access to hotel, gym or car or other environments that need identity verification), and contextual information (e.g., address, etc.); and amount (e.g., the amount that can be used for payment authorization using the token).

The scope of the token may be based on various factors. For example, the scope of the token may be based on consumer preference, which may be based on the knowledge or data about the consumer's profile or preference(s). In such an example, based on the consumer funding plan, certain types of bins (e.g., PLCC bin or a particular platinum credit Bin) may be identified and used for the consumer. In another example, the scope of the token may be based on whether the consumer has a card from a particular credit card company on file. In such an example, the token service provider may issue a token that can be routed over the particular credit card company's network. In another example, the scope of the token may be based on whether the consumer has a closed loop gift card in her wallet. In such an example, the token service provider may issue a token that can be routed over a supporting network.

In another example, the scope of the token may be based on the merchant's/partner's preference(s). A token service provider may issue a token with a particular BIN or scheme based on a preference expressed by a merchant or a partner of the token service provider. A merchant preference may include whether the merchant does or does not accept all credit card brands. If, for example, the merchant only accepts credit cards from particular companies, the token service provider may issue an open loop token for one or more of those particular companies based on the merchant identifier (ID) of the merchant. In another example, if a merchant offers a PLCC, the token service provider may send a semi open PLCC token. In another example, if a merchant is located in a specific country, the token service provider may issue a token that is accepted by a network in the country.

In another example, the scope of the token may be based on the preference(s) of the token service provider. The token service provider may modify the scope of a token to maximize the meeting or exceeding of business objectives or business needs (e.g., lower cost, lower risk, higher revenue, etc.). For example, the token service provider may issue a token with a more favorable interchange to merchants or partners based on preferred pricing details. In another example, if a consumer desires to pay with a closed loop gift card, the token service provider may issue a click fee based token to save on interchange. In another example, for a high risk merchant category or consumer, the token service provider may decline issuance of the token itself based on past behavior of the consumer.

In another example, the scope of the token may be based on regulatory need. The token service provider may issue tokens with its scope adjusted to meet country specific regulatory or compliance needs. For example, if a particular county requires the use of a cryptogram with the token, the token service provider may issue a token having a cryptogram when the token service provider issues a token to an entity located in that particular country. In another example, if a regulatory based limit on the amount a token can front exists, the token service provider may abide by this regulatory based limit when issuing tokens. In another example, the Durbin Amendment in the United States requires the Federal Reserve to limit fees charged to retailers for debit card processing. Accordingly, the token service provider may switch the type of token being issued if the consumer is using a regulated debit card in her wallet so that certain rates are not charged to the merchant.

It should be understood that the above list of factors affecting the token scope includes non-limiting examples and other factors are within the scope of the present disclosure. The token service provider may create and issue one or more tokens that can support special use cases. For example, the token service provider may issue a token that can be provisioned to be used on a wearable wristband that can be used by the user to "tap and pay." For example, the user may tap the wearable wristband against a scanner, which uses the token associated with the wearable wristband for payment. In another example, the token service provider may issue a token that can be provisioned to a wearable fitness device that is provisioned to open a gym door. In another example, the token service provider may issue a token that can be provisioned to a near field communication (NFC) device to be used to identify a customer to provide keyless access to an NFC-reader enabled door. In another example, the token service provider may issue a token that can be used at a casino that ties charges made on the floor directly to the consumer's room account. In another example, the token service provider may issue a token that simulates a reloadable transit experience for taking mass transit. In such an example, the consumer may load the card with X dollars, which satisfies Y number of trips, and at the commencement of a trip, the consumer taps her card to pay for the trip.

FIG. 1 is an example process flow for issuing one or more tokens having a particular scope based on one or more rules. A token service provider may dynamically issue tokens with the required scope to meet particular use cases. In some examples, the token service provider may be preloaded with rules on token issuance logic. The rules may be based on, for example, at least one of consumer preference(s), regulatory needs, the token service provider's needs, or other needs. In FIG. 1, a token requestor 1502 sends a token request 1504 to a token service provider 1506. Token requestor 1502 may include details that are defined as being a "context" of the token request. The "context" may include basic information about token requestor 1502, the customer, the transaction environment, token needs, location, etc. In FIG. 1, token request 1504 includes a context of a merchant, a context of a customer, and a transaction environment.

Token service provider 1506 may, among other operations, call a token service provider rules engine 1508 that uses the context associated with the token request 1504 to identify relevant rules to apply to a token. The relevant rules may be used to determine a scope with which the token should be issued. Token service provider 1506 sends token request 1504 to token service provider rules engine 1508. Token service provider rules engine 1508 may determine a scope of the token based on one or more rules. For example, token service provider rules engine 1508 may determine the scope of the token based on regulatory rules 1510, consumer preference(s) 1512, merchant rule(s) 1514, and business rule(s) 1516. These rules may be stored in a database that is accessible by token service provider rules engine 1508. Token service provider rules engine 1508 may determine a scope of the token 1518 based on the one or more rules, and return scope of the token 1518 to token service provider 1506. Token service provider 1506 may receive scope of the token 1518 and create a custom token 1520 that is configured with scope of the token 1518. In some examples, customer token 1520 is based on a combination of scope of the token 1518 and a token format associated with token requestor 1502. Token service provider 1506 may then transmit custom token 1520 to token requestor 1502 for token requestor 1502 to use.

The common ID may be an attribute that is used to uniquely represent a relationship between a user and a commerce partner (e.g., social media website) for a specific funding instrument. The common ID may be an internal construct and can be used by commerce partners of the token service provider. The common ID may be used to aggregate transactions and for account management. The common ID may be defined as the combination of a merchant/social commerce partner identifier, and/or the user identity of the user on the partner and/or the funding instrument/wallet information of the user. The exact combination or configuration differs by use case and is driven by product design and business need. One or more tokens may be issued against a common ID.

Unless specifically stated otherwise, as apparent from the following discussion, it is appreciated that throughout the description, discussions utilizing terms such as "receiving", "sending", "storing", "providing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
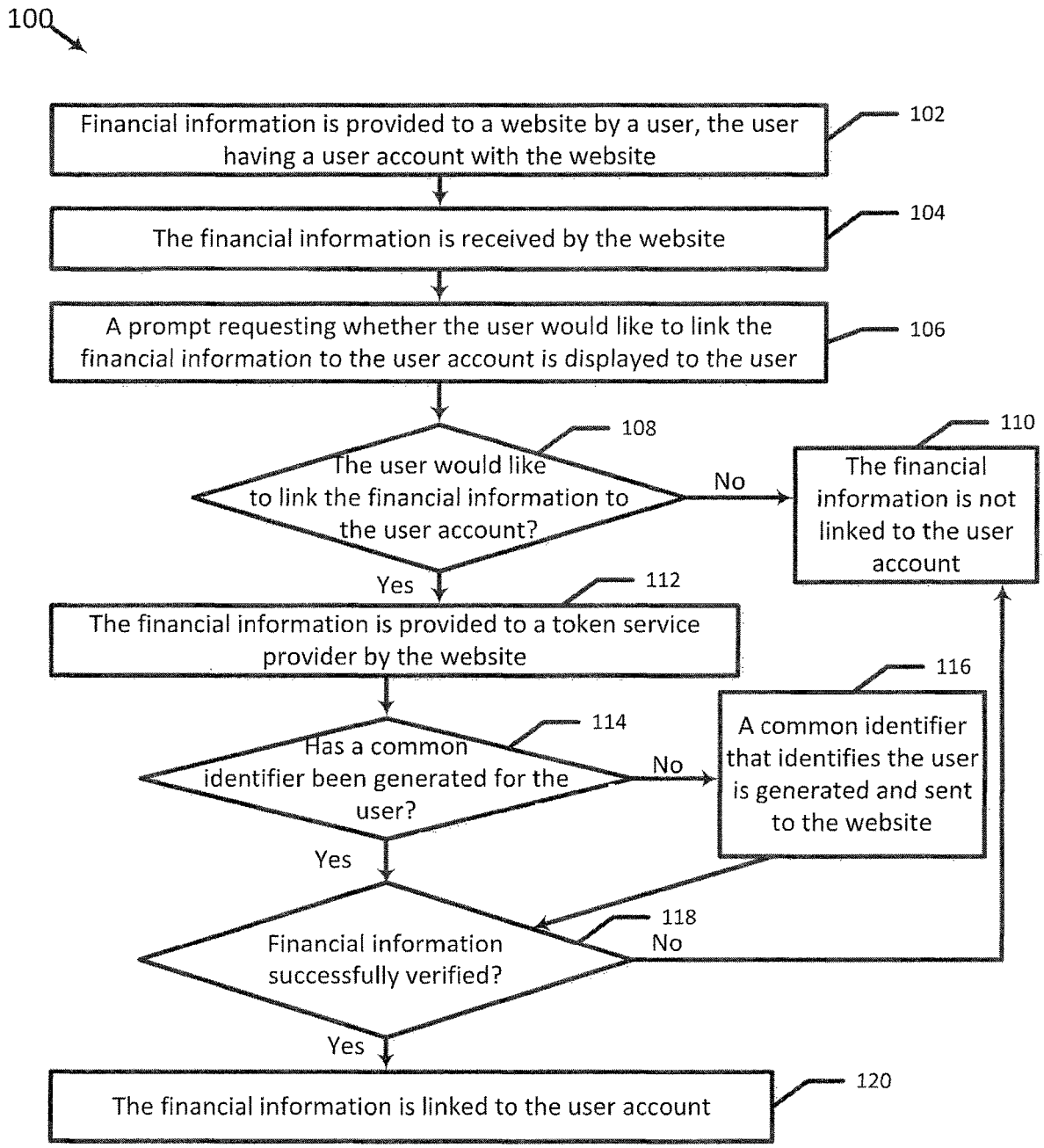
FIG. 2 is a flowchart illustrating an embodiment of a method of linking a common identifier (ID) to a user account and financial information provided by the user.

FIG. 2 is a flowchart illustrating an embodiment of a method 100 of linking a common ID to a user account and financial information provided by the user. Method 100 is not meant to be limiting and may be used in other applications other than the payment applications discussed below. Method 100 includes steps 102-120.

In a step 102, financial information is provided to a website by a user, the user having a user account with the website. In an example, the website may be a social media website (e.g., FACEBOOK, TWITTER, PINTEREST, etc.) and the user has attempted to purchase an item displayed on the social media website. Trademarks are the property of their respective owners. The social media website may request financial information (e.g., the user's credit card information, debit card information, or account information associated with a token service provider) from the user to buy the item. The financial information may include the user's funding source to buy the item. The funding source may also be referred to as a funding instrument.

At a step 104, the financial information is received by the website. In an example, the social media website may receive the user's credit card information, debit card information, or account information associated with a token service provider. At a step 106, a prompt requesting whether the user would like to link the provided financial information to the user's account is displayed to the user. If the user's account is linked to the financial information, the user may purchase items that are displayed on the website and use the financial information provided by the user to do so without leaving the website, even though the items are provided by an entity different from the website provider.

At a step 108, it is determined whether the user would like to link the financial information to the user account. The website may receive a user input to indicate whether the user would like to link the financial information to the user account. If the user input indicates that the user would not like to link the financial information to the user's account, process flow proceeds to a step 110, in which the financial information is not linked to the user account. When the user's behavior is tracked, the website may perform checks to ensure that the appropriate consent from the user is given. In some examples, the website stores or accesses the most up-to-date information regarding best practices regarding privacy and finances to abide by the appropriate laws. In such an example, the website uses the data only for the purposes for which consent has been sought, and given by the user.

In contrast, if the user input indicates that the user would like to link the financial information to the user account, process flow proceeds to a step 112, in which the financial information is provided to a token service provider by the website. The token service provider may receive the financial information. At a step 114, it is determined whether a common ID has been generated for the user. In an example, the token service provider may determine whether a common ID has been generated for the user. If a common ID has not been generated for the user, process flow proceeds to a step 116, in which a common ID that identifies the user is generated and sent to the website. The token service provider may generate the common ID and send it to the website for association with the user. The website may receive the common ID and store it for future reference. When the user attempts to make another transaction in the future, the website may provide this common ID to the token service provider so that the token service provider can track the user's behavior.

From step 114 or step 116, process flow proceeds to a step 118, in which it is determined whether the financial information has been successfully verified. In an example, the token service provider verifies the financial information. In some examples, the token service provider performs risk analysis on the financial information provided by the user. For example, the token service provider may determine whether a credit card or debit card specified in the financial information may be stolen or may be involved in fraudulent activity.

If the financial information fails verification (e.g., the risk of fraudulent activity associated with the financial information provided by the user is high), process flow proceeds to step 110, in which the financial information is not linked to the user account. In contrast, if the financial information is successfully verified, process flow proceeds to a step 120, in which the financial information is linked to the user account. If the user's account is linked to the financial information, the user may purchase a good or service and use her linked financial information to pay for the good or service on the website without being prompted to enter her financial information again or leaving the website to make such a purchase.

A common ID may be associated per user and per website (e.g., social media platform, operating system, or other user environments). In some examples, the token service provider generates a new common ID for a user for each account that the user has with a particular website, and associates the user's behavior on a particular website with the associated common ID. In such an example, a particular website may not want the token service provider to use the information provided by the user on its website to be used for and provided to other websites, and the particular website may instruct the token service provider to not share any information about the user that is provided by the website with others.

It may be desirable for the token service provider to track the user's activity with respect to each social media website with which the user interacts because the user may use different websites for different things. For example, a particular website may be used by the user to interact with friends, another website may be used by the user for shopping, etc. In some examples, the information may be aggregated based on appropriate approvals by all parties and may be used for only the purposes defined and agreed upon by all the parties.

In some examples, the token service provider aggregates the information and activity associated with a common ID across websites for a particular user. In an example, a common ID may utilize and incorporate data from different social media websites with which the user interacts. The token service provider may track the different common IDs associated with a user and perform risk analysis based on this aggregated information. For example, if a login to a user account occurs in a country different from the country in which the user resides, the token service provider may determine that activity or transactions associated with the user's other accounts (e.g., at different websites) may be fraudulent. In this example, the token service provider may leverage the information that it has from different sources to provide a more secure environment for the user, merchants, and financial institutions.

It should be understood that additional processes may be performed before, during, or after steps 102-120 discussed above. It is also understood that one or more of the steps of method 100 described herein may be omitted, combined, or performed in a different sequence as desired.

FIG. 3 are example snapshots displayed on a mobile device illustrating the linking of the user's account to financial information. For example, a "Buy" button is surfaced in the newsfeed section of a mobile app alongside an advertisement. The user is given the option to add the payment service provider, credit card, debit card, or bank account as a funding source to buy the item. If the user selects the button associated with payment using the payment service provider, a login in-context page may be displayed to the user on the mobile app page. The user may be displayed a onetime billing agreement to allow direct payments on the web app, without leaving the page. If the billing agreement and account linking was successful, the user is shown a success message. Additionally, the user is shown the advertisement again and clicking on the "Buy" button may allow for seamless buying of the item.

Figure 4:
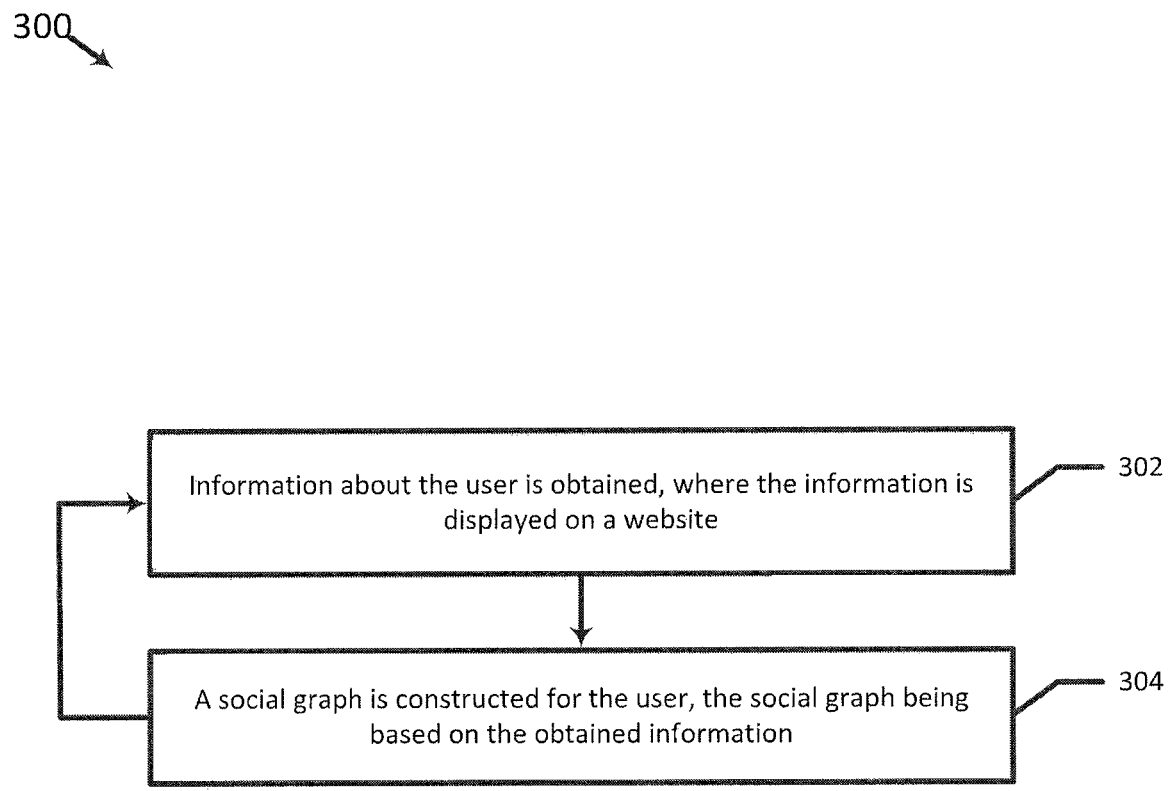
FIG. 4 is a flowchart illustrating an embodiment of a method of constructing a social graph.

FIG. 4 is a flowchart illustrating an embodiment of a method of constructing a social graph. Method 300 is not meant to be limiting and may be used in other applications other than the social media context. Method 300 includes steps 302 and 304. At a step 302, information about the user is obtained, where the information is displayed on a website.

In an example, the token service provider may obtain information about the user by receiving updates from the website. The token service provider may also search for information displayed on the website to obtain more information about the user. For example, the token service provider may search for keywords (e.g., "Happy Birthday!") on a user's website profile to determine the user's birthday. Additionally, the token service provider may determine particular fields displayed on the website (e.g., "work," "where I went to school," etc.) and determine the values of those fields to collect more information about the user.

At a step 304, a social graph is constructed for the user, the social graph being based on the obtained information. In an example, the token service provider may aggregate the information obtained about the user and construct the social graph. The social graph is in the context of the user and is based on information about the user. The social graph may be based on information provided by the user and others (e.g., the user's friends or other connections) that is displayed on the user's social media profiles.

The token service provider may incorporate the activity in the social graph into the user's common ID. Additionally, the token service provider may continually update the user's social graph such that it includes recent activity associated with the user. For example, a node in the social graph may indicate the user's current location. If the user has "checked into" a restaurant located in Chicago with the comment, "I love the windy city!", the token service provider may determine that the user has left her residential city of San Jose, California and is presently in Chicago, Illinois. Accordingly, the token service provider may update the user's social graph to reflect the user's new current location in Chicago, Illinois. If the token service provider receives a request for a transaction in Chicago attempted by the user, the token service provider may determine that the location of the transaction is low risk because the token service provider has determined that the user is in Chicago. If, however, the token service provider receives a request for a transaction in Lake Tahoe, California attempted the user, the token service provider may determine that the location of the transaction is high risk because the user's current location and the location of the transaction do not match.

It should be understood that additional processes may be performed before, during, or after steps 302 and 304 discussed above. It is also understood that one or more of the steps of method 300 described herein may be omitted, combined, or performed in a different sequence as desired.

Figure 5:
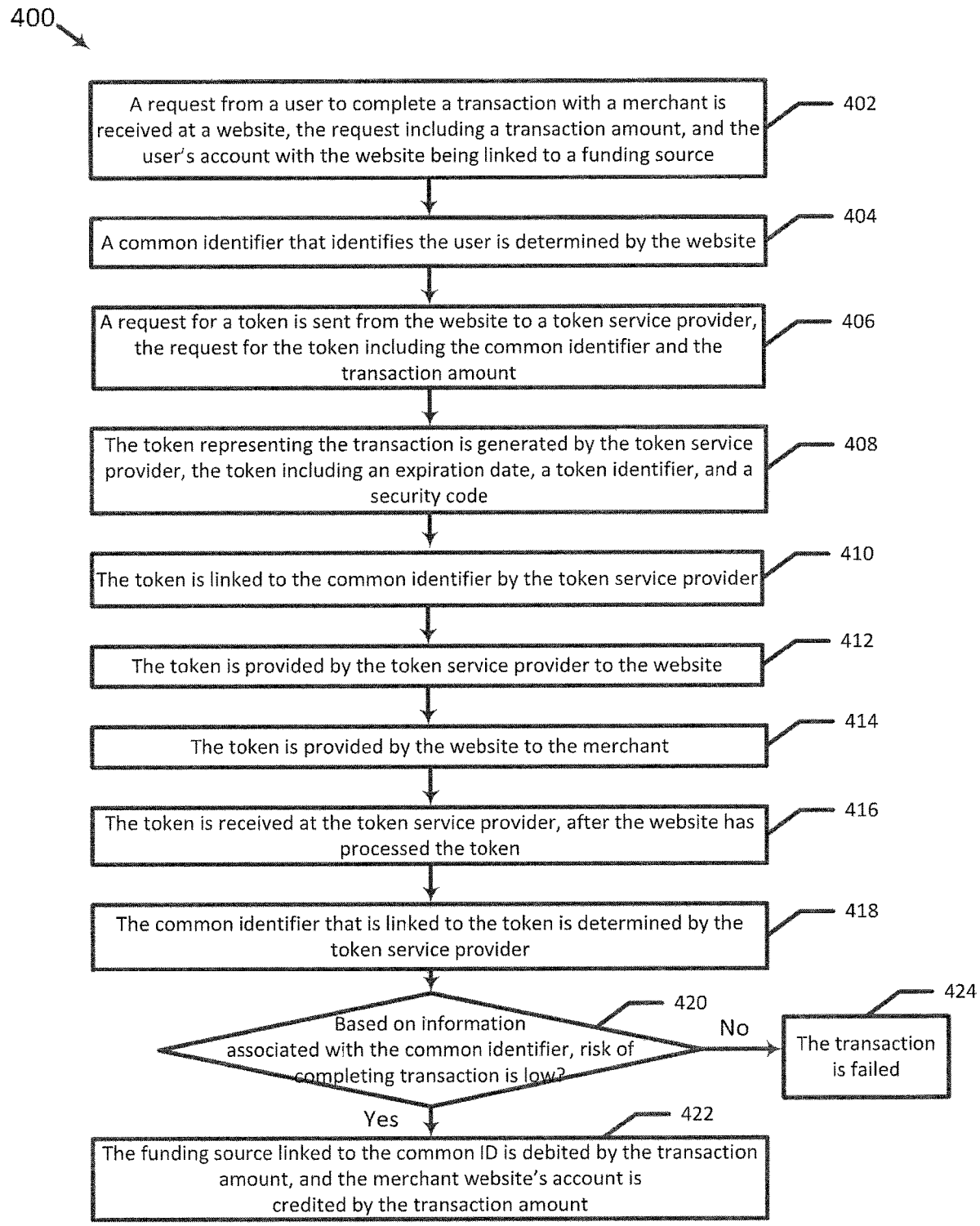
FIG. 5 is a flowchart illustrating an embodiment of a method of using a common ID to verify a transaction requested by the user, after the user's account has been linked to the user's financial information.

FIG. 5 is a flowchart illustrating an embodiment of a method of using a common ID to verify a transaction requested by the user, after the user's account has been linked to the user's financial information. Method 400 is not meant to be limiting and may be used in other applications other than the payment applications discussed below. Method 400 includes steps 402-424.

In a step 402, a request from a user to complete a transaction with a merchant is received at a website, the request including a transaction amount, and the user's account with the website being linked to a funding source. In some examples, the user browses a social media website and sees an item for sale displayed on the website's newsfeed. The user may click a "Buy" button near the item to attempt to purchase it. In a step 404, a common ID that identifies the user is determined by the website. The website may search a database for the common ID that identifies the user based on, for example, the user's username and password with the website.

If the website has a common ID that identifies the user, the website may request from the token service provider a token associated with the common ID and the user. In a step 406, a request for a token is sent from the website to a token service provider, the request for the token including the common ID and the transaction amount. The token service provider may receive the request including the common ID and the transaction amount.

In a step 408, the token representing the transaction is generated by the token service provider, the token including an expiration date, a token identifier, and a security context. In some examples, the security context is a security code. The token identifier may be a number that identifies the token and may be in the same format as a credit card or debit card number. In such an example, the token identifier may be a 16 digit number. In some examples, the token identifier is not an actual credit card or debit card number. In such an example, the token identifier may be thought of as a "transactable primary account number" (TPAN) because the token identifier is not an actual credit card or debit card number that can be used as a funding source in and of itself, but is a representation of the transaction and can be used by the merchant to obtain funding for the transaction from the user's linked funding source. Accordingly, companies may be able to adopt techniques disclosed in the present disclosure without modifying their systems. In some examples, the token is replaced with a Cryptogram to provide additional security.

In an example, the security context is in the same format as a CVV (card verification value) or CSC (card security context). In such an example, the security context may be a three digit number. The security context may be dynamic and change with each transaction. In an example, the expiration date is in the MM/YY format.

At a step 410, the token may be linked to the common ID by the token service provider. The token service provider may link the token to the common ID that identifies the user. In such an example, the token service provider is the token service provider that provides a token that is linked to the common ID and that can be understood by the website with which the user is interacting to purchase goods or services from a third-party merchant.

At a step 412, the token is provided by the token service provider to the website. The website may receive the token and process it as if it were a valid credit card or debit card number with its associated information (security context and expiration date). At a step 414, the token is provided by the website to the third-party merchant. The merchant may receive the token and process it accordingly. The token may protect the identity and information of the user because the merchant may be unable to determine the buyer's information. For example, if the user purchases digital content, the merchant may process the token and provide the digital content to the user through the website, without knowing the user's biographical information (e.g., name, mailing address, etc.). If the user purchases a good to be mailed to the user or a service to be performed at the user's residence, the merchant may request this information from the user because this information is not provided in the token. The token may be used as a transactable PAN in order for the merchant to be paid something an item or service.

At a step 416, the token is received at the token service provider, after the website has processed the token. In an example, the merchant may process the token using the token identifier, expiration date, and security context as if it were a funding source, such as it would a real credit card or debit card. The token is eventually routed back to the token service provider because the token identifier is associated with the token service provider.

At a step 418, the common ID that is linked to the token is determined by the token service provider. In an example, the token service provider determines the common ID that is linked to the token. At a step 420, based on information associated with the common ID, it is determined whether the risk of completing the transaction is low. The token service provider may perform a risk analysis to determine whether the transaction may be associated with fraud. In some examples, the token service provider may use the social graph or trigger points based on self-learning algorithmic models constructed for the user to help in determining the risk of the transaction. Accordingly, the token service provider may use the most up-to-date information about the user, the user's habits, the user's location, etc. to determine whether to approve this transaction.

In some examples, the token service provider provides the token to the website, which provides it to the third-party merchant, to be used at most once. The token identifier, expiration date, and security context may be interpreted by the merchant and processed accordingly. If the merchant or website attempts to use the token a second time, the token service provider may fail the transaction and send the website an error message.

If the risk of completing the transaction is low, process flow proceeds to a step 422, in which the funding source linked to the common ID is debited by the transaction amount, and the merchant website's account is credited by the transaction amount. In an example, the token service provider debits the funding source linked to the common ID by the transaction amount, and credits the merchant website's account by the transaction amount. The token service provider may ensure that the entire transaction is completed. In an example, the token service provider pays the merchant and receives payment from the user's funding source. In contrast, if the risk of complete the transaction is not low, process flow proceeds to a step 424, in which the transaction is failed. In an example, the token service provider fails the transaction and sends an error message to the website.

It should be understood that additional processes may be performed before, during, or after steps 402-424 discussed above. It is also understood that one or more of the steps of method 400 described herein may be omitted, combined, or performed in a different sequence as desired.

Figure 6:
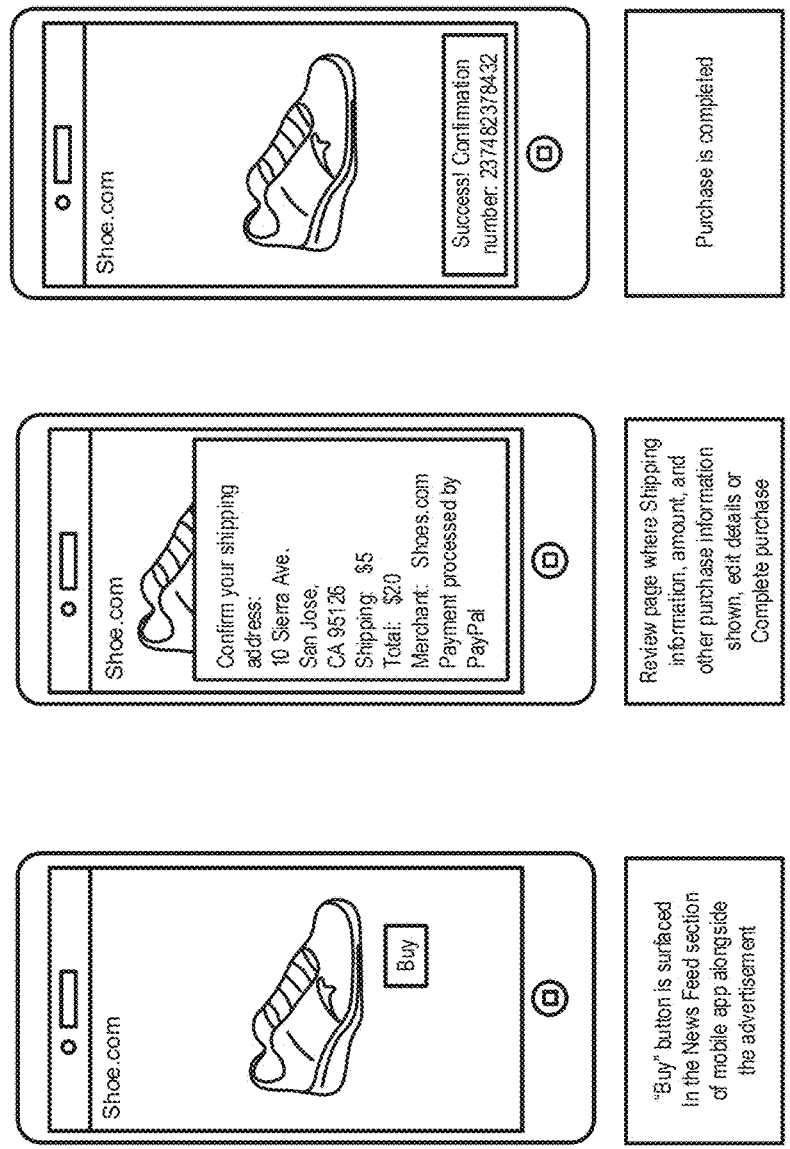
FIG. 6 are example snapshots displayed on a mobile device illustrating the purchase of an item using the financial information linked to the user's account.

FIG. 6 are example snapshots displayed on a mobile device illustrating the purchase of an item using the financial information linked to the user's account.

In some embodiments, the token service provider stores a mapping between the purchase, the financial information (e.g., financial instrument) provided by the user, and the financial instrument provider. The token service provider may map the financial instrument used in the transaction to the asset that the user is attempting to purchase. By doing so, the token service provider may acknowledge that this transaction satisfies Know Your Customer (KYC) requirements. For example, in order of for the user to have received the funding instrument, the user has already gone through the KYC process and the token service provider may leverage this information. Additionally, the token service provider may restrict the user of this funding instrument in areas that are considered high risk. The token service provider may control the transactions in which the user engages in a way that is KYC compliant.

Figure 7:
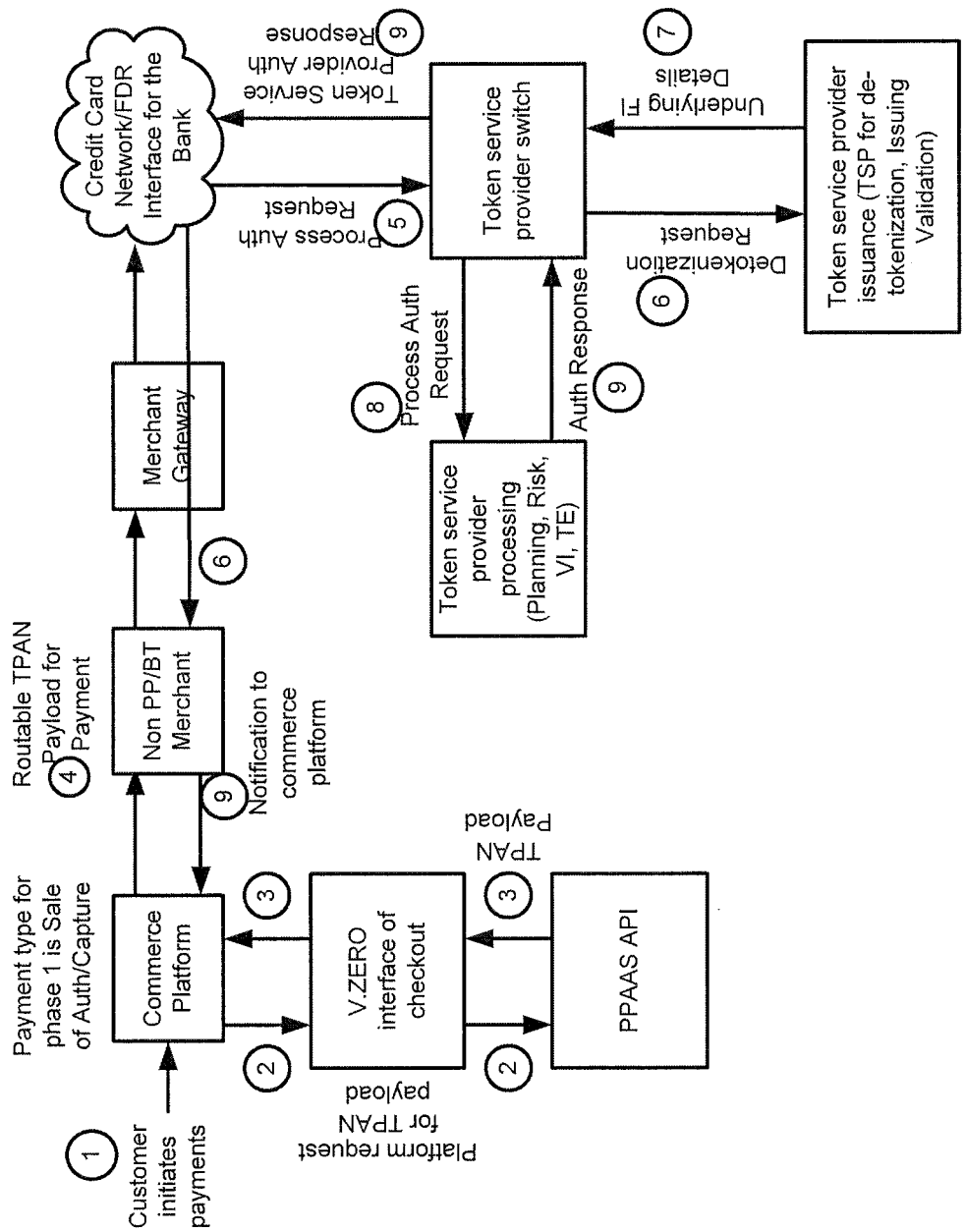
FIG. 7 is an example process flow for user authentication.

FIG. 7 is a process flow for user authentication. In FIG. 7, a customer initiates payments on a commerce platform. The commerce platform may request a TPAN payload by invoking an API. The TPAN payload may be sent to the commerce platform, which may then route the TPAN payload for payment to a merchant gateway. The merchant gateway may be different from the payment service provider. The merchant gateway may send the routable TPAN payload to a credit card network for communication with a bank. The credit card network may send the routable TPAN to a switch that sends a de-tokenization request to an issuer that validates the token. If the token is valid, the issuer sends underlying funding instrument details to the switch, which then sends the authentication request to a processor that processes the request and determines a riskiness of the allowing the transaction to occur. If successfully authenticated, the processor sends an authentication response indicating a successful authentication to the switch. The switch receives the authentication response and forwards it to the merchant via the credit card network and merchant gateway. The merchant send a notification to the commerce platform of the successful authentication.

Figure 8:
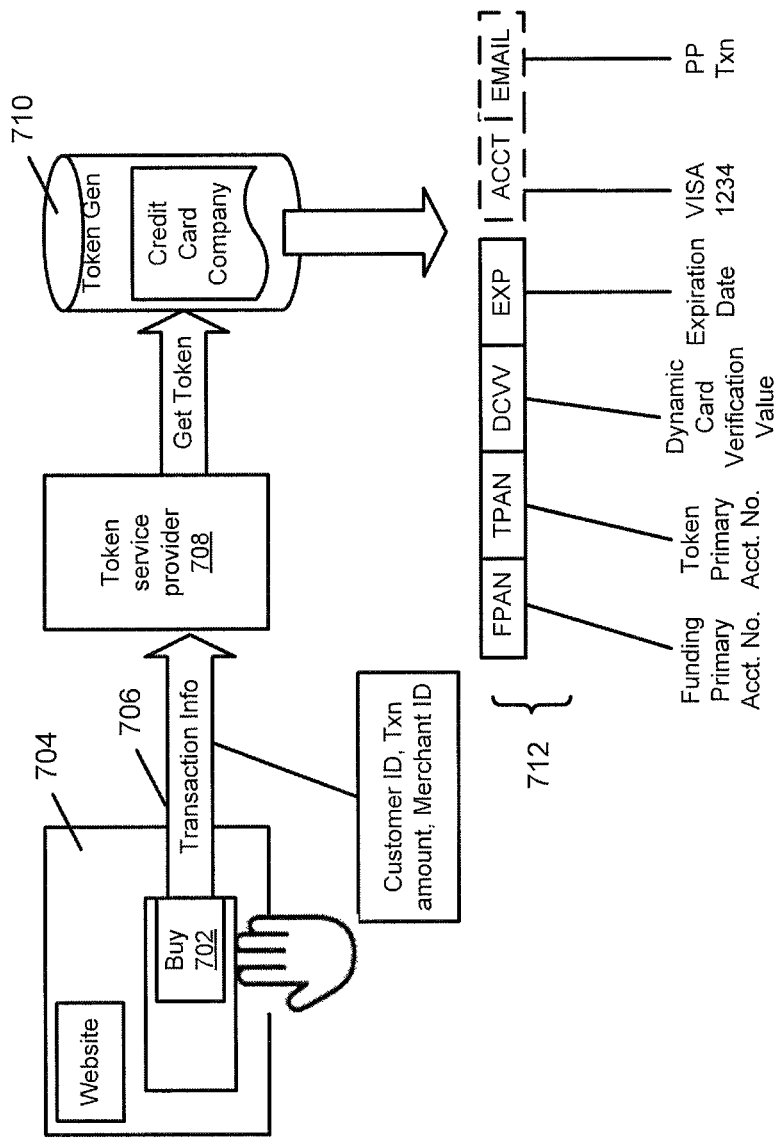
FIG. 8 is an example process flow for providing a token to a website with which the user is interacting to purchase a good from a third party.

FIG. 8 is an example process flow for providing a token to a website on which the user is interacting to purchase a good from a third party. In FIG. 8, a user may select a "Buy" button 702 associated with an item displayed by a webpage 704. The webpage may be associated with a website that receives the user selection to buy the associated item. In response to the user selecting "Buy" button 702, the website may send transaction information 706 to a token service provider 708. In the example illustrated in FIG. 8, token service provider 708 may be PayPal®. Transaction information 706 may include the customer ID, transaction amount, and merchant ID. Token service provider 708 may request a token from a token generator 710. Token generator 710 may generate tokens specific to particular credit card companies. In response to token service provider 708's request, token generator 710 may generate a token 712 including the user's funding primary account number, token primary account number, dynamic card verification value (e.g., security context), and expiration date. It may be unnecessary for token 712 to include the last four numbers of the user's funding instrument or the user's email address.

Figure 9:
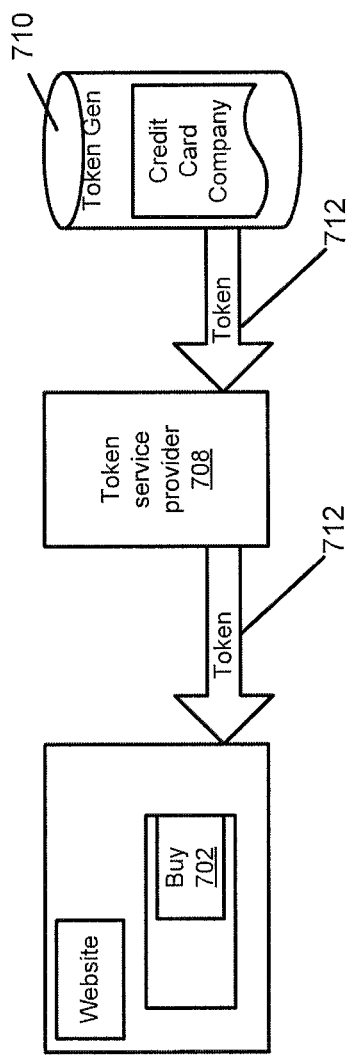
FIG. 9 is an example process flow for providing a token to the website.
Figure 10:
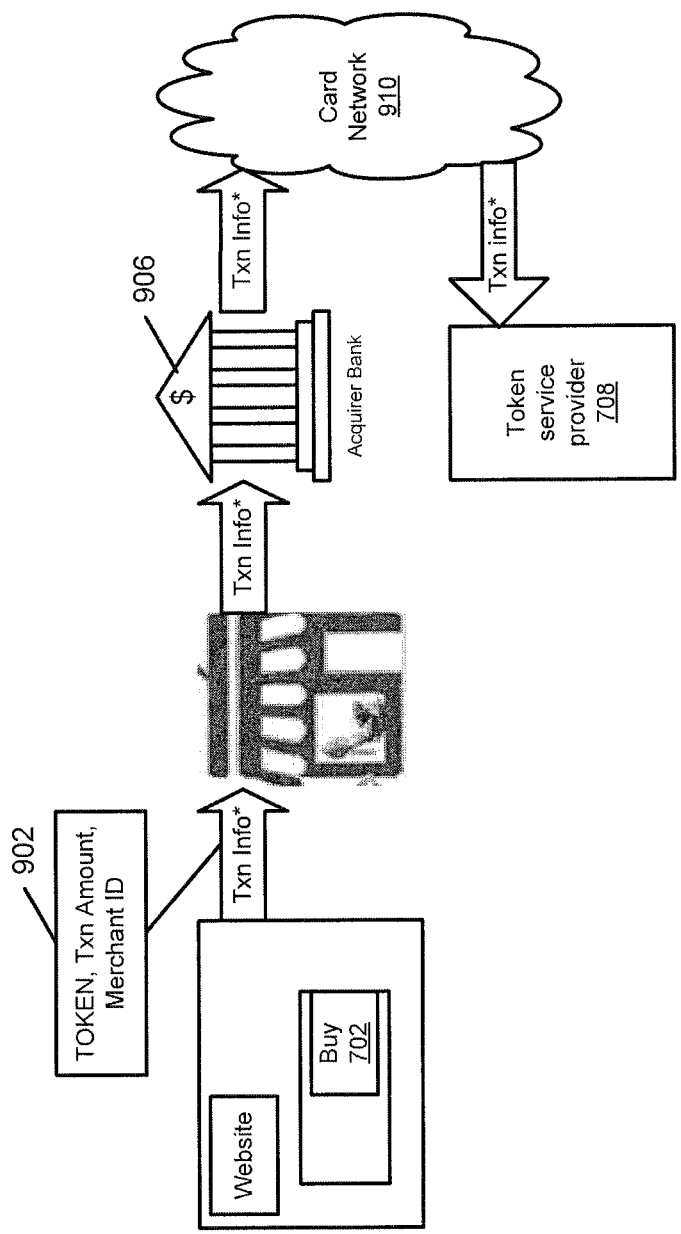
FIG. 10 is an example process flow for providing transaction information to a merchant or website.
Figure 11:
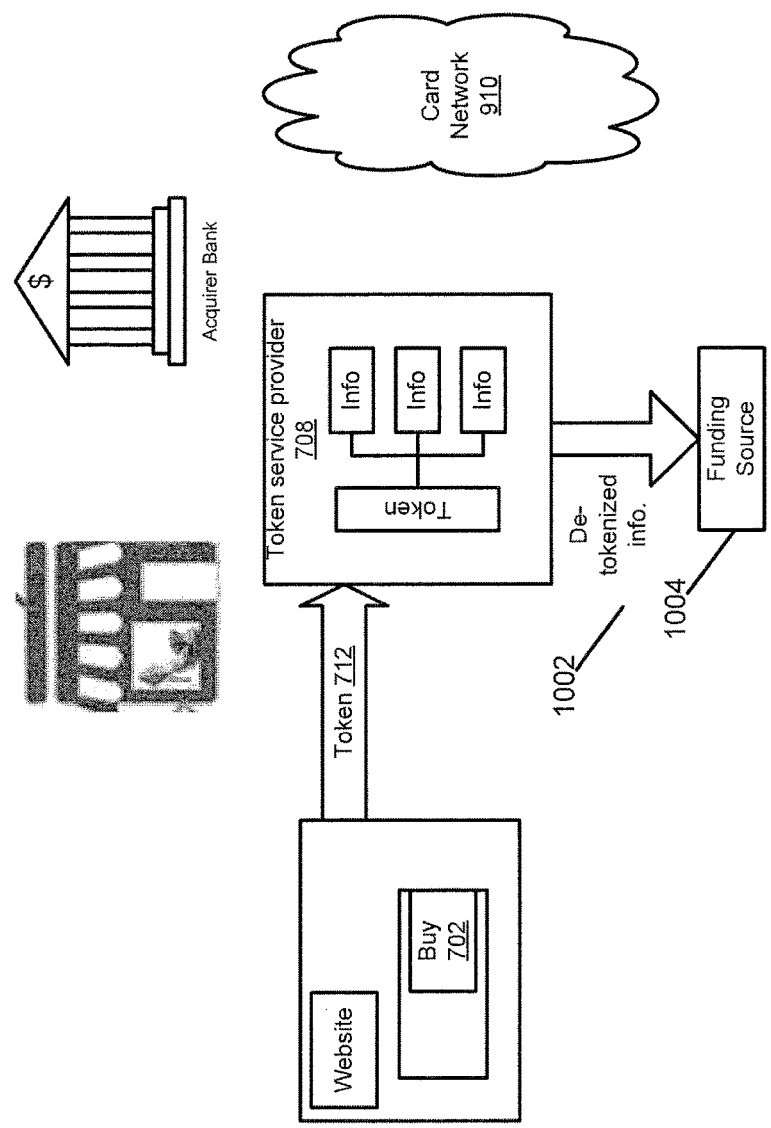
FIG. 11 is a block diagram illustrating the token service provider providing de-tokenized information to a funding source.
Figure 12:
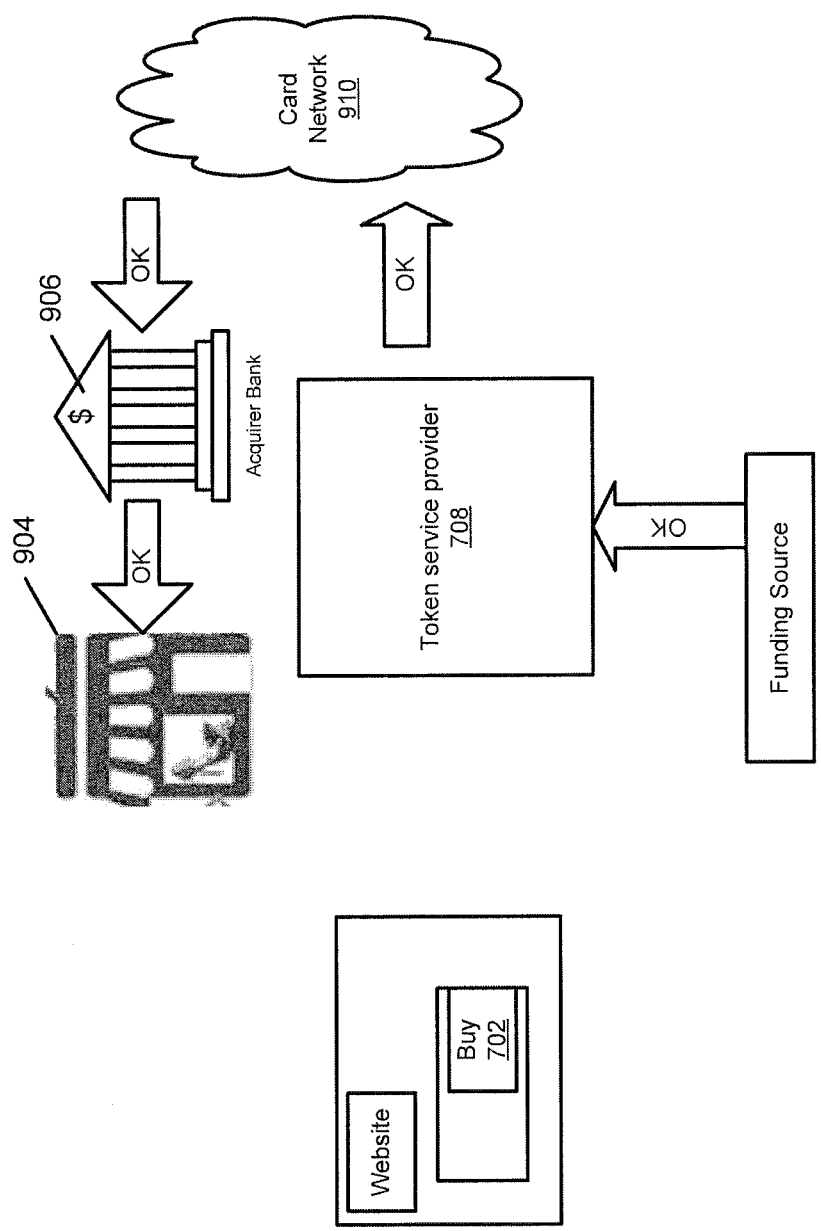
FIG. 12 is an example process flow for providing the transaction amount to the merchant.

FIG. 9 is an example process flow for providing a token to the website. In FIG. 9, token generator 710 provides token 712 to token service provider 708, which then provides token 712 to the website. FIG. 10 is an example process flow for providing transaction information 902 to a merchant or website. In FIG. 10, transaction information 902 includes token 712, the transaction amount, and the merchant ID. The website may provide transaction information 902 to a merchant 904, which then provides transaction information 902 to a bank 906. Bank 906 may then provide transaction information 902 over a card network 910 to token service provider 708. FIG. 11 is a block diagram illustrating token service provider 708 providing de-tokenized information 1002 to a funding source 1004. Additionally, token 712 is provided by the website to token service provider 708. FIG. 12 is an example process flow for providing the transaction amount to merchant 904. If funding source 1004 approves the transaction, funding source 1004 sends an approval to token service provider 708, which then sends an approval over card network 910 to bank 906. Bank 906 then sends the transaction amount to merchant 904, who gets paid.

Figure 13:
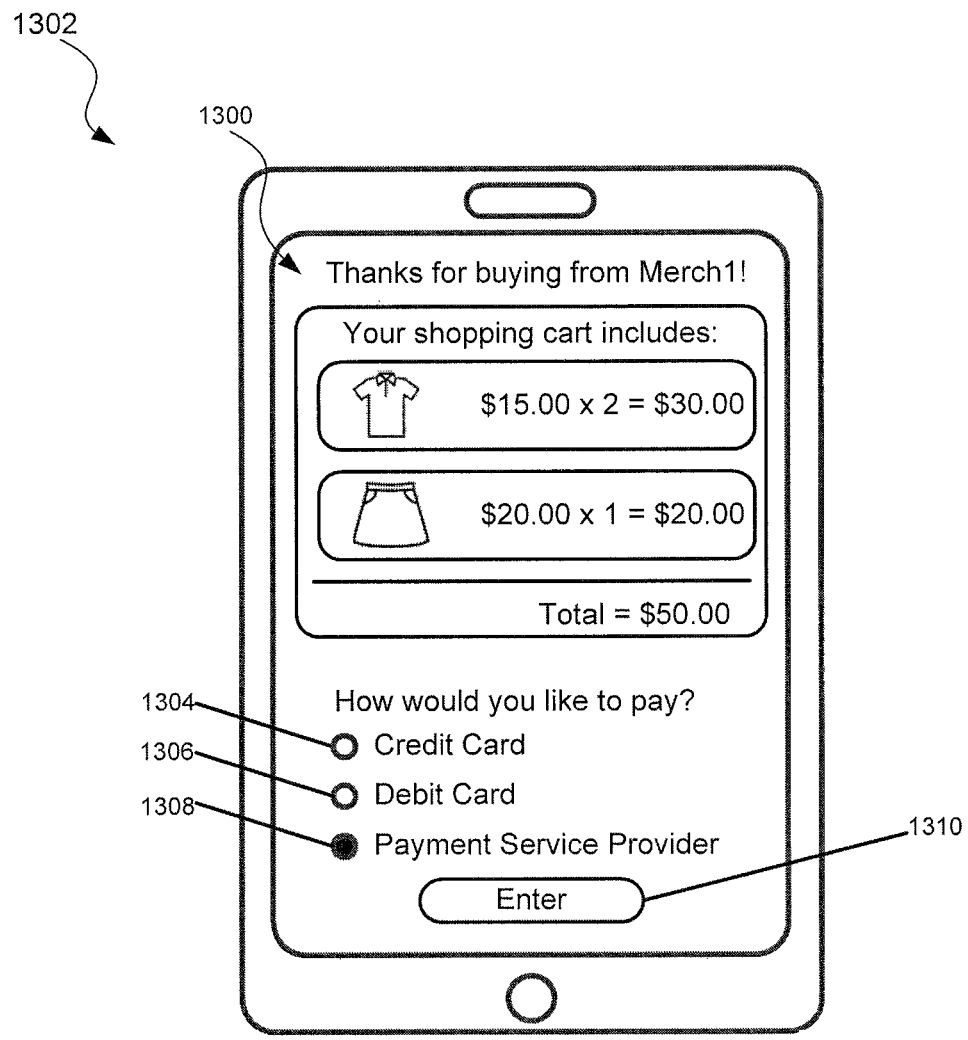
FIG. 13 is an example page that is displayed on a display of a user device by a merchant application.

FIG. 13 is an example page 1300 that is displayed on a display of a user device 1302 by a merchant application. The merchant application may be provided by a merchant "Merch1," which provides the items for sale. Content of page 1300 includes the user's selected item(s) along with the price and various ways for the user to pay for those item(s). For example, page 1300 includes the option to pay with a credit card via user selectable object 1304, debit card via user selectable object 1306, or an account the user has with a payment service provider via user selectable object 1308. The user's user account with the payment service provider is linked to one or more methods of payment, which may include the user's credit card, debit card, bank account (e.g., checking account), or digital wallet, and/or other forms of payment, etc. to which the user has given the payment provider server permission to access. The user may select one of these options by selecting the appropriate user selectable object and selecting a user selectable object 1310, which is labeled "Enter," to confirm the transaction and submit a request to the merchant application to complete the transaction.

If the user selects user selectable object 1304 to pay with a credit card, the user may be provided with a prompt to enter credit card information. If the user selects user selectable object 1306 to pay with a debit card, the user may be provided with a prompt to enter debit card information. If the user selects user selectable object 1308 to pay with the account the user has with the payment service provider, the merchant application may redirect the user device to the payment service provider for authentication of the user to the payment service provider. The merchant application may also have an account setup with the payment service provider in order to receive payments from users.

Figure 14A:
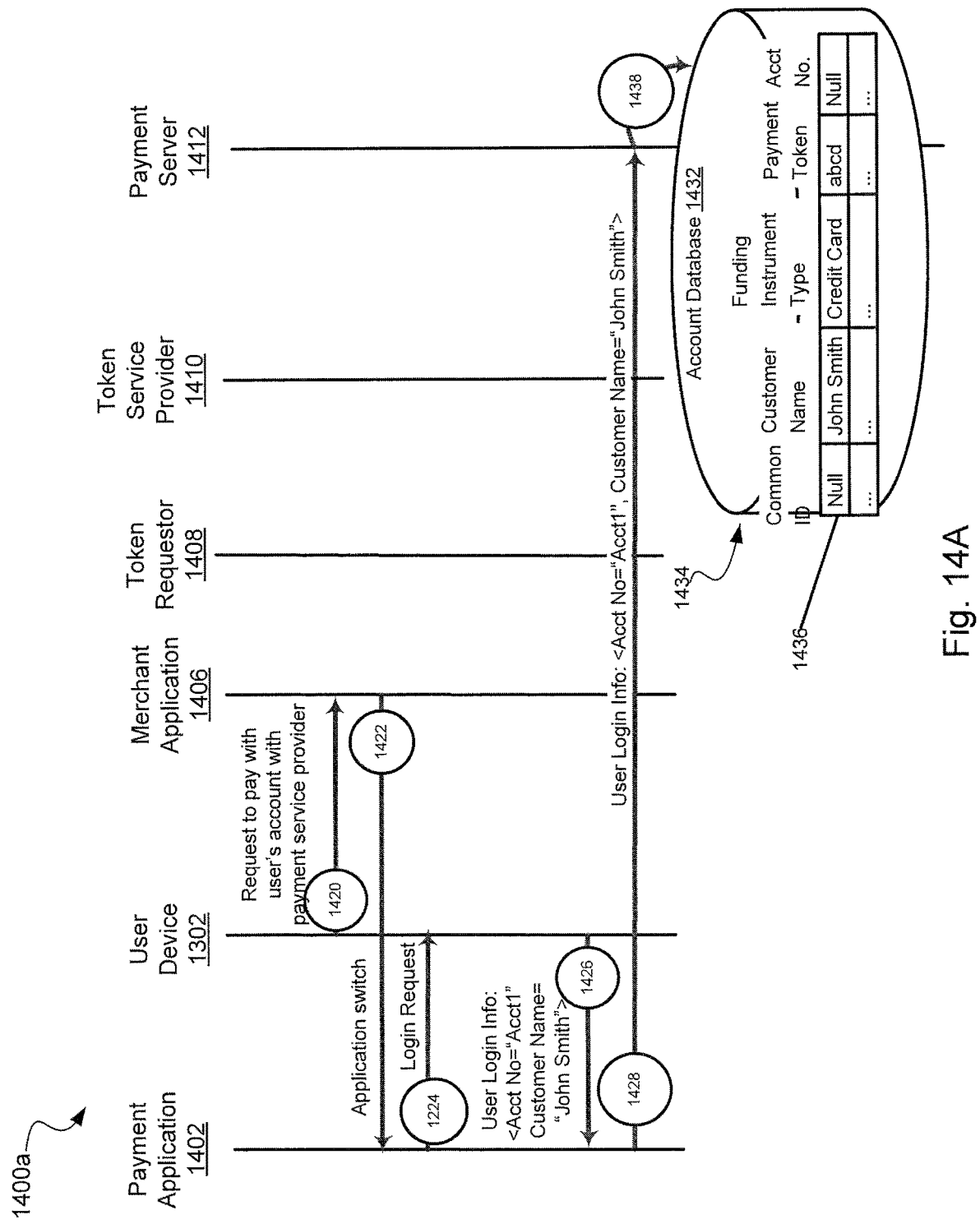
FIGS. 14A, 14B, and 14C is an example process flow for binding a user's information to the user's payment service provider account.
Figure 14B:
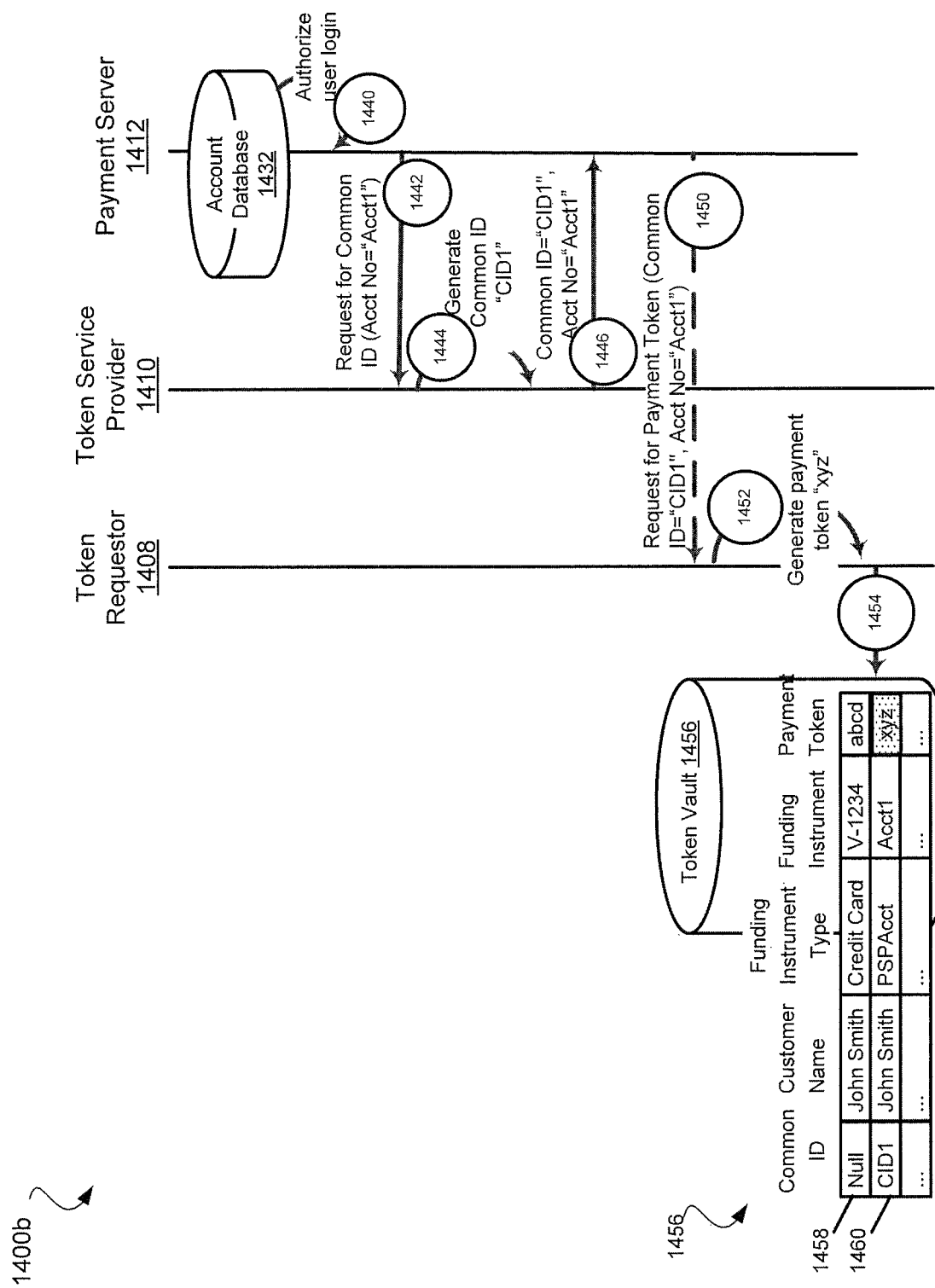
Figure 14C:
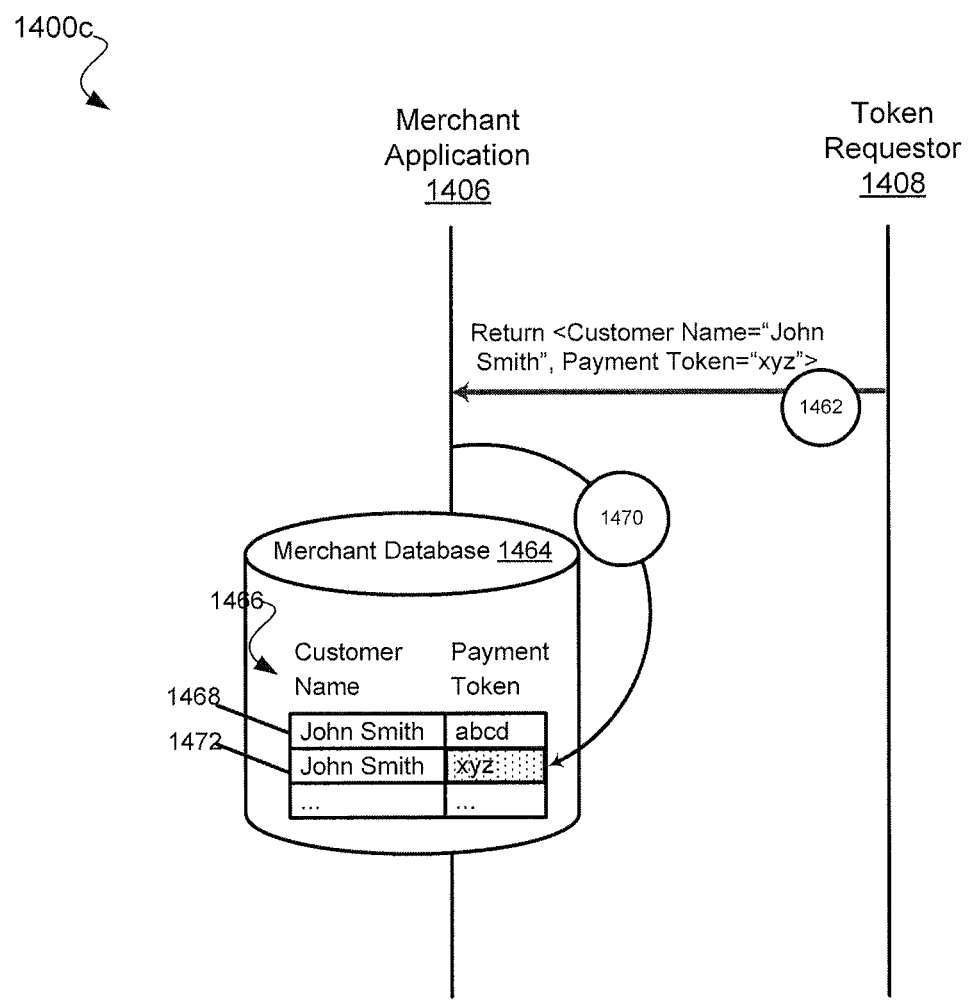

FIGS. 14A, 14B, and 14C is an example process flow 1400*a*, 1400*b*, and 1400*c* for binding a user's information to the user's payment service provider account. Process flow 1400*a*, 1400*b*, and 1400*c* shows interactions between a payment application 1402, user device 1302, merchant application 1406, token requestor 1408, token service provider 1410, and payment server 1412. A customer may use user device 1302 to execute actions to complete a payment transaction with merchant application 1406. A "customer" may also be referred to as a "user" in the present disclosure, and these two terms may be used interchangeably. The payment service provider, token requestor 1404, and token service provider 1406 may communicate with each other to generate identifiers (IDs) and bind the user's information with these IDs to assist in identifying the user and her account with the payment service provider for future payments.

In some examples, token requestor 1408, token service provider 1410, and/or the payment service provider are maintained by the same entity. In some examples, token requestor 1408, token service provider 1410, and/or the payment service provider are maintained by different entities and are in a trusted relationship with each other. In an example, token requestor 1408 is BRAINTREE®, which specializes in mobile and web payment systems for companies, token service provider 1410 is PAYPAL®, which provides an online payment system to users, and payment application 1402 and payment server 1412 are provided by the payment service provider. In some examples, the payment service provider is VENMO®, which provides a digital wallet to a user for making and sharing payments with other users. In this example, the user's VENMO® account may be used to pay the merchant, and may include one or more payment methods. A payment method may be, for example, a credit card, debit card, bank account, and/or a balance that the user has with the payment service provider. To complete the transaction, the payment method may be charged and the merchant may be credited the transaction amount. It should also be understood that token service provider 1410 and/or token requestor 1408 may be part of the payment service provider. In an example, token service provider 1410 is part of the payment service provider and issues tokens, and the payment service provider processes these tokens.

The merchant may provide merchant application 1406 to users. In an example, the user may receive merchant application 1406 already installed on user device 1302. In another example, the user may download merchant application 1406 onto user device 1302. In an example, payment application 1402 is a mobile app installed on the user device. In another example, payment application 1402 is a web application accessible via a URL to which a browser executing on the user device points. Token requestor 1404 may process payments for merchant application 1402, and merchant application 1402 may accept payments from the payment service provider.

The user may interact with a merchant to buy an item, which may be a good or service offered by a merchant via merchant application 1406. In FIG. 14A, at an action 1420, user device 1302 sends a request to pay with the user's account with the payment service provider to merchant application 1406. In an example, the user uses user device 1302 to select user selectable object 1308 displayed on page 1300 to send the request to pay with the user's account. In some examples, the user may interact with payment application 1402 while merchant application 1406 is active on user device 1302 because services of payment application 1402 may be accessible via merchant application 1406. The user's request to pay with her payment service provider account may be a request to use a funding instrument (e.g., VENMO® account) that is provided by the payment service provider to pay for the transaction. The funding instrument is a payment source for the transaction. For example, the payment service provider is VENMO®, and the funding instrument is the user's VENMO® wallet, which may include one or more payment methods (e.g., credit card, debit card, checking account, etc.). In this example, the payment service provider is a source of the funding instrument.

At an action 1422, merchant application 1406 receives the request to pay with the user's payment service provider account and switches the active application on user device 1302 to payment application 1402. An active application refers to the application that is currently displaying data on user device 1302. Merchant application 1406 may switch the active application on user device 1302 to payment application 1402 by redirecting the user device to the payment application. In an example, merchant application 1406 activates payment application 1402, which may be installed on user device 1302, to display data on user device 1302. In another example, merchant application 1406 triggers a browser executing on user device 1302 to point to a URL that references content provided by payment application 1402.

Payment application 1402 may perform actions to authenticate the user. At an action 1424, payment application 1402 sends a page including a login request to user device 1302 for authentication to the payment service provider. At an action 1426, user device 1302 sends the user's login information to payment application 1402. In the example illustrated in FIG. 14A, the user's login information includes the user's account number, which is specified as "Acct1," and the customer's name, which is specified as "John Smith." This is not intended to be limiting and the user login information may include additional or different information from that shown in FIG. 14A. In an example, the login information also includes the user's user credentials, which may be the user's username and password.

At an action 1428, payment application 1402 receives the user login information from user device 1302 and sends the user login information to payment server 1412. Once the user has authenticated herself to payment application 1402, payment application 1402 may identify the user and therefore may send an account number or identifier that can uniquely identify that user back to payment server 1412. In an example, payment application 1402 sends the user's account number or some derived identifier of the account number and a session ID to payment server 1412 to identify the user for future interactions. Payment server 1412 may be coupled to an account database 1432 that stores user account information. Account database 1432 may be maintained by the payment service provider and be used to authenticate users desiring to access services of the payment service provider. Account database 1432 includes a user account table 1434 having a Common ID, Customer Name, Funding Instrument Type, Payment Token, and Acct No columns. User account table 1434 includes an entry 1436, which specifies that a user having the customer name "John Smith" is associated with a credit card funding instrument type and a payment token "abcd." In an example, the funding instrument is a credit card "V-1234" (e.g., a VISA® credit card having the last four digits "1234"), and a credit card company provided the user with this credit card for authorizing payment for goods or services on credit. Entry 1436 was pre-existing from a previous interaction where the same customer shared her credit card information as the funding instrument.

Payment server 1412 may successfully authenticate the user if an entry in user account table 1434 includes the customer name specified in the user login information in the Customer Name field and also includes the account number specified in the user login information in the Payment Card field. If payment server 1412 does not find the provided login information in account database 1432, payment server 1412 may determine that the user authentication failed. In this example, payment server 1412 may send an error message indicating that the provided login information failed to payment application 1402, which may then display this error message to the user. Actions 1424, 1426, 1428, and 1438 may then be repeated. For example, payment application 1402 may send the user another login request, the user may again enter login information into user device 1302 again, and so on.

Payment server 1412 may allow the user a threshold number of failed login attempts before blocking the user from providing her login information again. For example, the provided login information may include a customer name stored in account database 1432, but not the correct account number corresponding to this customer name. In this example, payment server 1412 may lock the account corresponding to the customer name until the user contacts the payment service provider through a communications medium approved by the payment service provider. For example, the payment service provider may request the user to call the token service provider at a particular number, send a text message to the payment service provider with a particular code, and/or send an email to the payment service provider, etc., to unlock the user's account. After the user's account is unlocked, actions 1424, 1426, 1428, and 1438 may be repeated again.

If payment server 1412 finds the provided login information in account database 1432, process flow may proceed from action 1438 to an action 1440 in FIG. 14B, in which payment server 1412 successfully authenticates the user and authorizes the user login. If payment server 1412 authenticates the user, the payment service provider knows the identity of the user and also that the user is attempting to complete a payment transaction with a merchant. After payment server 1412 authorizes the user login, process flow may proceed from action 1440 to an action 1442, in which payment server 1412 sends a request for a common identifier (ID) to token service provider 1410. The request for the common ID also includes the account number provided in the user login information (and belonging to the user "John Smith"). Payment server 1412 may request a common ID from token service provider 1410 if the user desires to pay a merchant using an account she has with the payment service provider (see action 1420 in FIG. 14A).

At an action 1444, token service provider 1410 receives the common ID request including the account number "Acct1" from payment server 1412, and generates a common ID "CID1" that corresponds to the user's "Acct1." A common ID may vary from context to context. For example, in the context in FIGS. 14A-14C, the user's identity on her account with the payment service provider is bound to the partner requesting the common ID. For example, payment server 1412 may request a common ID for an authenticated user, and would be provided with common ID "CID1." At a later point in time, if another partner offers the user the ability to pay with the payment service provider and this partner requests a common ID for the same user, token service provider 1406 may generate a common ID "CID2," which is different from the common ID issued to the first partner. Merchant application 1402 may be unaware of the common ID. As will be explained further below, the user's account with the payment service provider (VENMO® account) will be bound to a common ID. In an example, this binding happens once between the user's identity on the payment service provider and the user's identity on token service provider 1406 (e.g., common ID "CID1"). In this example, for a single binding, a single common ID (e.g., "CID1") may be common across any merchant that the payment service provider is made available on.

Payment server 1412 may recognize "Acct1," which was included in the user login information in actions 1426 and 1428, as being the user's requested funding instrument in relation to the user's account with the payment service provider. Accordingly, payment server 1412 may include "Acct1" in the request for a common ID to token service provider 1410 so that token service provider 1410 provides both "Acct1" and the generated common ID back to payment server 1412. In this way, payment server 1412 may easily pair these two parameters together and know to associate the common ID "CID1" with "Acct1."

A common ID is a non-transactable token that is used to identify an associated underlying funding instrument (e.g., "Acct1") associated with a transaction. A non-transactable token refers to a token that if sent over a card network (e.g., credit card network) would not be routable back to the originator of the token. For example, a credit card network that receives this non-transactable token may not recognize its originator or how to get it back to its originator. An originator of a token may refer to the entity that generated the token. Additionally, an originator of a token may also refer to an entity that has a trusted relationship with the entity that generated the token. In an example, the originator is token service provider 1410 and generates a common ID in the context of a user request to charge the user's account with the payment service provider to pay for a transaction with a merchant. In an example, the common ID is a 16-19 digit number starting with an "8."

The common ID may be an attribute that is used to uniquely represent a relationship between the user, the commerce partner/merchant (e.g., merchant application 1406), and the payment service provider/payment instrument (e.g., the user's payment service provider account). A partner may refer to a merchant that has a relationship with the payment service provider. The common ID may be an internal construct and can be used by commerce partners of the payment service provider. The common ID may be used to aggregate transactions and for account management. Additionally, the common ID may be transparent to the user and be used to identify the user as a consumer of a good or service. The common ID may be defined as the combination of a merchant/social commerce partner ID, and/or the identity of the user on the partner and/or the funding instrument/wallet information of the user. The exact combination or configuration differs by use case and may be driven by product design and business need.

Moreover, the common ID may be associated with an ID of the merchant, an ID of the user requesting the transaction, and/or a funding instrument associated with the user. The common ID may indicate the user's consent for an entity (e.g., website, payment service provider, or bank, etc.) to perform a specific activity or set of activities in a given environment. For example, the common ID may indicate the user's consent for an entity to charge a funding instrument (e.g., the user's payment service provider account identified by "Acct1") corresponding to the common ID to complete a payment transaction. A charge to a funding instrument that corresponds to a common ID may refer to the charging of a payment method within the funding instrument. The common ID may enable users to experience seamless user experiences with security and context-based data sharing with appropriate controls. In an example, the common ID is a 13-digit number.

At an action 1446, token service provider 1410 sends the common ID "CID1" and account number "Acct1," which are both associated with John Smith's account, to payment server 1412. At an action 1450, payment server 1412 sends a request for a payment token to token requestor 1408. The payment token request also includes the common ID "CID1" and account number "Acct1" associated with John Smith's account. Action 1450 is associated with a dashed line to indicate a "notification" type event that is triggered by the common ID creation. At an action 1452, token requestor 1408 receives the payment token request including the common ID "CID1" and the account number "Acct1," and generates a payment token "xyz." A payment token may be an internal construct issued by token requestor 1404 to commerce partners of token requestor 1404 and/or the payment service provider. As will be explained further below in relation to FIGS. 16A-16D, the payment token "xyz" is a non-transactable token that may be used as a handle to John Smith's account corresponding to the funding instrument "Acct1."

At an action 1454, token requestor 1408 stores the payment token "xyz" into a token vault 1456. Token requestor 1408 maintains token vault 1456 and stores information associated with user accounts and their associated payment tokens and common IDs (if applicable) into the token vault. Token vault 1456 includes a user account table 1456 having Common ID, Customer Name, Funding Instrument Type, Funding Instrument, and Payment Token columns. In user account table 1456, a first entry 1458 indicates that John Smith (customer name field) has a credit card (funding instrument type field) identified by "V-1234" (funding instrument), which corresponds to a payment token "abcd." Token requestor 1408 previously generated the payment token "abcd" and stored this payment token into token vault 1456. Accordingly, token requestor 1408 has information about John Smith's credit card and knows that this funding instrument is stored in token vault 1456.

A second entry 1460 indicates that John Smith has an account "PSPAcct" provided by the payment service provider (funding instrument type field) and this account corresponds to an underlying funding instrument "Acct1," which corresponds to the payment token "xyz." As discussed above, the payment token "xyz" was generated by token requestor 1408 at action 1452 and corresponds to the common ID "CID1" generated by token service provider 1410 at action 1444. Accordingly, the user's payment service provider account is bound to the payment token and the common ID. Token requestor 1404 may bind the user's payment service provider account to the payment token and common ID by inserting them into the same entry in user account table 1456. Token requestor 1404 may asynchronously send this information to the payment service provider as soon as token requestor 1404 has this new binding created between the user's payment service provider account and the user's identity on token requestor 1404.

Token requestor 1408 maps the payment token "xyz" to the common ID "CID1" included in the payment token request by inserting them into the same entry. In response to receiving a payment token request from payment server 1412, token requestor 1408 may know that the payment token is being generated for a funding instrument type provided by the payment service provider. Additionally, token requestor 1408 may know that "Acct1" belongs to John Smith because token requestor 1408 is in a trusted relationship with the payment service provider. Although token requestor 1404 and the payment service provider are in a trusted relationship, it may be possible that token requestor 1404 knows nothing more about the user's identity other than the common ID associated with the user's payment service provider account, where "Acct1" is a unique account number. The common ID "CID1" may identify "Acct1" as the funding instrument to be charged for the user's payment transaction if the user desires to pay a merchant with her payment service provider account (e.g., VENMO® account or wallet).

Process flow may proceed from action 1454 to an action 1462 in FIG. 14C, in which token requestor 1408 returns the user's customer name "John Smith" and payment token "xyz" to merchant application 1406. Merchant application 1406 maintains a merchant database 1464 including a customer-token table 1466 having Customer Name and Payment Token columns. Customer-token table 1460 includes a first entry 1468 specifying that John Smith (customer name field) is associated with the payment token "abcd." At an action 1470, merchant application 1406 inserts an entry 1472 including the customer's name "John Smith" and payment token "xyz" into customer-token table 1466. Second entry 1472 specifies that John Smith is associated with the payment token "xyz." Accordingly, merchant application 1406 has possession of a payment token that is associated with the user and also associated with a funding instrument type provided by the payment service provider.

In the future, if the user "John Smith" sends a request to merchant application 1406 to pay using a particular funding instrument (e.g., credit card or account with the payment service provider), merchant application 1406 may retrieve the appropriate payment token from merchant database 1464 and provide the payment token to token requestor 1408 for further transaction processing. Token requestor 1404 may process transactions for merchants. In keeping with the above examples, the payment token "abcd" corresponds to funding instrument "V-1234," and the payment token "xyz" corresponds to the funding instrument "Acct1." Each time the user selects to pay with her credit card (e.g., by selecting user selectable object 1304 on page 1300 in FIG. 13), merchant application 1406 may receive the user's request to pay with her credit card, identify the payment token "abcd" corresponding to the payment option, and send the payment token "abcd" to token requestor 1404 for further processing. In contrast, each time the user selects to pay with her account with the payment service provider (e.g., by selecting user selectable object 1308 on page 1300 in FIG. 13), merchant application 1406 may receive the user's request to pay with the payment service provider, identify the payment token "xyz" corresponding to the payment option, and send the payment token "xyz" to token requestor 1404 for further processing. Processing of the payment token leads to identification of the underlying funding instrument that should be charged to complete the requested payment.

As will be explained in further detail below, token requestor 1408 may obtain a transactable token "T1" corresponding to the common ID and representative of the transaction associated with action 1420. Token requestor 1408 may route the transactable token to a card network, which determines the originator of the transactable token. The card network may then return the transactable token back to the originator, which is token service provider 1406. Token service provider 1406 receives the transactable token from the card network and de-tokenizes the transactable token. Token service provider 1406 identifies, based on de-tokenizing the transactable token, the common ID and identifies the funding instrument corresponding to the common ID. Token service provider 1406 sends a charge request to the payment server 1412, where the charge request may specify the funding instrument "Acct1," transaction amount "$50," and the merchant's ID.

Payment server 1412 receives the charge request and selects a payment method within the funding instrument to charge for the transaction. Payment server 1412 sends a charge request including a set of parameters to an issuing bank that approves or rejects charges to the payment method. The set of parameters includes the payment method, the user's name "John Smith," and an amount of the transaction "$50." The issuing bank approves or rejects the charge request to the payment method and sends a charge response to payment server 1412. The charge response specifies the approval or rejection of the charge to the payment method. Payment server 1412 receives the charge response from the issuing bank. If the charge response specifies an approval of the charge to the payment method, payment server 1412 forwards a success message to the token service provider 1406, which forwards the success message to merchant application 1402, which forwards the success message to user device 1302. If the charge response specifies a rejection of the charge to the payment method, payment server 1412 forwards a reject message to the token service provider 1406, which forwards a reject message to merchant application 1402, which forwards a reject message to user device 1302.

Figure 15:
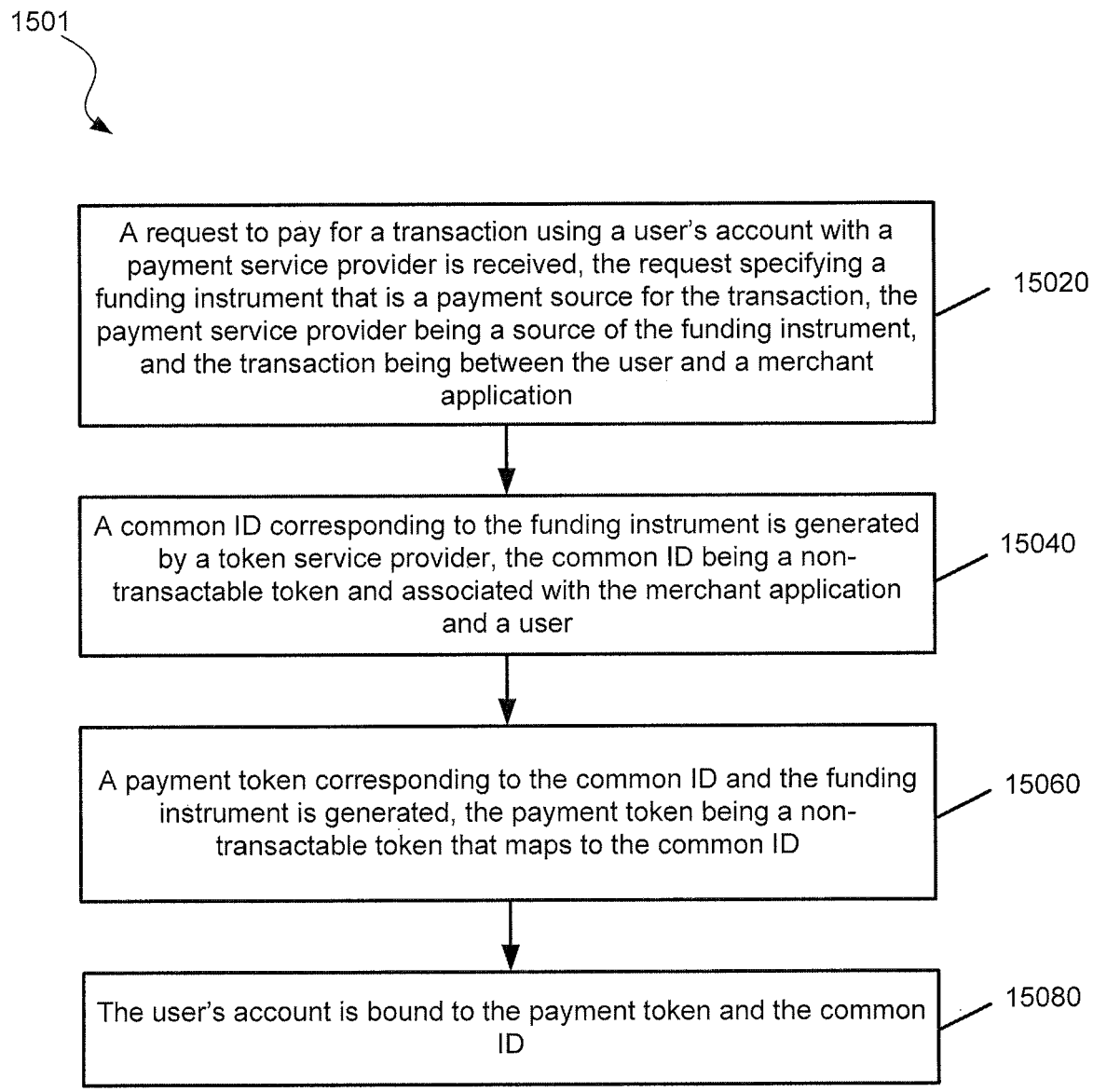
FIG. 15 is a flowchart illustrating an example method of binding the user's information to the user's payment service provider account.

FIG. 15 is a flowchart illustrating an example method 1501 of binding a user's information with the user's payment service provider account. Method 1501 is not meant to be limiting and may be used in other applications other than the payment applications discussed below. Method 1501 includes steps 15020, 15040, 15060, and 15080.

At a step 15020, a request to pay for a transaction using a user's account with a payment service provider is received, the request specifying a funding instrument that is a payment source for the transaction, the payment service provider being a source of the funding instrument, and the transaction being between the user and a merchant application. In an example, payment application 1402 receives a request to pay for a transaction using a user's account with a payment service provider, the request specifying a funding instrument that is a payment source for the transaction, the payment service provider being a source of the funding instrument, and the transaction being between the user and a merchant application. In an example, the funding instrument that is the payment source for the transaction is the user's account with the payment service provider.

At a step 15040, a common ID corresponding to the funding instrument is generated by the token service provider, the common ID being a non-transactable token and associated with the merchant application and user. In an example, token service provider 1410 generates a common ID "CID1" corresponding to the funding instrument "Acct1," the common ID "CID1" being a non-transactable token and associated with merchant application 1406 and the user. The common ID is issued against the user's account with the payment service provider. For example, the common ID "CID1" is issued for the user's VENMO® account.

At a step 15060, a payment token corresponding to the common ID and funding instrument is generated, the payment token being a non-transactable token that maps to the common ID. In an example, token requestor 1408 generates the payment token "xyz" corresponding to the common ID "CID1" and funding instrument "Acct1," the payment token "xyz" being a non-transactable token that maps to the common ID "CID1." At a step 15080, the user's payment service provider account is bound to the payment token and the common ID. In an example, token requestor 1408 binds John Smith's payment service provider account to the payment token and common ID by inserting this information into a common entry in token vault 1456.

It should be understood that additional processes may be performed before, during, or after steps 15020, 15040, 15060, and/or 15080 discussed above. It is also understood that one or more of the steps of method 1501 described herein may be omitted, combined, or performed in a different sequence as desired.

After the user's account is bound to the payment token and common ID, merchant application 1402 may send that payment token "xyz" to token requestor 1408 in response to the user selecting to pay with the user's payment service provider account. The binding may happen once such that when merchant application 1402 sends the payment token "xyz" to token requestor 1408, token requestor 1408 may identify the common ID "CID1" corresponding to the user's account and set into motion actions that charge the user's payment service provider account.

Figure 16A:
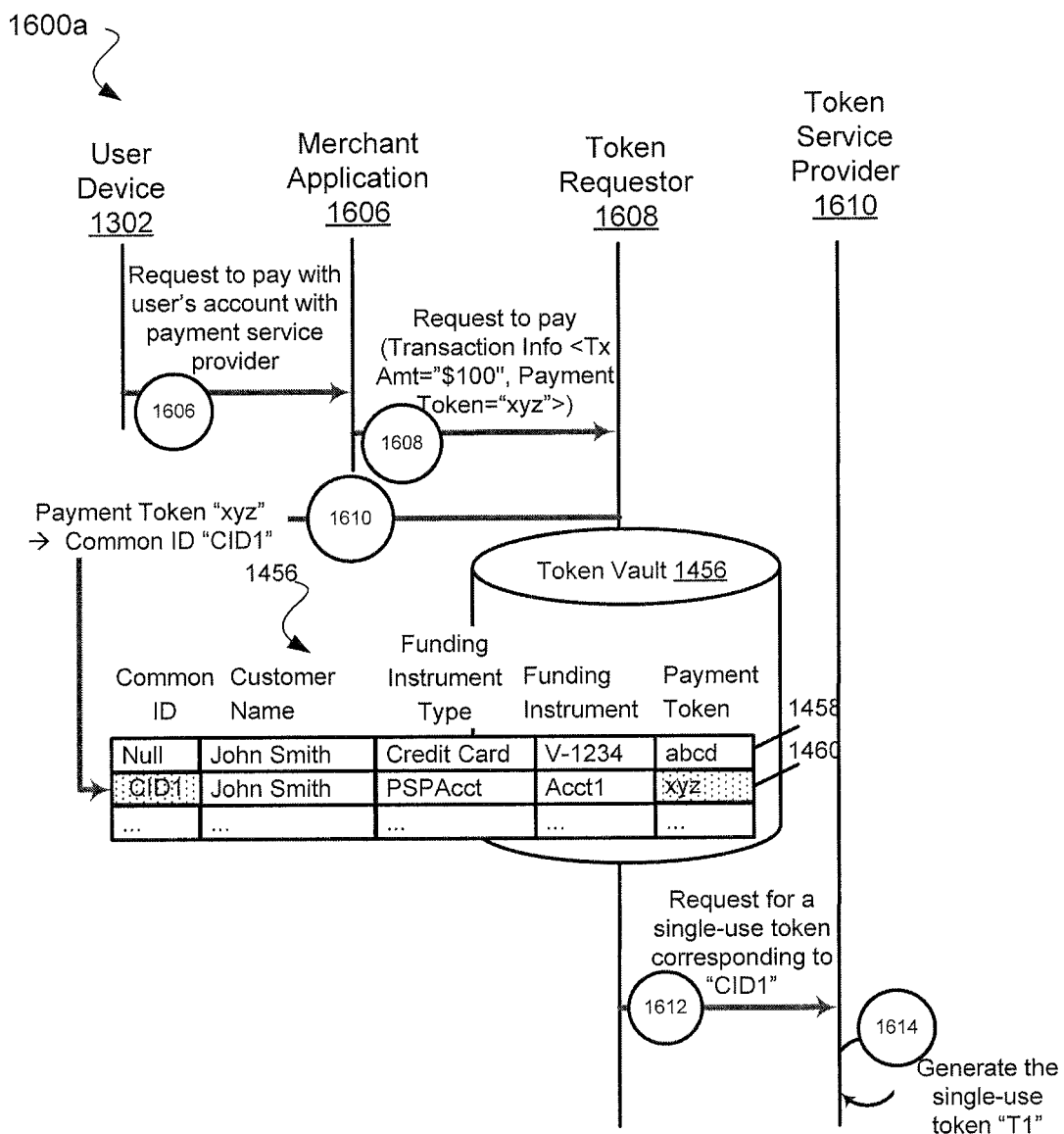
FIGS. 16A, 16B, 16C, and 16D is an example process flow for charging an underlying funding instrument associated with a user's request to pay with her account with the payment service provider.

FIGS. 16A, 16B, 16C, and 16D is an example process flow 1600a, 1600b, 1600c, and 1600d for charging an underlying funding instrument associated with a user's request to pay with her account with the payment service provider. If the funding instrument is the user's account with the payment service provider, charging the funding instrument refers to charging a payment method (e.g., credit card or checking account) within the funding instrument. Process flow 1600a, 1600b, 1600c, and 1600d shows interactions between user device 1302, merchant application 1406, token requestor 1408, token service provider 1410, payment server 1412, card network 1602, and issuing bank 1604 that lead to the underlying funding instrument associated with the user's payment service provider account being charged. In FIG. 16A, at an action 1606, user device 1302 sends a request to pay with the payment service provider to merchant application 1406. In an example, a user may desire to pay for an item and complete a transaction by using an account the user has with the payment service provider. In an example, the payment service provider is VENMO®, and the user desires to use her VENMO® account to pay the merchant.

At an action 1608, merchant application 1406 receives the request to pay with the user's payment service provider account from user device 1302, and sends the user's request to pay including transaction information to token requestor 1408. Token requestor 1408 may process payments for merchant application 1406. In an example, merchant application 1406 is registered with token requestor 1408. The transaction information is associated with the request to pay with the user's payment service provider account and includes the transaction amount "$100" and a payment token "xyz," which was previously generated by token requestor 1408 and stored in token vault 1456 (see actions 1452 and 1454 in FIG. 14B). The transaction information may be sent to token requestor 1408 in a variety of ways. In an example, merchant application 1406 invokes an application programming interface (API) exposed by token requestor 1408 or the payment service provider to cause the payment transaction information to be sent to token requestor 1408.

Token requestor 1408 receives the request to pay including the transaction information from merchant application 1406. At an action 1610, token requestor 1408 searches token vault 1456 for an entry including the payment token "xyz" and determines whether the payment token corresponds to a common ID. A payment token may correspond to a common ID if the common ID field has a value of a particular format (e.g., a 13-digit format, one or more alphanumeric symbols, etc.). In response to a determination that the payment token "xyz" is not stored in token vault 1456, token requestor 1408 may send a reject transaction message to the merchant application.

In the example illustrated in FIG. 16A, an entry 1458 includes the payment token "abcd," which does not correspond to a common ID because the Common ID field in this entry has a null value. This is not intended to be limiting, and a particular value may be different from null to indicate that a payment token does not correspond to a common ID. For example, payment tokens that do not correspond to common IDs may have a "0" stored in the entry's Common ID field.

A payment token that does not correspond to a common ID may identify a funding instrument in its corresponding entry that can be charged for the transaction and sent over a card network for re-routing to the funding instrument source. For example, referring to entry 1458, token requestor 1408 may charge the funding instrument "V-1234" to pay for a transaction if the token requestor receives the payment token "abcd" from a merchant application. In this example, token requestor 1404 may send a charge request specifying the funding instrument "V-1234," customer's name "John Smith," and transaction amount "$100" to the card network, which may be a credit card network. The credit card network may receive the charge request and determine that a particular credit card company issued the funding instrument "V-1234" identified in the charge request. The credit card company that issued the funding instrument "V-1234" may be referred to as the source of the funding instrument or funding instrument source. The credit card network may route the charge request to the funding instrument source, which may then charge the transaction amount to the credit card "V-1234."

In the example illustrated in FIG. 16A, token requestor 1408 determines that the payment token "xyz" corresponds to the common ID "CID1" because this payment token and common ID are associated with the same funding instrument "Acct1" and funding instrument type. As discussed above, token service provider 1406 generates the common ID "CID1" in response to a common ID request from payment server 1412 (see actions 1442 and 1444 in FIG. 14B). Additionally, the common ID corresponds to "Acct1." If token requestor 1408 determines that the payment token corresponds to a common ID, token requestor 1408 may determine that additional information should be requested before it is possible to charge the funding instrument in entry 1460 in order to complete the transaction. For example, token requestor 1408 and a card network may be unaware of how to charge the funding instrument "Acct1" of the "PSPAcct" funding instrument type in entry 1460 because "Acct1" is not an actual funding instrument outside of the context of token service provider 1410 or the payment service provider. The funding instrument "Acct1" in this example represents the user's account with the payment service provider (e.g., VENMO® wallet) as a whole opaque container and not a chargeable funding instrument within this account. Additionally, unlike the above example in which token requestor 1408 sends the funding instrument "V-1234" in entry 1458 over the credit card network, the funding instrument "Acct1" specified in entry 1460 may not be understandable by the credit card network.

The funding instrument houses one or more payment methods that may be charged in order to complete the transaction. To gather more information to identify the appropriate payment method within the funding instrument to charge for the payment transaction, token requestor 1408 sends a request for a transactable token corresponding to the common ID "CID1," which corresponds to the payment token "xyz," to token service provider 1410. In an example, the transactable token may be a single-use token that can be consumed once and then exhausted. At an action 1612, token requestor 1408 sends a request for a single-use token corresponding to the common ID "CID1" to token service provider 1410. Token requestor 1408 may send the request for the single-use token along with the common ID "CID1" in a variety of ways. In an example, token requestor 1408 invokes a tokenization API that is exposed by token service provider 1410 and that causes token service provider 1410 to generate a transactable token.

The transactable token may represent a manifestation of the common ID in real time that allows for the enablement of specific transaction(s) in the context and parameter set(s) as defined by the user, environment, and/or token service provider. The single-use token may represent a particular transaction, and each time the user desires to pay with her account provided by the payment service provider, token requestor 1408 may request a transactable token representing the particular transaction from token service provider 1410. The transactable token may be used for payment or non-payment purposes. In some examples, the transactable token serves as a proxy for a funding instrument or an account with the payment service provider. The transactable token may be an open loop or closed loop ID that serves as a proxy for conveying the user's consent for a particular transaction and for a specific environment. The particular transaction may be a financial or a non-financial transaction corresponding to a specific interaction for that specific environment. An open loop may refer to an ID that is sufficiently recognizable to be routable by existing routing networks (e.g., credit card company networks) back to the token service provider (e.g., PAYPAL®) or other such appropriate ecosystems based on the context of the transaction. A closed loop may refer to an ID that is recognizable only by the token service provider that issued the token or limited ecosystem based on business needs.

Token service provider 1410 receives the request for the single-use token corresponding to the common ID "CID1." At an action 1614, responsive to the single-use token request, token service provider 1410 generates a single-use token "T1" that corresponds to the common ID "CID1." As will be explained further below, a single-use token may eventually be routed back to the token service provider, and consumed once and then exhausted by the payment service provider.

Additionally, token service provider 1410 may issue the single-use token and define a set of parameters surrounding the single-use token. One or more parameters of the set of parameters may include, but are not limited to, a card network (e.g., the name of a credit card company's network); a time to live, which is the period from the moment of issuance until the transactable token expires or is no longer valid (e.g., 140 seconds, 140 minutes, 14 minute, 8 hours, 14 days, 14 year, etc.); scheme/BIN (e.g., debit, credit, prepaid, or token); currency accepted (e.g., US dollars, Euro, Canadian dollar, Vietnamese dong, etc.); merchant type (MCC) (e.g., digital goods, travel, online retail store, etc.); merchant information, which may include a choice of merchant preferences such as funding sources, brands, closed loop, dollar limits, etc.; merchant location, which may be the country in which the merchant is registered (e.g., United States or Canada), terminal location (e.g., Global Positioning System coordinates or registered card reader terminal location), or whether the merchant is online only or offline only; consumer location radius (e.g., GPS coordinates of the user's mobile device); security features (e.g., cryptogram required or step-up authentication required); routing mechanism (e.g., open or closed loop); type of interaction, which may include funding (e.g., private label credit card (PLCC), points, cards, or banks), identity (e.g., access to hotel, gym or car or other environments that need identity verification), and contextual information (e.g., address, etc.); and amount (e.g., the amount that can be used for payment authorization using the token). Additionally, the transactable token may also have a maximum value that may be charged to the associated underlying funding instrument. In an example, the maximum value is the initial amount of the transaction (e.g., the transaction amount of $100 specified in the transaction information at action 1608).

In some examples, the transactable token includes an expiration date, a token ID, and a security context. The token ID may be a number that identifies the token and may be in the same format as a credit card or debit card number. The token ID may be thought of as a "transactable primary account number" (TPAN) because the token ID is not an actual credit card or debit card number that can be used as a funding source in and of itself, but is a representation of the transaction and can be used by the merchant to obtain funding for the transaction from the user's linked funding instrument.

Token service provider 1410 may generate a transactable token such that it is easily routable by a credit card network. In an example, the transactable token is a 16-digit number with an expiration date or expiration time (e.g., 140 minutes) and may be processed like a credit card or debit card. In this example, the transactable token may have the same format (e.g., 16-digit number) as a credit card or debit card, but may not be an actual credit card issued by a credit card company or debit card issued by a bank. It may be advantageous to generate a transactable token having the same format as a credit card or debit card because credit card networks are already configured to handle and route 16-digit card numbers to their originators. Accordingly, companies may be able to adopt techniques disclosed in the present disclosure without modifying their systems. In some examples, the token is replaced with a Cryptogram to provide additional security.

If the transactable token is a 16-digit number that is generated by token service provider 1410 and routed to a credit card network, the credit card network may identify the originator of the TPAN associated with the transactable token as being token service provider 1410 and thus route the transactable token back to token service provider 1410 for further processing. In this example, the transactable token may be routed to token service provider 1410 even though the transactable token is not a credit card or debit card transaction. In some examples, the security context is a security code. The security context may be in the same format as a CVV (card verification value) or CSC (card security context). In such an example, the security context may be a three digit number. The security context may be dynamic and change with each transaction. In an example, the expiration date is in the MM/YY format.

Figure 16B:
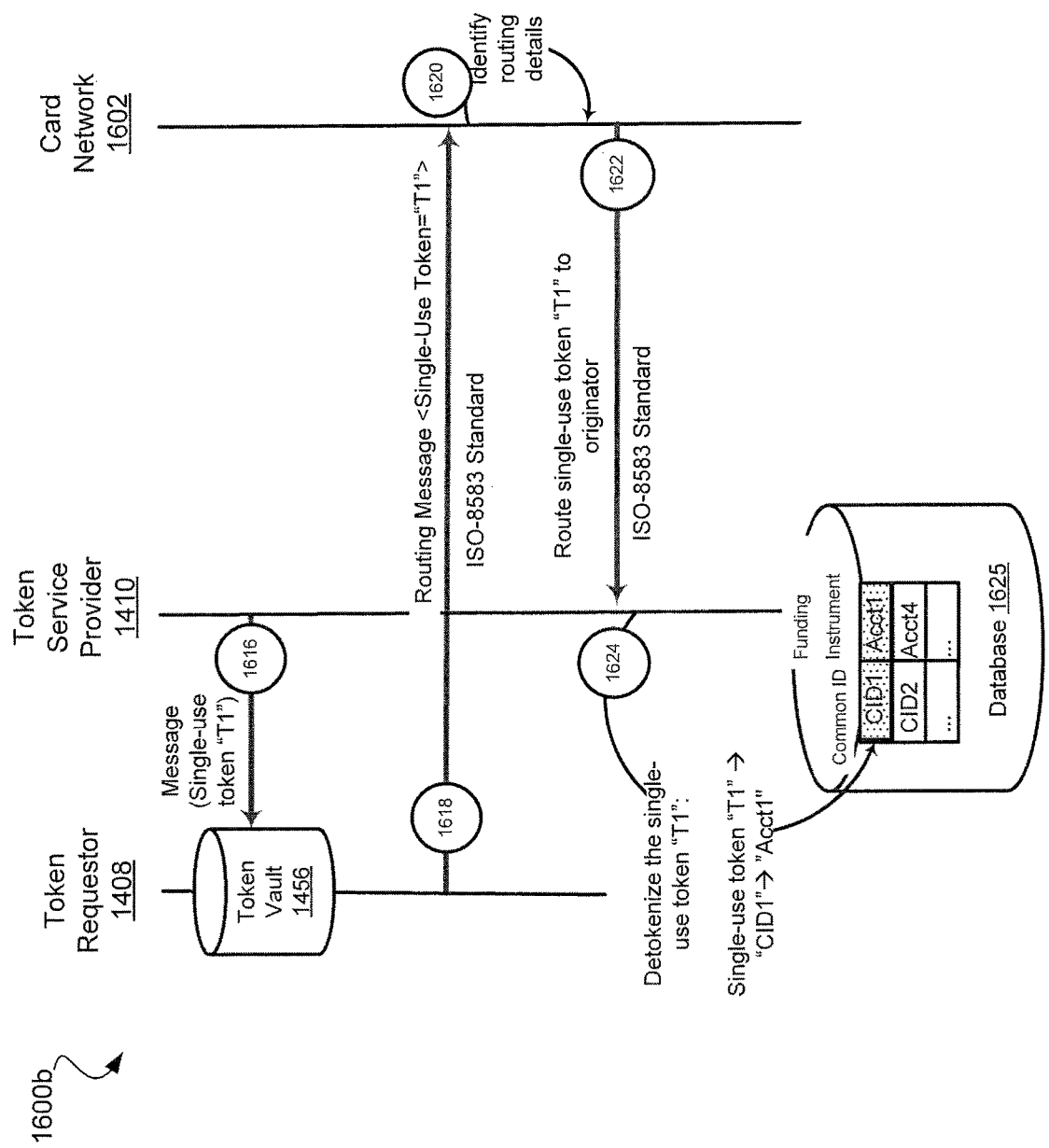
Figure 16C:
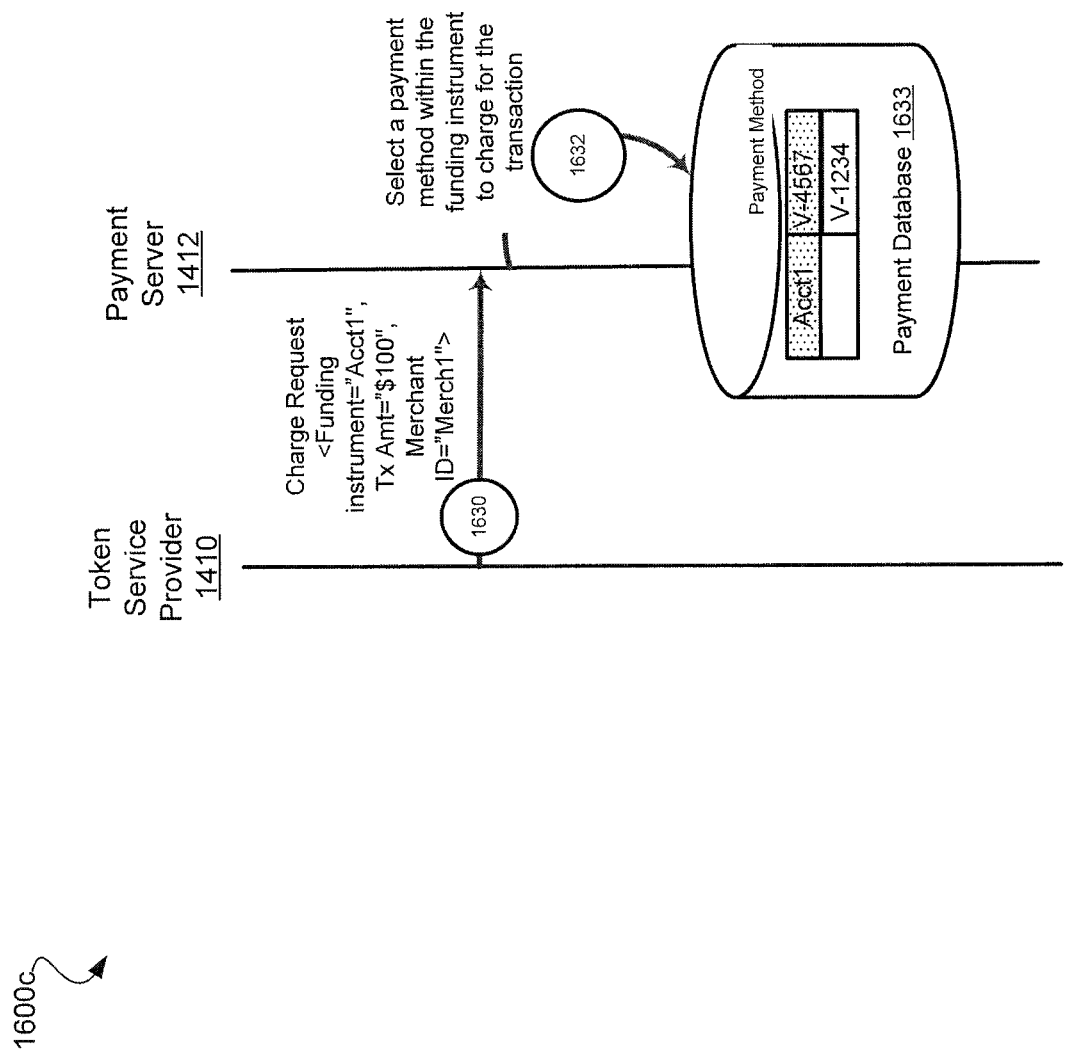

Process flow may proceed from action 1614 to an action 1616 in FIG. 16B, in which token service provider 1410 stores the single-use token "T1" in token vault 1456 maintained by token requestor 1408. Accordingly, token requestor 1408 possesses a single-use token "T1" that corresponds to the payment request in action 1606 and the common ID "CID1." Token service provider 1410 may store the single-use token at token vault 1456 in a variety of ways. In an example, token service provider 1410 invokes an API exposed by token requestor 1408 to cause the single-use token "T1" to be sent to token requestor 1408 and stored at token vault 1456. For example, the API may be a tokenization issuance API that is published and accessible to token service provider 1410.

Token requestor 1408 may push the transaction information associated with the payment request in action 1606 to a card network 1602. In an example, card network 1602 may be a credit card network, debit card network, automated clearing house (ACH), or other type of network that processes electronic financial transactions. At an action 1618, token requestor 1408 sends a routing message including the single-use token "T1" to card network 1602 for routing to the token's originator, which generated the token. In an example, the routing message is sent using the ISO-8583 standard, which has specified fields. For example, under the ISO-8583 standard, the routing message may include the merchant ID that identifies the merchant, merchant name, merchant category code (MCC) that specifies items provided by the merchant, and transaction amount.

Card network 1602 receives the message and routes the transaction information in accordance with the account type. For example, card network 1602 may identify the source of the single-use token "T1," and route the transaction information accordingly. At an action 1620, card network 1602 identifies the routing details associated with the single-use token "T1." At an action 1622, card network 1602 routes the single-use token "T1" back to the originator of the single-use token "T1." Card network 1602 may send the single-use token "T1" to token service provider 1410 using the ISO-8583 standard.

In an example, card network 1602 identifies token service provider 1410 as being the originator of the single-use token "T1." In this example, card network 1602 may identify the TPAN of the single-use token, and recognize that the first "X" digits of the TPAN belong to tokens generated by token service provider 1410, where X is a number greater than one. In an example, token service provider 1410 is VENMO®, and card network 1602 determines that the single-use token "T1" is representative of a VENMO® transaction. In this example, card network 1602 routes the single-use token "T1" back to VENMO®. In this way, the single-use token "T1" that was generated by token service provider 1410 and stored at token requestor 1408 is eventually returned to token service provider 1410.

At an action 1624, token service provider 1410 receives the single-use token "T1" that it previously generated, and de-tokenizes the single-use token "T1." Token service provider 1410 identifies transaction information in the single-use token by "de-tokenizing" it. The process of de-tokenizing a transactable token may include searching token vault 1456 to identify the underlying funding instrument to charge for the transaction specific to the transactable token. In an example, the underlying funding instrument is an account the user has with the payment service provider. In this example, the underlying funding instrument may include one or more payment methods, and one or more of these payment methods within the funding instrument may be charged to complete the transaction.

Token service provider 1410 generated the single-use token "T1" and thus has information about it. For example, token service provider 1410 knows the transaction for which the single-use token was generated and the common ID corresponding to the single-use token "T1." Token service provider 1406 maintains a database 1625 that stores common IDs and funding instruments corresponding to tokens generated by the token service provider. In an example, token service provider 1410 de-tokenizes the single-use token "T1" by identifying its corresponding common ID "CID1", and accordingly identifying the underlying funding instrument (e.g., the user's payment service provider account) corresponding to the common ID "CID1." In this example, "Acct1" corresponds to the common ID "CID1" and is a funding instrument of a "PSPAcct" type, which is an account provided by the payment service provider to the user.

As discussed, if the funding instrument to be charged is the user's account with the payment service provider, more information may be requested in order to charge the correct payment method within the funding instrument. In order for the appropriate payment method within the funding instrument to be charged, token service provider 1410 sends transaction information to payment server 1412. Process flow may proceed from action 1624 to an action 1630 in FIG. 16C, in which token service provider 1410 sends a charge request to payment server 1412. The charge request includes transaction information based on de-tokenizing the token. The charge request specifies the funding instrument "Acct1," transaction amount "$100," and merchant ID "Merch1," which identifies the merchant that provides merchant application 1402. The charge request provides payment server 1412 with information on which payment method within the funding instrument "Acct1" to charge and how much to charge in order to complete the transaction and pay the merchant as requested by the user. The transaction information included in the charge request may be sent to payment server 1412 in a variety of ways. In an example, token service provider 1410 invokes an API exposed by payment server 1412 to cause the identified transaction information in the de-tokenized token to be sent to payment server 1412.

At an action 1632, payment server 1412 selects a payment method within the funding instrument specified in the charge request to charge for the transaction. The payment method may be, for example, a credit card, debit card, checking account, etc., that is housed within the digital wallet (e.g., VENMO® account)/funding instrument. Payment server 1412 maintains a payment database 1633 including payment methods associated with the user's accounts. In payment database 1633, a payment method "V-4567" is housed within the funding instrument "Acct1." It should be understood that this is merely an example, and other payment method(s) may be housed within the funding instrument. In this example, payment server 1412 selects the payment method "V-4567," which is associated with "Acct1."

The funding instrument "Acct1" may be referred to as the payment source for the transaction, and a payment method within the funding instrument may be charged for the transaction. If the user has requested to pay with the user's payment service provider account, charging the funding instrument may refer to charging a payment method within the funding instrument. After the payment service provider selects the payment method within the funding instrument specified in the charge request, the payment service provider sends a charge request to issuing bank 1604 to charge the selected payment method. Process flow may proceed from action 1632 to an action 1634 in FIG. 16D, in which payment server 1412 sends a charge request specifying the customer's name "John Smith," Transaction Amount=$100," and selected "Payment Method=V-4567" to issuing bank 1604. The charge request is a request to charge the payment method specified in the request. Issuing bank 1604 is the entity that determines whether to authorize charges to the payment method. Issuing bank 1604 may be the source of the payment method and may have provided the selected payment method to the user. In keeping with the above example, issuing bank 1604 may be the credit company that provided the "V-4567" credit card to the user. If the selected payment method within the funding instrument is a debit card, issuing bank 1604 may be the bank that provided the debit card to the user. If the selected payment method within the funding instrument is a checking account, issuing bank 1604 may be the bank that provided the checking account to the user. If the selected payment method within the funding instrument is an account provided by the payment service provider, issuing bank 1604 may be the payment service provider. In an example, the account within the funding instrument is a VENMO® account that has a monetary balance, and the user may increase this balance by depositing money into this account and decrease this balance by withdrawing from or charging against this account.

At an action 1636, issuing bank 1604 receives the charge request and determines whether to authorize the charge to the payment method specified in the charge request. Issuing bank 1604 may check the balance of the payment method. In an example, issuing bank 1604 determines the balance on credit card "V-4567" and whether charging the transaction amount on this credit card would cause the maximum spending limit on this credit card to be exceeded. In response to a determination that charging the transaction amount on the credit card would not cause the maximum spending limit to be exceeded, issuing bank 1604 may approve the charge request. If issuing bank 1604 approves the charge request, issuing bank 1604 charges the payment method. In contrast, in response to a determination that charging the transaction amount on the credit card would cause the maximum spending limit to be exceeded, issuing bank 1604 may reject the charge request. If issuing bank 1604 rejects the charge request, issuing bank 1604 does not charge the payment method.

Figure 16D:
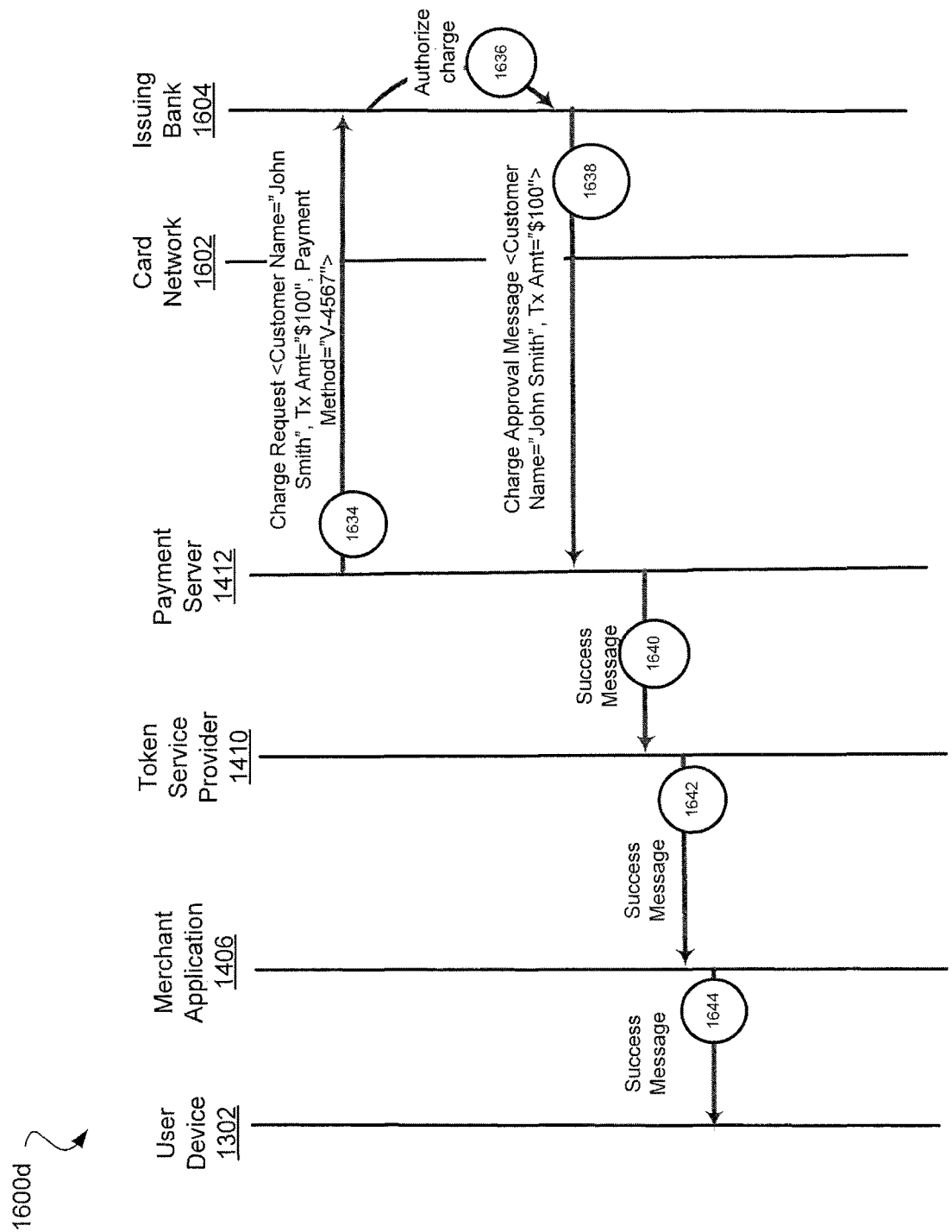

At an action 1638, issuing bank 1604 sends a message indicating approval or rejection of the charge request to payment server 1412. Payment server 1412 receives the message indicating approval or rejection of the charge request. In the example illustrated in FIG. 16D, issuing bank 1604 approves the charge request and thus approves the charge to the payment method within the underlying funding instrument "Acct1." Accordingly, issuing bank 1604 sends a charge approval message to payment server 1412. The charge approval message includes transaction information including the customer name "John Smith" and transaction amount "$100."

If the charge to the payment method within the funding instrument was successful, process flow may proceed to an action 1640, in which payment server 1412 sends a success message to token service provider 1406. At an action 1642, token service provider 1406 receives the success message and forwards it to merchant application 1402. At an action 1644, merchant application 1402 receives the success message and forwards it to user device 1302. In this way, the user may be informed of the success of the transaction.

In contrast, if issuing bank 1604 rejects the charge request sent in action 1634, issuing bank 1604 does not charge the payment method specified in the charge request and may send a reject message to payment server 1412, which sends the reject message to token service provider 1406. Token service provider 1406 forwards the reject message to merchant application 1402, which forwards the reject message to user device 1302. The reject message indicates to the user that the transaction was not approved. The user may try again to purchase goods or services from merchant application 1406.

Figure 17:
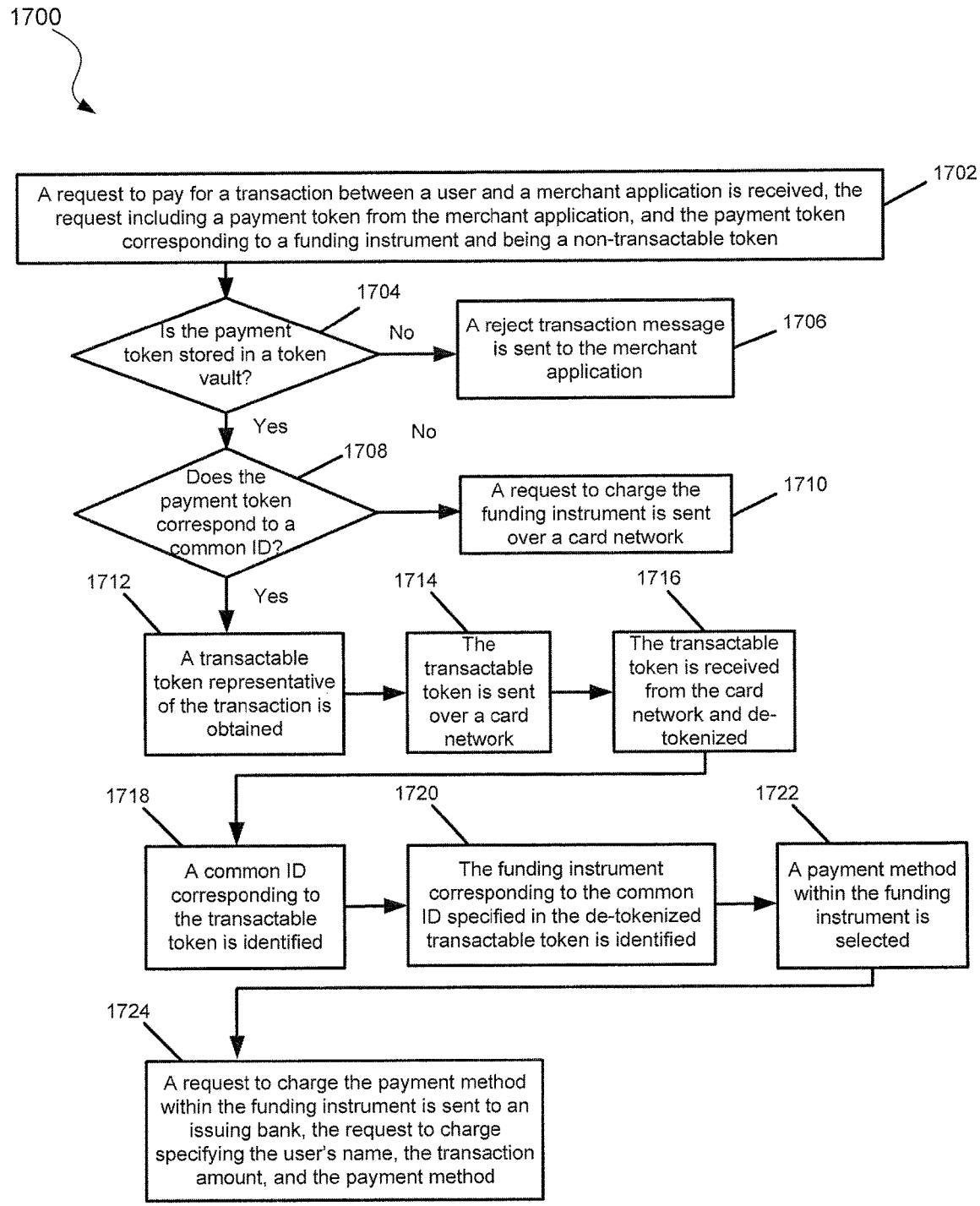
FIG. 17 is a flowchart illustrating an example method of charging a funding instrument associated with a payment token.

FIG. 17 is a flowchart illustrating an example method 1700 of charging a funding instrument associated with a payment token. Method 1700 is not meant to be limiting and may be used in other applications other than the payment applications discussed below. Method 1700 includes steps 1702-1724.

At a step 1702, a request to pay for a transaction between a user and a merchant application is received, the request including a payment token from the merchant application, and the payment token corresponding to a funding instrument and being a non-transactable token. In an example, payment application 1402 receives a request to pay for a transaction between a user and merchant application 1406, the request including the payment token "xyz" from merchant application 1406, and the payment token "xyz" corresponding to a funding instrument "Acct1" and being a non-transactable token.

At a step 1704, it is determined whether the payment token is stored in a token vault. In an example, token requestor 1408 determines whether the payment token "xyz" is stored in token vault 1456. If the payment token is not stored in the token vault, process flow may flow from step 1704 to a step 1706, in which a reject transaction message is sent to the merchant application. In an example, token requestor 1408 sends the reject transaction message to merchant application 1406. In contrast, if the payment token is stored in the token vault, process flow may flow from step 1704 to a step 1708, in which it is determined whether the payment token corresponds to a common ID. In an example, token requestor 1408 determines whether the payment token "xyz" corresponds to a common ID stored in the token vault.

If the payment token does not correspond to a common ID, process flow may flow from step 1708 to a step 1710, in which a request to charge the funding instrument is sent over a card network. If the payment token corresponds to a common ID, process flow may flow from step 1708 to a step 1712, in which a transactable token representative of the transaction is obtained. In an example, token service provider 1406 generates the transactable token "T1" that is representative of the transaction. If the payment token corresponds to a common ID, the funding instrument corresponding to the common ID includes one or more payment methods that can be charged for the transaction. The transactable token may be used to lead to the charging of the appropriate payment method.

In a step 1714, the transactable token is sent over the card network. The card network may be, for example, a credit card network or any other network capable of processing accounts (e.g., card account or bank account) for payment. In an example, token requestor 1408 sends the transactable token "T1" over card network 1602. In a step 1716, the transactable token is received from the card network and de-tokenized. In an example, token service provider 1410 receives the transactable token "T1" from card network 1602 and de-tokenizes the transactable token. In this example, token service provider 1406 is the originator of the transactable token and eventually receives it back.

In a step 1718, a common ID corresponding to the transactable token is identified. In an example, token service provider 1406 identifies common ID "CID1" corresponding to the single-use token "T1." In a step 1720, the funding instrument corresponding to the common ID specified in the de-tokenized transactable token is identified. In an example, token service provider 1406 identifies the funding instrument "Acct1" corresponding to the common ID "CID1" specified in the de-tokenized transactable token "T1." In a step 1722, a payment method within the funding instrument is selected. In an example, payment server 1412 selects "V-4567" as the payment method, which is within the funding instrument "Acct1." In a step 1724, a request to charge the payment method within the funding instrument is sent to an issuing bank, the charge request specifying the user's name, the transaction amount, and the payment method. In an example, payment server 1412 sends a request to charge the payment method within the funding instrument to issuing bank 1604, the charge request specifying the user's name "John Smith," the transaction amount "$100," and the payment method "V-4567." Issuing bank 1604 may receive the charge request and decide whether or not to authorize charging of the payment method specified in the charge request.

It should be understood that additional processes may be performed before, during, or after steps 1702-1724 discussed above. It is also understood that one or more of the steps of method 1700 described herein may be omitted, combined, or performed in a different sequence as desired.

The payment service provider may provide the user with transaction information from the merchant. For example, the payment service provider or the merchant may provide an invoice to the user. Information that prints on the invoice or receipt may be limited because this information is typically sent using the ISO-8583 standard. Messages sent to and from card network 1602 may adhere to the ISO-8583 standard. Currently, the information about the merchant and the transaction that is available is passed in an ISO-8583 message at transaction time. An ISO-8583 message is limited in the amount of detail it provides. Also, the quality of the data sent in the ISO-8583 message depends on the acquirer who set up the merchant. If token requestor 1408 and token service provider 1410 are different entities, then these entities may have different details about the transactions. For example, the merchant may interact directly with token requestor 1404 and provide it with additional information about the merchant. Accordingly, token requestor 1408 may have additional details about transactions (which cannot be sent over the ISO-8583 standard) that are not known by token service provider 1406 and that may add value to transactions.

Merchants may desire to provide more information to customers. For example, merchants may desire to present more branded information (e.g., by presenting their logo on receipts). Likewise, users may desire more information in their invoices or receipts from merchants. Unfortunately, the ISO-8583 message formats and the supporting networks do not support containers for rich datasets. If the user selects to pay with her payment service provider account, it may be desirable for the payment service provider to send supplemental transaction data to user device 1302. This avoids the field limitations of some of the payment transaction rails discussed above.

The supplemental transaction data may be referred to as "supplemental" because this transaction data is not being sent in an ISO-8583 message. In particular, supplemental transaction data may include information that is not sent under the ISO-8583 standard. Supplemental transaction data may include various data. In an example, the transaction specific data includes multiple name-value pairs. In an example, supplemental transaction data includes an external merchant ID that is used to represent the merchant and/or an external transaction reference ID that is used as a unique ID to identify the transaction. The merchant ID and/or transaction reference ID may be retained and stored until the corresponding TPAN has been de-tokenized and the supplemental transaction data forwarded to the payment service provider, or until the TPAN expires. The merchant ID and/or transaction reference ID may be, for example, an alphanumeric 32-character ID. In another example, supplemental transaction data includes the merchant's logo, special deals offered by the merchant, and/or other information that cannot be easily transmitted using the conventional ISO-8583 standard.

The supplemental transaction data may be used for various purposes such as risk management, location-based services, customer notification, etc. For example, risk related information, which is information that helps the payment service provider determine a risk of authorizing the user to charge the funding instrument, location information, merchant or transaction related details or any information that size-wise is longer than is acceptable in the typical ISO-8583 field standards may be forwarded to the payment service provider. Additionally, merchant or transaction related details or any information that data format-wise is not acceptable in the typical ISO-8583 field standards may be forwarded to the payment service provider. In an example, sending data in a particular format (e.g., image in a GIF format) may not be acceptable in the typical ISO-8583 field standards. The supplemental transaction data may be specific to a merchant and information that is provided by the merchant to token requestor 1408. The presence of the supplemental transaction data may leverage the information in the existing ISO-8583 standard and provide solutions to the shortcomings of the existing ISO-8583 specification. The supplemental transaction data may include a merchant ID and a handle to a particular transaction (e.g., transaction ID). The supplemental transaction data may originate from the merchant or token requestor that is in a business relationship with merchant application 1402.

As will be explained in relation to FIGS. 18A-18E, the token service provider 1410 and/or payment service provider may seek this information (e.g., the supplemental transaction data) on top of the information provided in an ISO-8583 message to enhance the transaction experience for the user and/or for reconciliation purposes. For example, during the de-tokenization and payment authorization, token service provider 1410 and/or payment server 1412 may use the supplemental transaction data to provide a richer experience to the user. FIGS. 18A-18E is an example process flow 1800*a*, 1800*b*, 1800*c*, 1800*d*, and 1800*e* for providing supplemental transaction data to a user in relation to charging an underlying funding instrument to complete a transaction involving the user. Process flow 1800*a*, 1800*b*, 1800*c*, 1800*d*, and 1800*e* show interactions between user device 1302, merchant application 1406, token requestor 1408, token service provider 1410, payment server 1412, card network 1602, and issuing bank 1604 that lead to supplemental transaction data being sent to entities associated with the transaction.

Figure 18A:
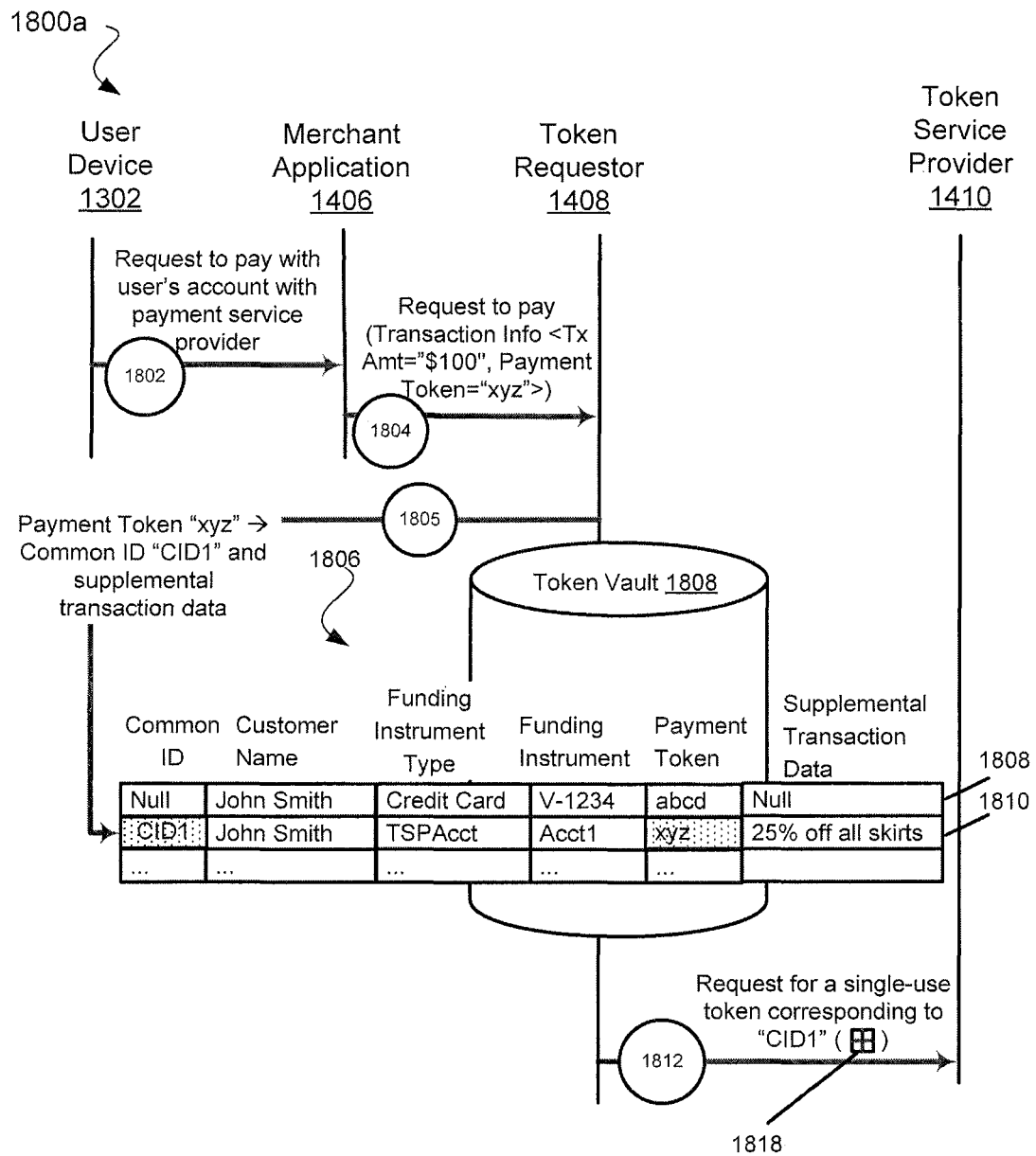
FIGS. 18A, 18B, 18C, 18D, and 18E is an example process flow for providing supplemental transaction data to a user in relation to charging an underlying funding instrument to complete a transaction.

FIG. 18A includes an action 1802, in which user device 1302 sends a request to pay with the payment service provider to merchant application 1406. At an action 1804, merchant application 1406 receives the request and sends the request to pay along with the transaction information to token requestor 1408. In FIG. 18A, the transaction information includes a transaction amount of "$100" and the payment token "xyz." As discussed above, merchant application 1406 knows to send the payment token "xyz" to token requestor 1408 because this payment token is associated with payments charged to the user's payment service provider account.

Additionally, merchant application 1406 may provide information about itself to token requestor 1408 for storing into token vault 1808 (e.g., offers, store locations, the merchant's logo, etc.). It may be desirable to provide this contextual information to token service provider 1410 or the payment service provider at the time it is authorizing the payment. It may be difficult to send this supplemental transaction data using the ISO-8583 standard message because this standard is limited and does not include these rich data set fields.

Token requestor 1408 maintains token vault 1808 and stores information associated with user accounts and their associated payment tokens, common IDs (if applicable), and supplemental transaction data (if applicable) into the token vault. Token vault 1808 includes a user account table 1806 having Common ID, Customer Name, Funding Instrument Type, Funding Instrument, Payment Token, and Supplemental Transaction Data columns. The supplemental transaction data is stored in the Supplemental Transaction Data column in user account table 1806. Token requestor 1408 may store a certain amount of transaction-contextual information into the Supplemental Transaction Data column of user account table 1806. User account table 1806 has the information stored in user account table 1456 in FIG. 16A, but also includes a Supplemental Transaction Data column storing additional data that is specific to a merchant and/or transaction.

User account table 1806 includes a first entry 1808, which includes the information in entry 1458 in FIG. 16A, and a Null value in the supplemental transaction data field. A second entry 1810 includes the information in entry 1460 in FIG. 16A, but also includes supplemental transaction data including special deals offered by the merchant (e.g., 145% off all skirts). It should be understood that the Supplemental Transaction Data column in user account table 1806 is an example of how the supplemental transaction data is stored. In other examples, the supplemental transaction data information may be stored in a data structure separate from token vault 1808 and referenced by the appropriate entry in token vault 1808 if the entry is associated with supplemental transaction data.

At an action 1805, token requestor 1408 searches token vault 1808 for an entry including the payment token "xyz" and determines whether the payment token corresponds to a common ID and/or to supplemental transaction data. In the example illustrated in FIG. 18A, the payment token "xyz" corresponds to the common ID "CID1" and the supplemental transaction data in entry 1810. The supplemental transaction data associated with the payment token "xyz" indicates that the merchant is offering a sale on all skirts. This information may be of interest to the user, especially because the user is attempting to purchase some items from this merchant and may already have a good relationship with this merchant.

If the payment token corresponds to a common ID, the common ID corresponds to a funding instrument that houses one or more payment methods to charge for the payment transaction. In some examples, the funding instrument source may be VENMO®, and the funding instrument is the user's VENMO® account. Token requestor 1408 may desire to gather more information to identify the appropriate payment method within the particular funding instrument to charge for the payment transaction. At an action 1812, token requestor 1408 sends a request for a transactable token corresponding to the common ID to token service provider 1410. The request for the transactable token also includes the supplemental transaction data corresponding to the payment token "xyz." The supplemental transaction data is represented by a quad 1818 and may also be referred to as supplemental transaction data 1418. In an example, the request for the transactable token is a request for a single-use token that may be consumed once by the payment service provider and then exhausted.

Token service provider 1410 receives the request for a transactable token corresponding to the common ID "CID1" and supplemental transaction data 1818. Process flow may proceed from action 1812 to an action 1814 in FIG. 18B, in which token service provider 1410 stores the supplemental transaction data 1818 into a transaction database 1816 maintained by token service provider 1410. Transaction database 1816 stores supplemental transaction data 1818 specific to transactions and/or merchants, and supplemental transaction data 1818 corresponds to the requested transaction at action 1802 and the common ID "CID1." Accordingly, token service provider 1410 has within its possession supplemental transaction data 1818 that may enrich the information provided to the user regarding this transaction and/or this merchant.

At an action 1820, responsive to the single-use token request, token service provider 1410 generates a single-use token "T2" representative of the transaction at action 1802 having a transaction amount of "$100" and corresponding to the common ID "CID1." The supplemental transaction data 1818 is specific to the single-use token "T2." At an action 1822, token service provider 1410 sends a message including the single-use token "T2" to token requestor 1408. At an action 1824, token requestor 1408 stores the single-use token "T2" into token vault 1456. Accordingly, token requestor 1408 knows that single-use token "T2" is associated with this transaction.

Token requestor 1408 may push the transaction information associated with the payment request in action 1802 to card network 1602. In an example, card network 1602 may be a credit card network, debit card network, automated clearing house (ACH), or other type of network that processes electronic financial transactions. At an action 1826, token requestor 1408 sends a routing message including the single-use token "T2" to card network 1602 for routing to the token's originator. In an example, the routing message is sent using the ISO-8583 standard, which has specified fields.

Card network 1602 receives the message and routes the transaction information in accordance with the account type. For example, card network 1602 may identify the source of the single-use token "T2," and route the transaction information accordingly. Process flow may proceed from action 1826 to an action 1828 in FIG. 18C, in which card network 1602 identifies the routing details associated with the single-use token "T2." At an action 1830, card network 1602 routes the single-use token "T2" back to token service provider 1410, the originator of the single-use token "T2." Card network 1602 may send the single-use token "T2" to token service provider 1410 using the ISO-8583 standard.

At an action 1832, token service provider 1410 receives the single-use token "T2" that it previously generated, and de-tokenizes the single-use token "T2." As discussed, token service provider 1406 maintains database 1625 that stores common IDs and funding instruments corresponding to tokens generated by the token service provider. Token service provider 1410 may de-tokenize the single-use token "T2" by identifying its corresponding common ID "CID1", and accordingly identifying the underlying funding instrument (e.g., the user's payment service provider account) corresponding to the common ID "CID1." In this example, "Acct1" corresponds to the common ID "CID1" and is a funding instrument of a "PSPAcct" type, which is an account provided by the payment service provider to the user. Additionally, at an action 1834, token service provider 1406 identifies the supplemental transaction data 1818 that is associated with the single-use token "T2." Token service provider 1406 stored supplemental transaction data 1818 in transaction database 1816 at action 1814 (see FIG. 18B).

The funding instrument includes one or more payment methods. In order for the appropriate payment method within the funding instrument to be charged, token service provider 1410 sends transaction information to payment server 1412. Process flow may proceed from action 1834 to an action 1836 in FIG. 16D, in which token service provider 1410 sends a charge request to payment server 1412. The charge request includes transaction information based on de-tokenizing the single-use token "T2." The charge request specifies the funding instrument "Acct1," transaction amount "$100," at least some of supplemental transaction data 1418, and merchant ID "Merch1," which identifies the merchant that provides merchant application 1402. In this example, token service provider 1406 sends quad 1818 (e.g., the skirt data) to payment server 1412.

Regarding action 1836, the present disclosure provides various techniques to send at least some or all of supplemental transaction data 1418 to payment server 1412 for storing in a database 1842. In some examples, token service provider 1406 does not send the supplemental transaction data to payment server 1412 using the ISO-8583 standard. In the example illustrated in FIGS. 18B-18D, token service provider 1410 stores supplemental transaction data 1418 and forwards it to payment server 1412. In some examples, token service provider 1410 stores the supplemental transaction data 1418 with a unique ID associated with the TPAN. At a later point in time, when token service provider 1410 receives a transactable token from card network 1602, token service provider 1410 de-tokenizes the TPAN and identifies the underlying funding instrument to be a VENMO® account (e.g., VENMO® wallet). If the unique ID associated with the TPAN has supplemental transaction data associated with it, at least some of the supplemental transaction data is forwarded to payment server 1412 along with the transaction information for payment authorization. This particular implementation may have advantages because it involves few components and therefore may eliminate potential points of failure. Additionally, the risk of payment server 1412 receiving the supplemental transaction data and transaction data out of sequence is low. Moreover, the risk of data being lost in transit may be low because both transaction and supplemental transaction data are being sent in the same call. Furthermore, this integration of data between token requestor 1408 and token service provider 1410 may scale well across clients because a client makes one call to one party, and custom integrations may be unnecessary for each pair of token requestor 1408 and token service provider 1410.

Other techniques for providing supplemental transaction data 1418 to payment server 1412 are also within the scope of the present disclosure. In another example, token requestor 1408 transmits supplemental transaction data 1418 to payment server 1412 directly. In this example, token requestor 1408 and payment server 1412 may decide on a secure mode of communication between them. Token requestor 1408 may request a transactable token from token service provider 1410, which returns single-use token "T2" with a unique ID to token requestor 1408. Token requestor 1408 sends supplemental transaction data 1418 to payment server 1412 along with the unique ID, and payment server 1412 stores the supplemental transaction data 1418. In response to receiving the single-use token from card network 1602, token service provider 1410 de-tokenizes the TPAN associated with the single-use token and identifies the underlying funding instrument.

In another example, token service provider 1410 publishes an event to provide supplemental transaction data 1418 to payment server 1412. In this example, token requestor 1408 may request a transactable token from token service provider 1410 and include the supplemental transaction data 1418 in the request. Token service provider 1410 may generate the single-use token "T2" and return it to token requestor 1408. Additionally, token service provider 1410 publishes a notification that includes the supplemental transaction data 1418 and a corresponding unique ID. Payment server 1412 receives the notification and stores the supplemental transaction data 1418 and the unique ID. In response to receiving the single-use token from card network 1602, token service provider 1410 de-tokenizes the TPAN associated with the single-use token and identifies the underlying funding instrument.

In another example, token service provider 1410 passes supplemental transaction data 1418 to payment server 1412. In this example, token requestor 1408 requests a transactable token from token service provider 1410 and includes supplemental transaction data 1418 in the request. Token service provider 1410 may generate the single-use token and return it along with a unique ID to token requestor 1408. Token service provider 1410 may simultaneously pass supplemental transaction data 1418 to a switch module that calls an API exposed by payment server 1412. This API call may include parameters such as supplemental transaction data 1418 and the unique ID. Payment server 1412 may receive and store supplemental transaction data 1418 and the unique ID.

In these examples, if the funding instrument is an account provided by the payment service provider (e.g., VENMO® wallet), token service provider 1410 passes the transaction information along to the payment service provider. Token service provider 1410 may invoke an API call exposed by the payment service provider that causes the transaction information to be passed to the payment service provider. In the same API call, the payment service provider may also send the unique ID to the payment service provider. The payment service provider may correlate supplemental transaction data 1418 with the transaction using the unique ID. In this way, supplemental transaction data 1418 may be put to use by the payment service provider.

At an action 1838, payment server 1412 selects a payment method within the funding instrument to charge for the transaction. Payment server 1412 maintains payment database 1633 including payment methods associated with the user's accounts. In this example, payment server 1412 selects the payment method "V-4567," which is a payment method within the funding instrument "Acct1." Additionally, at action 1840, payment server 1412 stores supplemental transaction data 1418 into a database 1842. Payment server 1412 may share some or all of supplemental transaction data 1418 with the user to provide the user with more information about the merchant or particular transaction. Payment server 1412 uses this supplemental transaction data to send additional data to the user.

Figure 18B:
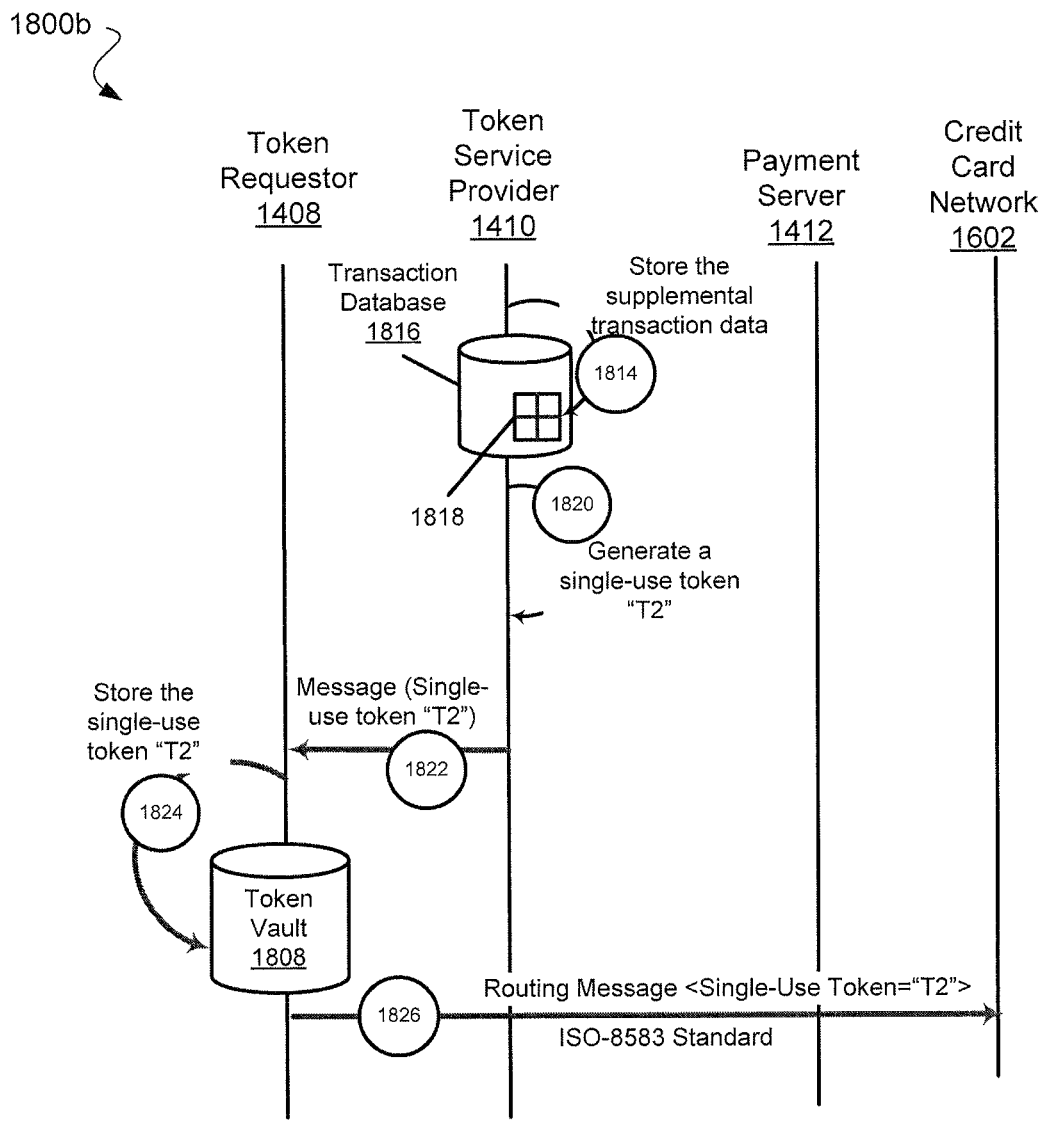
Figure 18C:
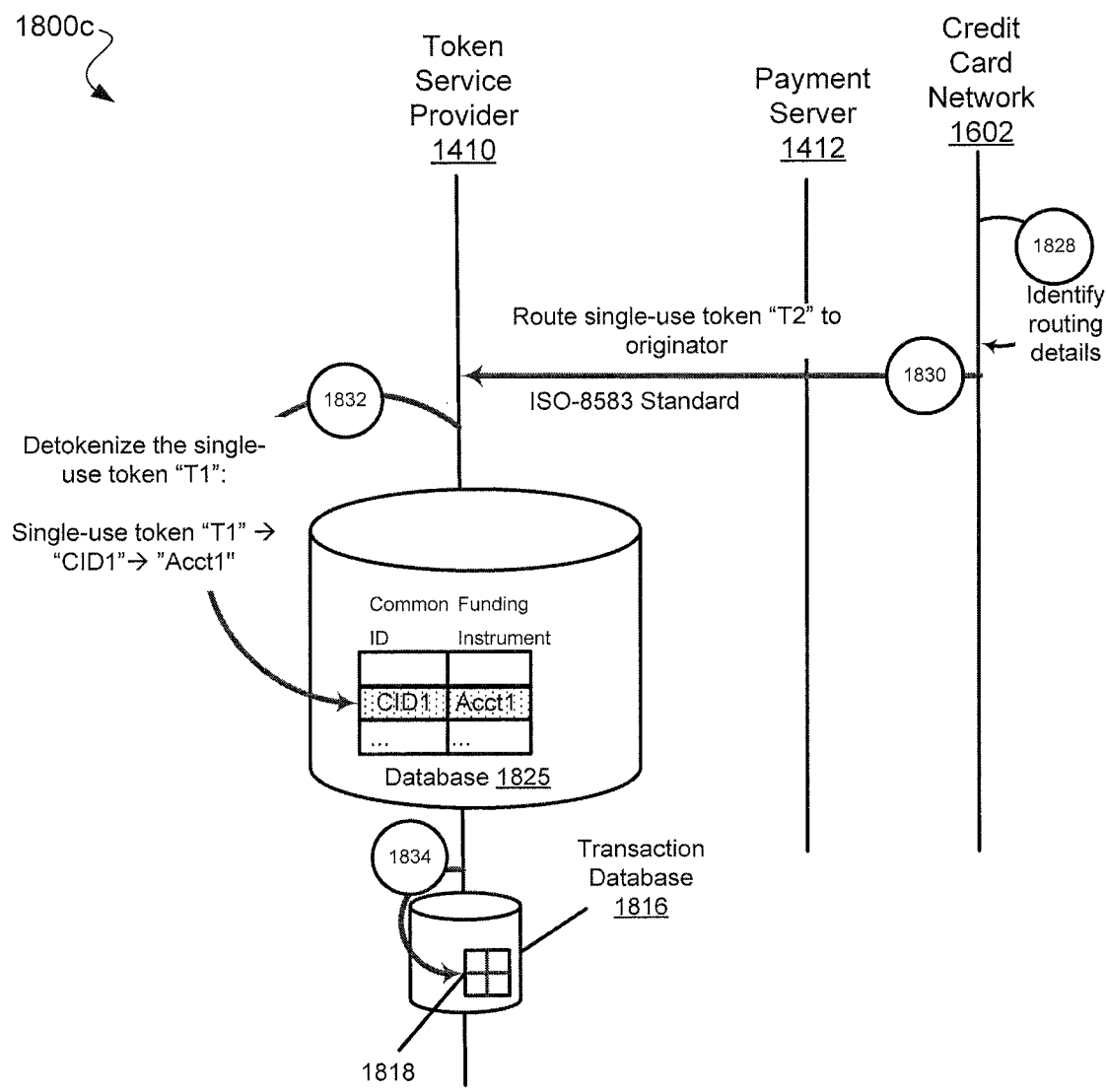
Figure 18D:
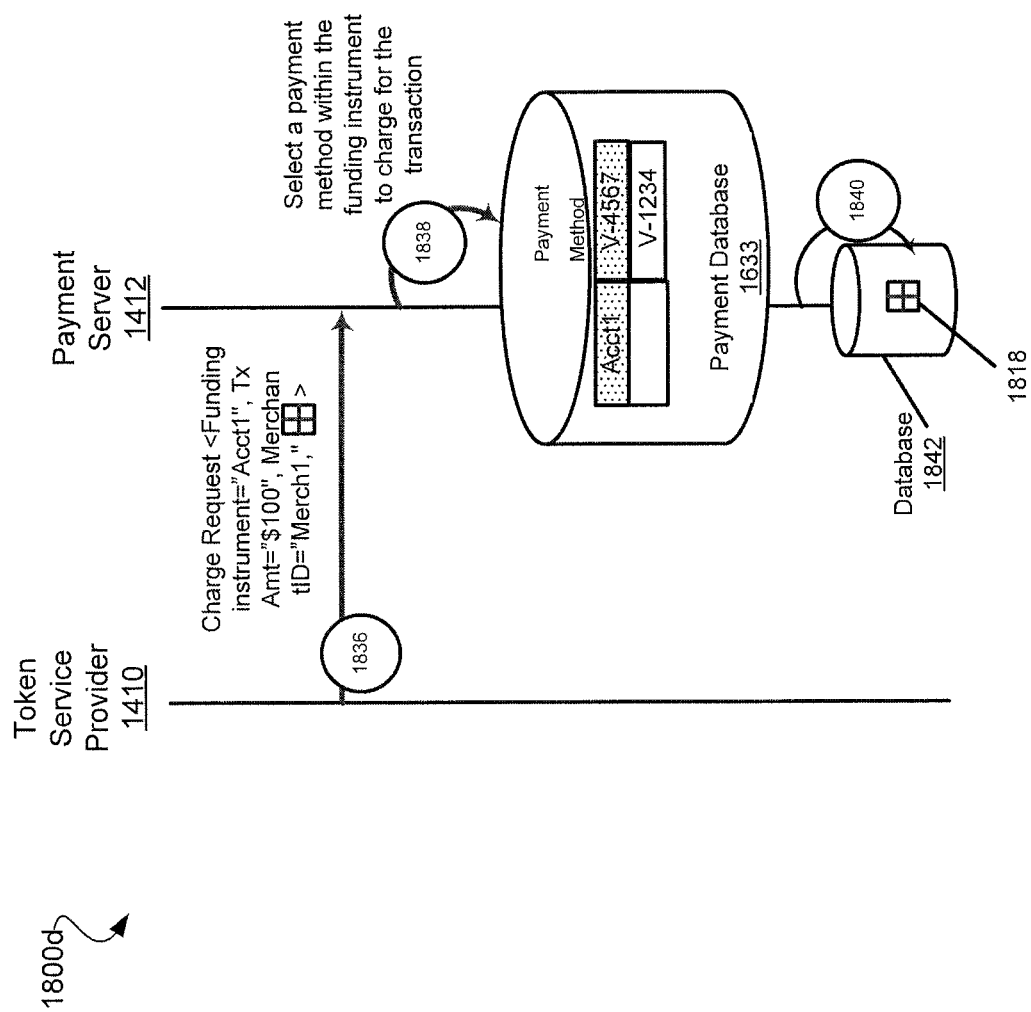
Figure 18E:
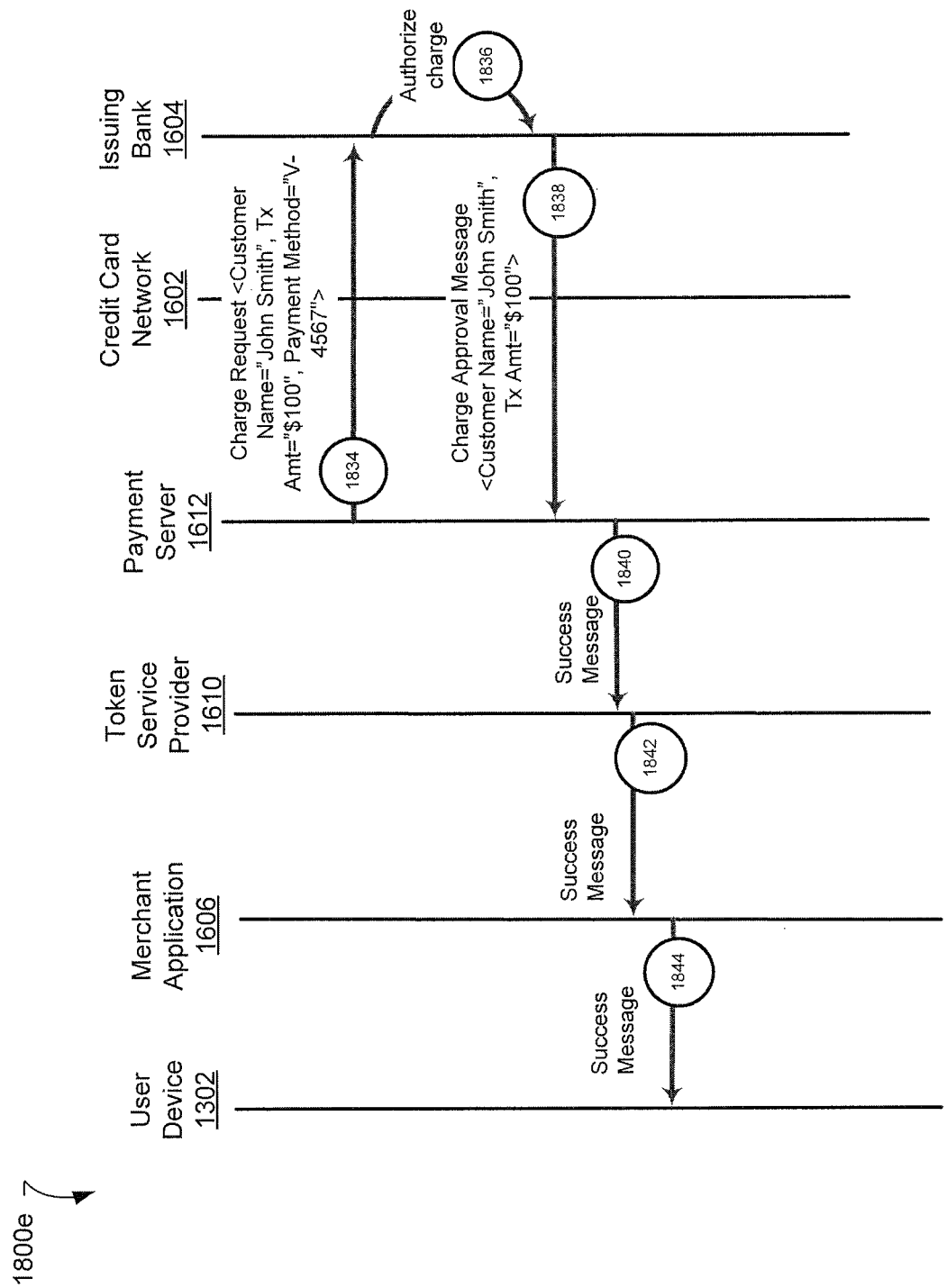

Process flow may proceed from action 1840 to action 1634 in FIG. 18E, in which payment server 1412 sends a charge request specifying the customer's name "John Smith," Transaction Amount=$100," and selected "Payment Method=V-4567" to issuing bank 1604. Process flow may then proceed from action 1634 to actions 1636, 1638, 1640, 1642, and/or 1644 which are similar to actions 1636, 1638, 1640, 1642, and/or 1644 in FIG. 16D.

Payment server 1412 may generate a receipt for the user and include in the receipt the de-tokenized information that was retrieved from single-use token "T2" along with at least some of supplemental transaction data 1418, which token service provider 1406 stored in transaction database 1816 at action 1814 (see FIG. 18B). For example, payment server 1412 may display the merchant's sale "25% off all skirts" on the receipt to provide the user with more information about the merchant. This is not intended to be limiting, and payment server 1412 may include other supplemental transaction data on the receipt or invoice sent to the user. In another example, supplemental transaction data 1418 includes the merchant's logo, and payment server 1412 displays the merchant's logo on the receipt or invoice.

It should be understood that in some examples, even if the payment token does not correspond to a common ID, the payment token may correspond to supplemental transaction data. In this example, the supplemental transaction data may be provided to user device 1302 without performing the actions using the common ID.

Figure 19:
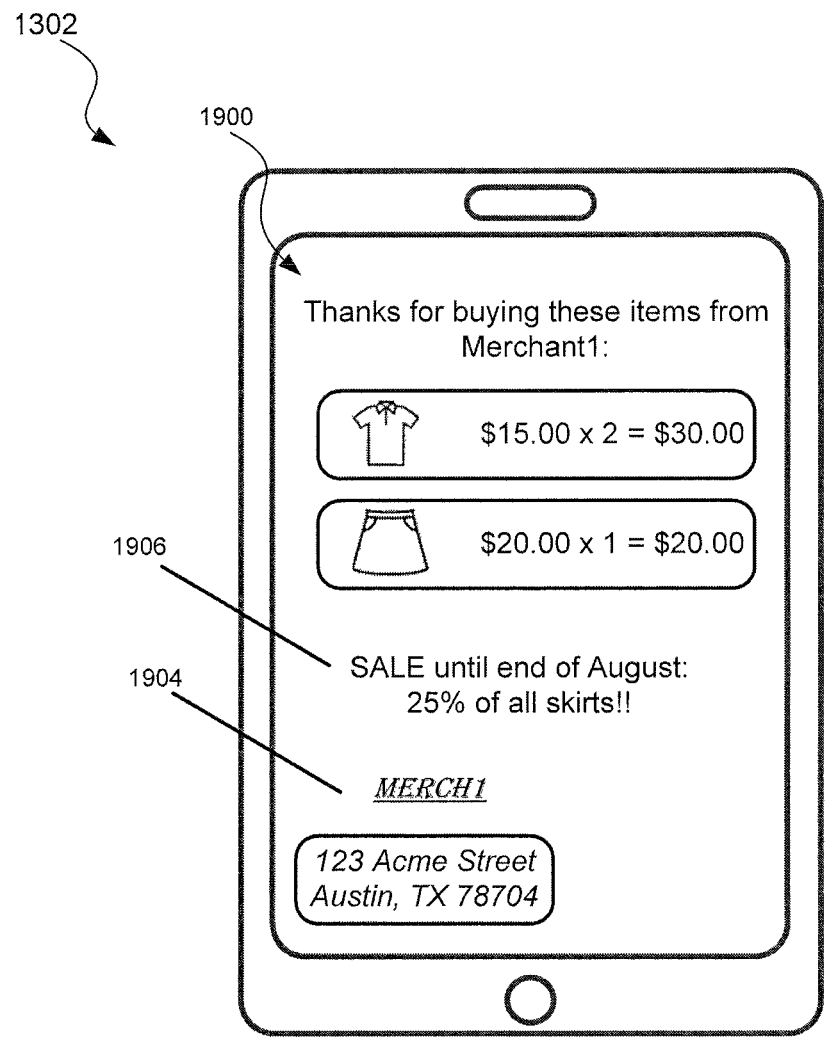
FIG. 19 is an example screenshot of supplemental transaction data displayed on a user device.

FIG. 19 is an example screenshot 1900 of supplemental transaction data 1418 displayed on user device 1302. Screenshot 1900 displays the items purchased by the user and supplemental transaction data 1418 that was sent to and stored by the payment service provider. Screenshot 1900 displays the merchant's icon 1904 along with benefits 1906 offered by the merchant. At least some of the information was not provided in an ISO-8583 message, but rather was provided to the payment service provider as discussed above in relation to FIGS. 18A-18E.

Unless specifically stated otherwise, as apparent from the following discussion, it is appreciated that throughout the description, discussions utilizing terms such as "receiving", "sending", "storing", "providing", "determining", "generating," "binding," "receiving," "authenticating," "rejecting," "searching," "obtaining," "routing," "de-tokenizing," "identifying," "charging," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 20:
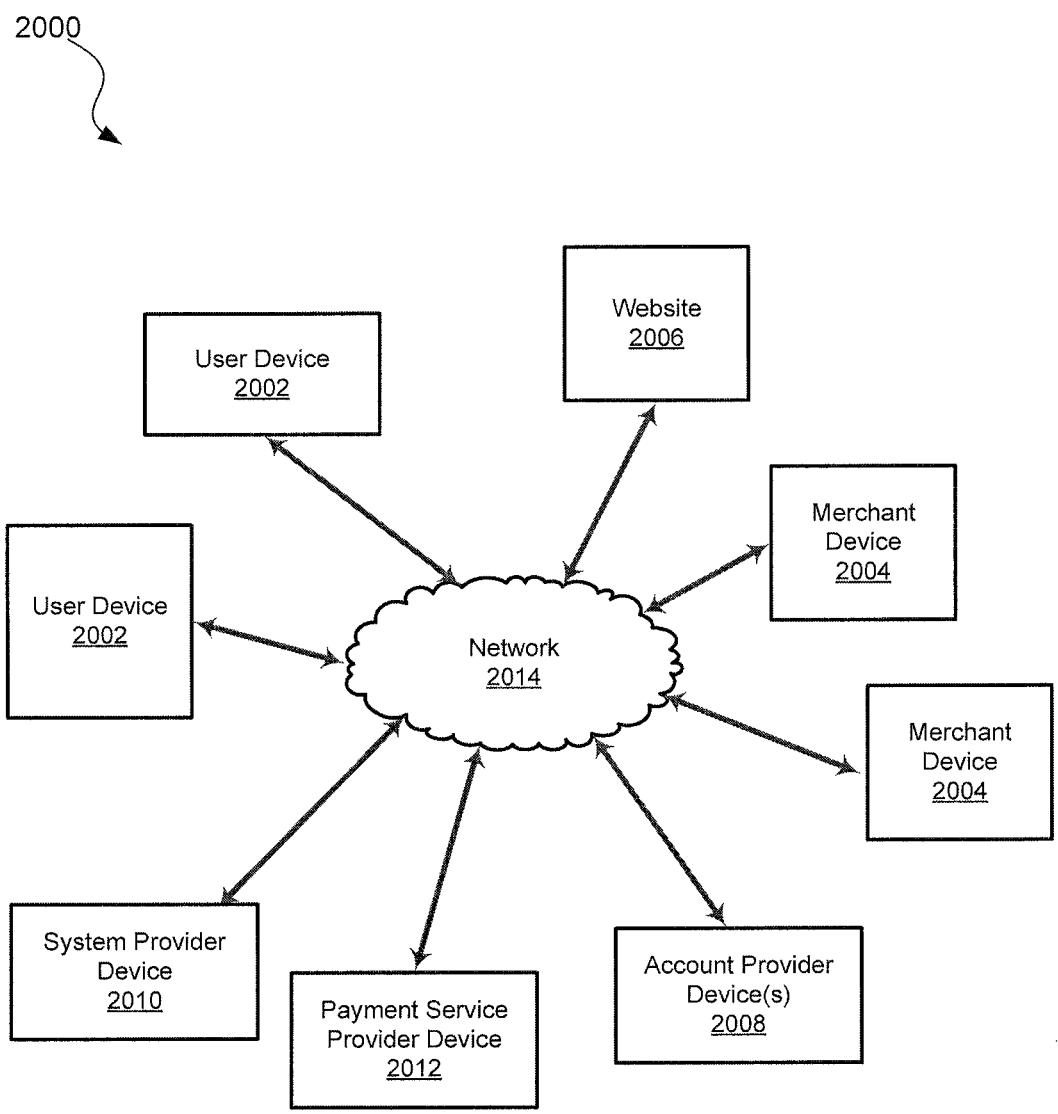
FIG. 20 is a schematic view illustrating an embodiment of a networked system.

Referring now to FIG. 20, an embodiment of a network-based system 2000 for implementing one or more processes described herein is illustrated. As shown, network-based system 2000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 20 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 2000 illustrated in FIG. 20 includes a plurality of user devices 2002, a plurality of merchant devices 2004, a website 2006, a payment service provider device 2012, a plurality of account provider devices 2008, and/or a system provider device 2010 in communication over a network 2014. Any of the user devices 2002 may be the user devices, discussed above, and may be operated by the users discussed above. The merchant devices 2004 may be the merchant devices discussed above and may be operated by the merchants discussed above. The payment service provider device 2012 may be the token service provider devices discussed above and may be operated by a token service provider such as, for example, PayPal® Inc. of San Jose, CA. The account provider devices 2008 may be the account provider devices discussed above and may be operated by the account providers discussed above such as, for example, credit card account providers, bank account providers, savings account providers, and a variety of other account providers known in the art. The system provider device 2010 may be the system provider devices discussed above and may be operated by the system providers discussed above. The website 2006 may be social media website with which the user is interacting to buy an item displayed on the website.

The user devices 2002, merchant devices 2004, payment service provider device 2012, account provider devices 2008, and/or system provider device 2010 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 2000, and/or accessible over the network 2014.

The network 2014 may be implemented as a single network or a combination of multiple networks. For example, in various embodiments, the network 2014 may include the Internet and/or one or more intranets, landline networks, wireless networks, and/or other appropriate types of networks.

The user devices 2002 may be implemented using any appropriate combination of hardware and/or software configured for wired and/or wireless communication over network 2014. For example, in one embodiment, the user devices 2002 may be implemented as a personal computer of a user in communication with the Internet. In other embodiments, the user devices 2002 may be a smart phone, personal digital assistant (PDA), laptop computer, and/or other types of computing devices.

The user devices 2002 may include one or more browser applications which may be used, for example, to provide a convenient interface to permit the user to browse information available over the network 2014. For example, in one embodiment, the browser application may be implemented as a web browser configured to view information available over the Internet.

The user devices 2002 may also include one or more toolbar applications which may be used, for example, to provide user-side processing for performing desired tasks in response to operations selected by the user. In one embodiment, the toolbar application may display a user interface in connection with the browser application.

The user devices 2002 may further include other applications as may be desired in particular embodiments to provide desired features to the user devices 2002. In particular, the other applications may include a payment application for payments assisted by a token service provider through the payment service provider device 2012. The other applications may also include security applications for implementing user-side security features, programmatic user applications for interfacing with appropriate application programming interfaces (APIs) over the network 2014, or other types of applications. Email and/or text applications may also be included, which allow the user to send and receive emails and/or text messages through the network 2014. The user devices 2002 may include one or more user and/or device identifiers which may be implemented, for example, as operating system registry entries, cookies associated with the browser application, identifiers associated with hardware of the user devices 2002, or other appropriate identifiers, such as a phone number. In one embodiment, the user identifier may be used by the payment service provider device 2012 and/or account provider devices 2008 to associate the user with a particular account as further described herein.

Figure 21:
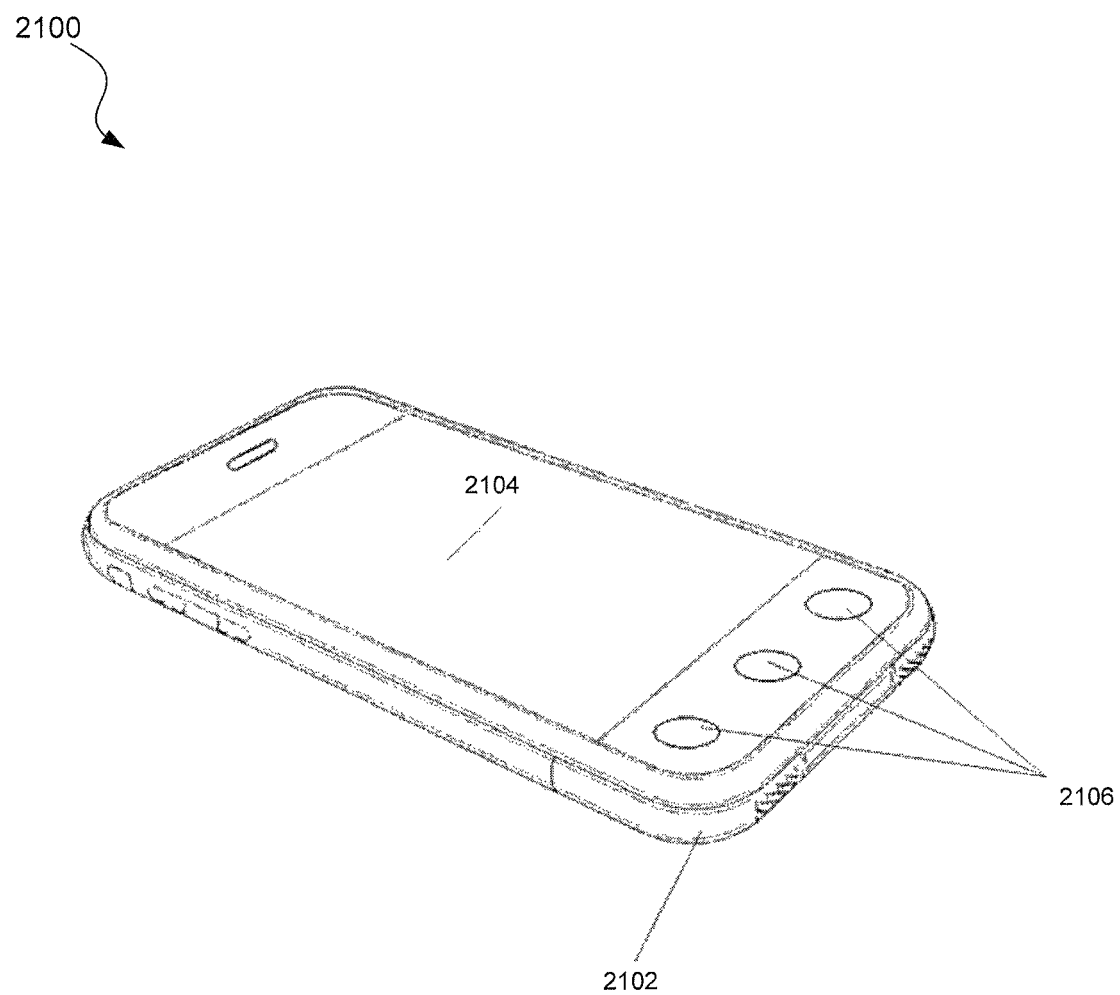
FIG. 21 is a perspective view illustrating an embodiment of a user device.

Referring now to FIG. 21, an embodiment of a user device 2100 is illustrated. The user device 2100 may be any of the user devices discussed above. The user device 2002 includes a chassis 2102 having a display 2104 and an input device including the display 2104 and a plurality of input buttons 2106. The user may use user device 2100 to access and interact with website 2006. One of skill in the art will recognize that the user device 2100 is a portable or mobile phone including a touch screen input device and a plurality of input buttons that allow the functionality discussed above with reference to steps in any of the methods or process flows discussed in the present disclosure. However, a variety of other portable/mobile user devices and/or desktop user devices may be used in the methods discussed above with reference to the figures without departing from the scope of the present disclosure.

Figure 22:
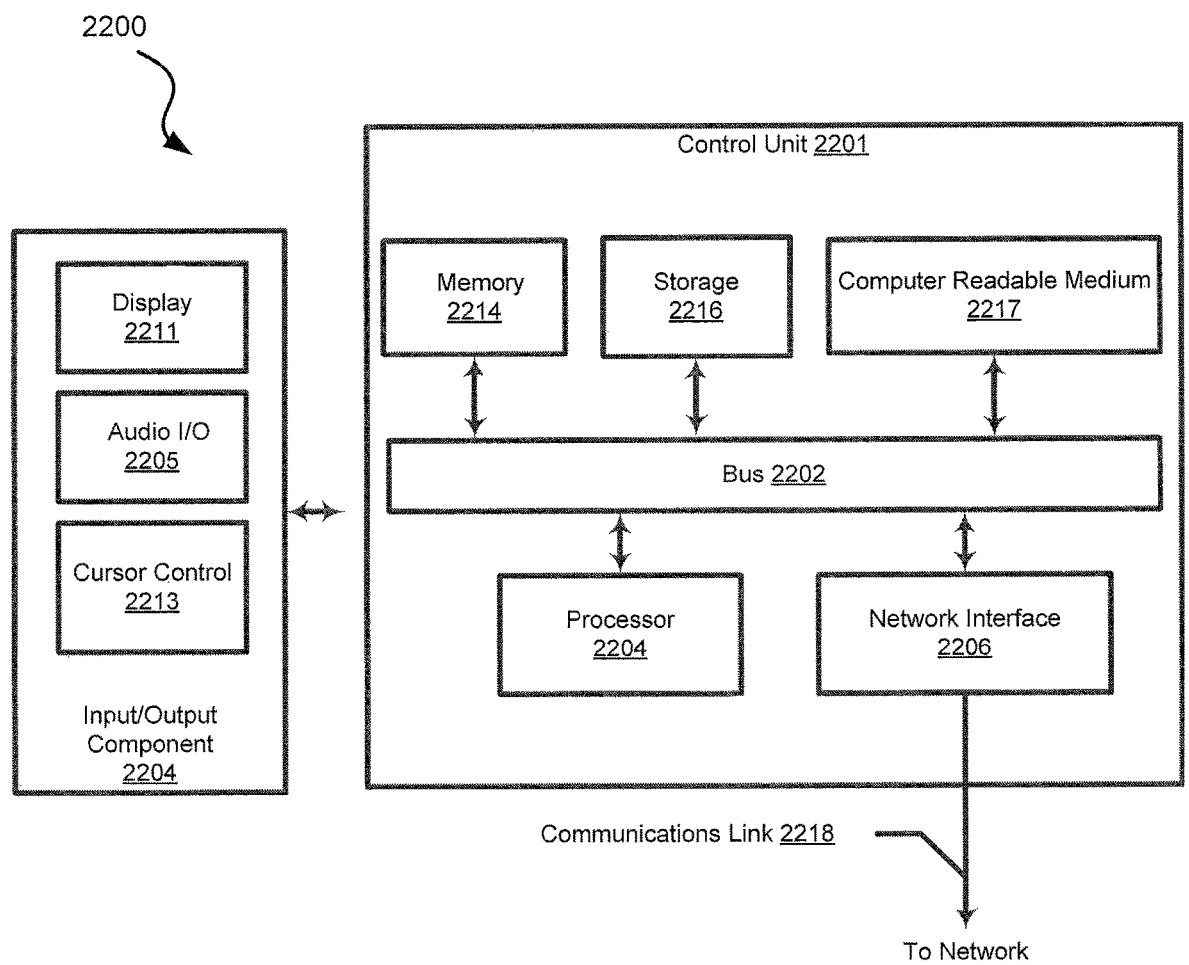
FIG. 22 is a schematic view illustrating an embodiment of a computer system.

Referring now to FIG. 22, an embodiment of a computer system 2200 suitable for implementing, for example, the user devices, the merchant devices, the token service provider device, the account provider devices, and/or the system provider device is illustrated. It should be appreciated that other devices utilized by users, merchants, token service providers, account providers, and/or system providers in the payment system discussed above may be implemented as the computer system 2200 in a manner as follows.

In accordance with various embodiments of the present disclosure, computer system 2200, such as a computer and/or a network server, includes a bus 2202 or other communication mechanism for communicating information, which interconnects subsystems and components, such as a processing component 2204 (e.g., processor, micro-controller, digital signal processor (DSP), etc.), a system memory component 2214 (e.g., RAM), a static storage component 2216 (e.g., ROM), a disk drive component 2217 (e.g., magnetic or optical), a network interface component 2212 (e.g., modem or Ethernet card), a display component 2206 (e.g., CRT or LCD), an input component 2204 (e.g., keyboard, keypad, or virtual keyboard), and/or a cursor control component 2213 (e.g., mouse, pointer, or trackball). In one implementation, the disk drive component 2217 may comprise a database having one or more disk drive components.

In accordance with embodiments of the present disclosure, the computer system 2200 performs specific operations by the processor 2204 executing one or more sequences of instructions contained in the memory component 2214, such as described herein with respect to the user devices, the merchant devices, the token service provider device, the account provider devices, and/or the system provider device. Such instructions may be read into the system memory component from another computer readable medium, such as the static storage component or the disk drive component. In other embodiments, hard-wired circuitry may be used in place of or in combination with software instructions to implement the present disclosure.

Logic may be encoded in a computer readable medium, which may refer to any medium that participates in providing instructions to the processor 2204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component, volatile media includes dynamic memory, such as the system memory component, and transmission media includes coaxial cables, copper wire, and fiber optics, including wires that comprise the bus 2202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 2200. In various other embodiments of the present disclosure, a plurality of the computer systems 2200 coupled by a communication link 2218 to the network 2014 (e.g., such as a LAN, WLAN, PTSN, and/or various other wired or wireless networks, including telecommunications, mobile, and cellular phone networks) may perform instruction sequences to practice the present disclosure in coordination with one another.

The computer system 2200 may transmit and receive messages, data, information and instructions, including one or more programs (i.e., application code) through the communication link 2218 and the network interface component 2206. The network interface component 2206 may include an antenna, either separate or integrated, to enable transmission and reception via the communication link 2218. Received program code may be executed by processor 2204 as received and/or stored in disk drive component 2217 or some other non-volatile storage component for execution.

Figure 23:
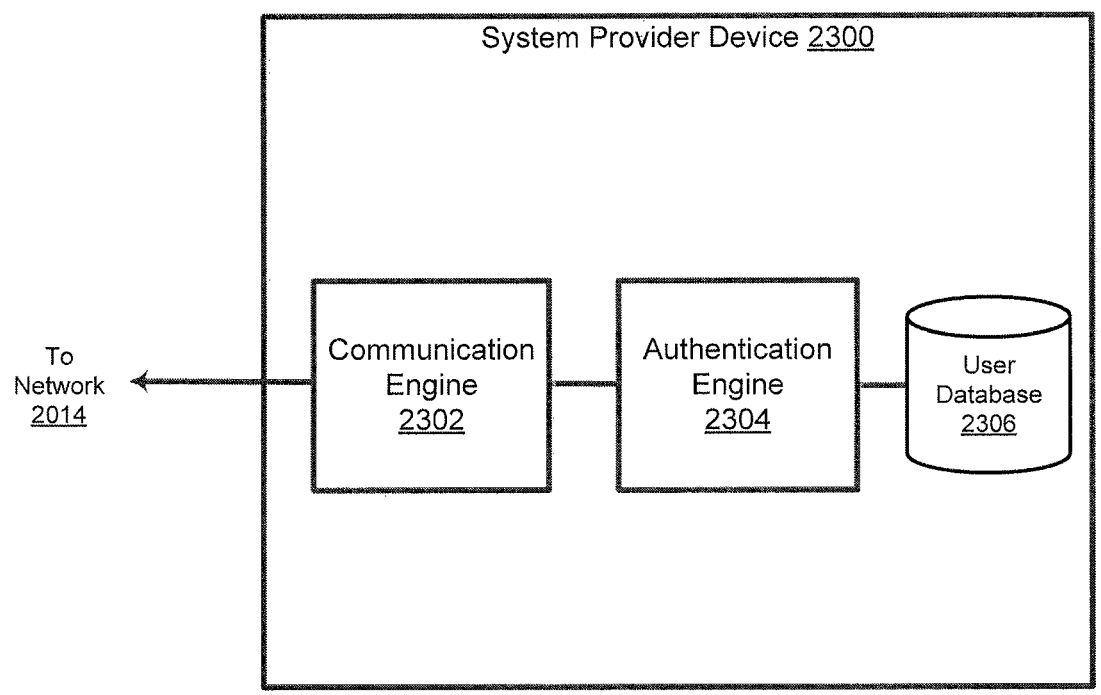
FIG. 23 is an example of a system provider device.

Referring now to FIG. 23, an embodiment of a system provider device 2300 is illustrated. In an embodiment, the device 2300 may be the user devices, the merchant devices, the payment service provider device, the account provider devices, token requestor devices, and/or the token service provider device discussed above. The device 2300 includes a communication engine 2302 that is coupled to the network 2014 and to an authentication engine 2304 that is coupled to a user database 2306. The communication engine 2302 may be software or instructions stored on a computer-readable medium that allows the device 2300 to send and receive information over the network 2014. The authentication engine 2304 may be software or instructions stored on a computer-readable medium that is operable to provide any of the other functionality that is discussed above. While the database 2306 has been illustrated as located in the device 2300, one of skill in the art will recognize that it may be connected to authentication engine 2304 through the network 2014 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions; and
a hardware processor coupled with the non-transitory memory and configured to execute the instructions to cause the system to perform operations comprising:
receiving a request for performing a first transaction between a user and a first entity;
determining a common identifier (CID) associated with an account of the user and generated based on previous user interactions of the user with a plurality of electronic interfaces associated with a plurality of entities, the CID indicating that the user has been authorized for conducting transactions with the plurality of entities;
generating a single-use payment token for the first transaction based on the CID, wherein the single-use payment token includes data that enables the single-use payment token for routing via a payment card network;
transmitting, via a communication network different from the payment card network, the single-use payment token to a device of the user;
receiving the single-use payment token via the payment card network, wherein the single-use payment token is routed to the system via the payment card network based on the data included in the single-use payment token;
in response to receiving the single-use payment token, accessing one or more postings on a social media platform that were posted by the user within a threshold time period from receiving the request;
updating a social graph associated with the user based on the one or more postings, wherein the social graph tracks locations of the user over a plurality of time periods;
deriving a context related to the user based at least in part on the updated social graph; and processing the first transaction for the user based on the context and information associated with the first transaction.

2. The device system of claim 1, wherein the one or more postings indicate a user location of the user.

3. The system of claim 1, wherein the single-use payment token is generated further based on a funding source associated with the account.

4. The system of claim 1, wherein the context is derived further based on the tracked locations of the user over the plurality of time periods.

5. The system of claim 1, wherein the operations further comprise:
assigning, to the CID, a use restriction that restricts a use of the CID with any entity other than the plurality of entities.

6. The system of claim 1, wherein the CID further indicates a user consent of the user to perform a first action related to the first transaction, and wherein the user consent is applicable to perform a second action when processing a second transaction with a second entity in the plurality of entities.

7. A non-transitory machine-readable medium having instructions stored thereon, the instructions executable to cause a machine to perform operations comprising:
receiving a request for performing a first transaction between a user and a first entity;
determining a common identifier (CID) associated with an account of the user and generated based on previous user interactions of the user with a plurality of electronic interfaces associated with a plurality of entities, the CID indicating that the user has been authorized for conducting transactions with the plurality of entities including the first entity;
transmitting, via a communication network, a payment token associated with the CID to a device of the user;
receiving the payment token via a payment card network different from the communication network, wherein the payment token is routed to the machine via the payment card network based on data included in the payment token;
accessing one or more postings on a social media platform that were posted by the user within a particular time period;
updating a social graph associated with the user based on the one or more postings, wherein the social graph tracks locations of the user over a plurality of time periods;
deriving a context related to the user based at least in part on the updated social graph; and
processing the first transaction for the user based on the context and information associated with the first transaction.

8. The non-transitory machine-readable medium of claim 7, wherein the context is a first context, and wherein the operations further comprise:
accessing a second context associated with the CID, the second context derived based on processing a second transaction between the user and a second entity;
comparing the first context against the second context; and
authorizing the first transaction based on the comparing.

9. The non-transitory machine-readable medium of claim 7, wherein the payment token is generated further based on a funding source associated with the account, and wherein the payment token is received from a first merchant device associated with the first entity via the payment network for completing the first transaction.

10. The non-transitory machine-readable medium of claim 7, wherein the operations further comprise:
responsive to a determination that at least one of the user or the first entity provides permission to share the CID with a second entity, assigning an attribute to the CID, the attribute indicating that the CID is usable for one or more transactions between the user and the second entity.

11. The non-transitory machine-readable medium of claim 7, wherein the CID was generated further based on social media platform postings associated with the user.

12. The non-transitory machine-readable medium of claim 7, wherein the CID further indicates a user consent of the user to perform a first action related to the first transaction, and wherein the user consent is applicable to perform a second action when processing a second transaction with a second entity from the plurality of entities.

13. The non-transitory machine-readable medium of claim 7, wherein the one or more postings indicate a user location of the user.

14. A method comprising:
receiving, by a computer system, a request for performing a first transaction between a user and a first entity;
determining, by the computer system, a common identifier (CID) associated with an account of the user and generated based on previous user interactions of the user with a plurality of electronic interfaces associated with a plurality of entities;
transmitting, by the computer system via a communication network, a payment token associated with the CID to a device of the user;
receiving, by the computer system, the payment token via a payment card network different from the communication network, wherein the payment token is routed to the computer system via the payment card network based on data included in the payment token;
accessing, by the computer system, one or more postings on a social media platform that were posted by the user within a threshold time period from receiving the request;
updating, by the computer system, a social graph associated with the user based on the one or more postings, wherein the social graph tracks locations of the user over a plurality of time periods;
deriving, by the computer system, a context related to the user based at least in part on the updated social graph; and
processing, by the computer system, the first transaction for the user based on the context and information associated with the first transaction.

15. The method of claim 14, wherein the one or more postings indicate a location of the user.

16. The method of claim 14, wherein the context is a first context, and wherein the method further comprises:
accessing a second context associated with the CID, the second context derived based on processing a second transaction between the user and a second entity;
comparing the first context against the second context; and
authorizing the first transaction based on the comparing.

17. The method of claim 14, wherein the payment token is generated based on a funding source associated with the account, and wherein the payment token is received from a first merchant device associated with the first entity via the payment network for completing the first transaction.

18. The method of claim 14, wherein CID was generated further based on social media platform postings associated with the user.

19. The method of claim 14, further comprising:
assigning, to the CID, a use restriction that restricts a use of the CID with any entity other than a selected set of entities.

20. The method of claim 14, wherein the CID further indicates a user consent of the user to perform a first action related to the first transaction, and wherein the user consent is applicable to perform a second action when processing a second transaction with a second entity.

\* \* \* \* \*